United States Patent
Kawai et al.

(10) Patent No.: US 8,896,626 B2
(45) Date of Patent: Nov. 25, 2014

(54) IMAGE CAPTURING APPARATUS, IMAGE PROCESSING APPARATUS, CONTROL METHOD THEREOF AND PROGRAM

(75) Inventors: Tetsuro Kawai, Kanagawa (JP); Daisuke Nakao, Tokyo (JP)

(73) Assignee: Sony Corporation (JP)

( * ) Notice: Subject to any disclaimer, the term of this patent is extended or adjusted under 35 U.S.C. 154(b) by 1070 days.

(21) Appl. No.: 12/925,512

(22) Filed: Oct. 22, 2010

(65) Prior Publication Data

US 2011/0122154 A1 May 26, 2011

(30) Foreign Application Priority Data

Nov. 20, 2009 (JP) ................. P2009-264617

(51) Int. Cl.
| | | |
|---|---|---|
| *G09G 5/00* | (2006.01) | |
| *G01F 1/00* | (2006.01) | |
| *G01F 17/00* | (2006.01) | |
| *G10K 11/00* | (2006.01) | |
| *A63F 9/24* | (2006.01) | |
| *G06K 9/46* | (2006.01) | |
| *G06K 9/36* | (2006.01) | |
| *A63B 69/36* | (2006.01) | |
| *H04N 5/77* | (2006.01) | |
| *H04N 5/85* | (2006.01) | |
| *G11B 27/28* | (2006.01) | |
| *G11B 27/034* | (2006.01) | |

(52) U.S. Cl.
CPC . *H04N 5/77* (2013.01); *H04N 5/85* (2013.01); *G11B 27/28* (2013.01); *G11B 27/034* (2013.01)
USPC .............. 345/629; 345/634; 702/48; 702/54; 702/103; 463/3; 382/190; 382/284; 434/252; 473/131; 473/154; 473/190; 473/192

(58) Field of Classification Search
USPC ............ 345/581, 619, 473, 629, 634; 702/48, 702/54, 103; 382/190, 284; 434/247, 249, 434/252; 473/131, 154, 190, 192; 463/3
See application file for complete search history.

(56) References Cited

U.S. PATENT DOCUMENTS

| | | | | |
|---|---|---|---|---|
| 2006/0281060 | A1* | 12/2006 | Katayama | ...................... 434/247 |
| 2008/0002862 | A1* | 1/2008 | Matsugu et al. | .............. 382/115 |
| 2008/0088747 | A1* | 4/2008 | Kita et al. | ..................... 348/715 |
| 2009/0115864 | A1 | 5/2009 | Ogawa | |

FOREIGN PATENT DOCUMENTS

| | | |
|---|---|---|
| JP | 11221309 | 8/1999 |
| JP | 2001-215604 A | 8/2001 |

(Continued)

OTHER PUBLICATIONS

Office Action from Japanese Application No. 2009-264617, dated Oct. 1, 2013.

*Primary Examiner* — Wesner Sajous
*Assistant Examiner* — Andrew Shin
(74) *Attorney, Agent, or Firm* — Lerner, David, Littenberg, Krumholz & Mentlik, LLP

(57) ABSTRACT

An image processing apparatus includes: a specific sound detecting section which detects a specific sound generated during motion of a specific motion conducted by a target object included in an image group including a plurality of images which continues in a time-series manner; a synthetic image generating section which generates a synthetic image representing transitions of the specific motion; a determination range setting section which sets, as a determination range, a range in the time axis for determination on the generation of the synthetic image on the basis of a user manipulation; and a control section which controls the synthetic image generating section to generate the synthetic image in a case where the specific sound is detected in the set determination range, and not to generate the synthetic image in a case where the specific sound is not detected in the set determination range.

9 Claims, 30 Drawing Sheets

(56) References Cited

FOREIGN PATENT DOCUMENTS

| JP | 2003304444 A | 10/2003 |
| JP | 2004-133637 A | 4/2004 |
| JP | 2009-044573 A | 2/2009 |
| JP | 2009-118009 A | 5/2009 |

* cited by examiner

IMAGE SYNTHESIS

FIG. 6A
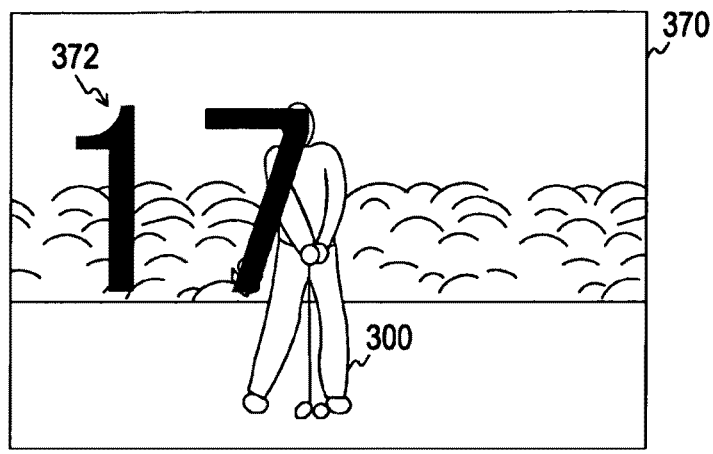
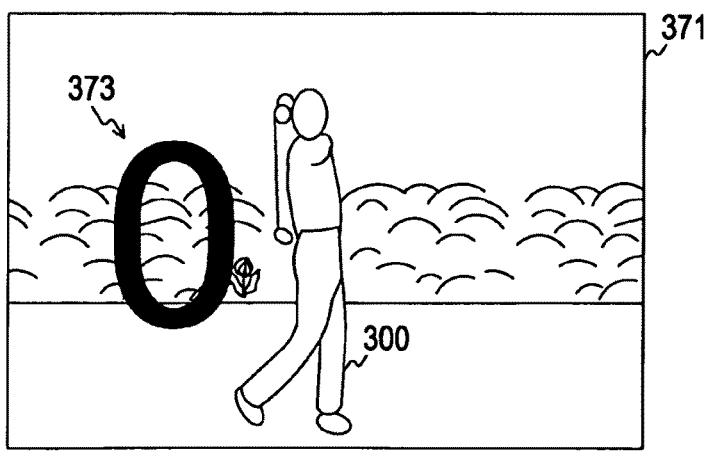
FIG. 6B

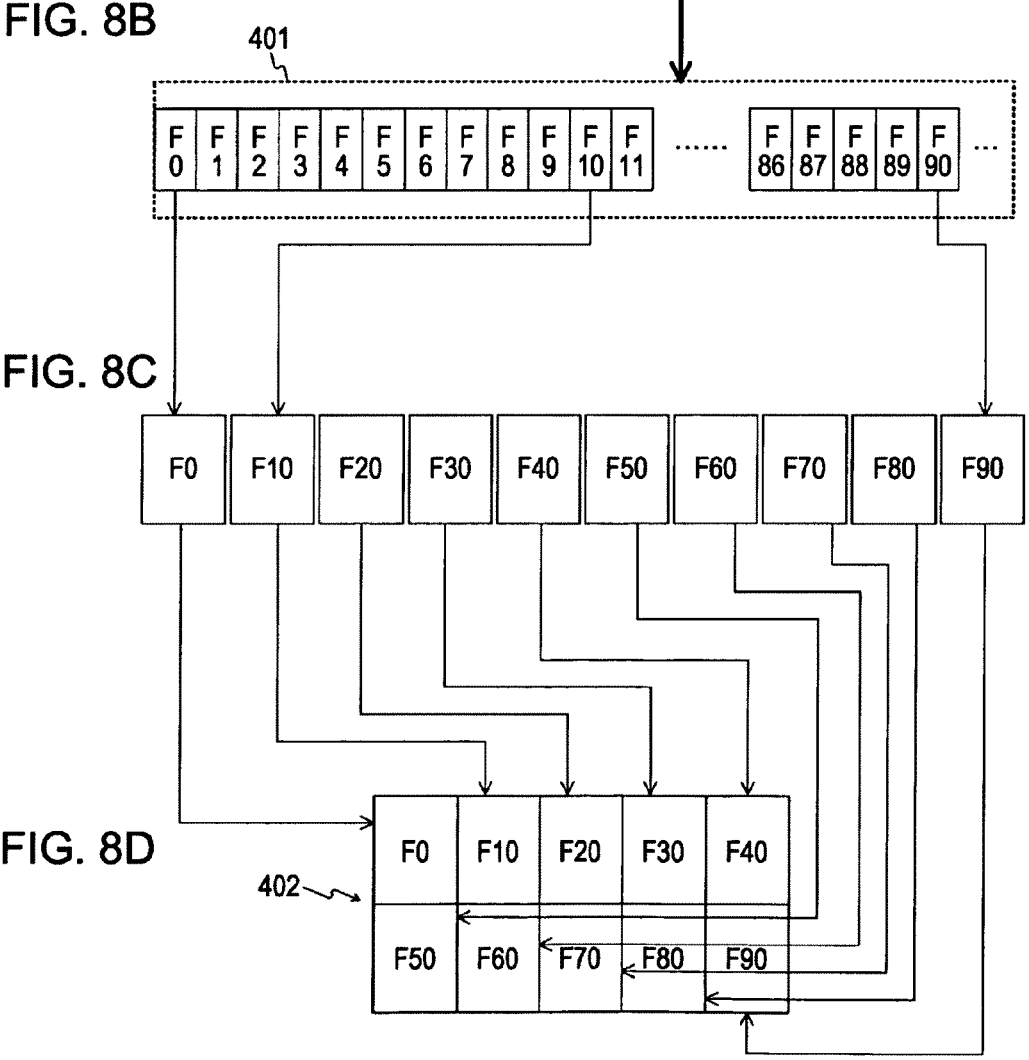

FIG. 24

| | IMPACT SOUND 611 | HIGH SPEED MOTION RANGE 612 | SOUND VALID RANGE 613 | SYNTHESIS TARGET IMAGE SELECTION RANGE 614 |
|---|---|---|---|---|
| GOLF | SOUND GENERATED BY HITTING BALL DURING SWING | 0.05 SECONDS AROUND IMPACT SOUND | SPECIFIC RANGE BEFORE PHOTOGRAPHING TRIGGER | 1.5 SECONDS BEFORE AND 0.5 SECONDS AFTER IMPACT SOUND (TOTAL 2.0 SECONDS) |
| BASEBALL (BATTING) | SOUND GENERATED BY HITTING BALL DURING SWING | 0.05 SECONDS AROUND IMPACT SOUND | SPECIFIC RANGE BEFORE PHOTOGRAPHING TRIGGER | 1.5 SECONDS BEFORE AND 0.5 SECONDS AFTER IMPACT SOUND (TOTAL 2.0 SECONDS) |
| TENNIS (SERVICE) | SOUND GENERATED BY HITTING BALL | 0.05 SECONDS AROUND IMPACT SOUND | RANGE FROM PHOTOGRAPHING TRIGGER UNTIL SOUND OF SPECIFIC VALUE OR HIGHER IS FIRSTLY DETECTED | 2.5 SECONDS BEFORE AND 0.5 SECONDS AFTER IMPACT SOUND (TOTAL 3.0 SECONDS) |
| ROOF TILE BREAKING | SOUND GENERATED BY BREAKING ROOF TILES WITH HAND | 0.1 SECONDS AROUND IMPACT SOUND | RANGE FROM PHOTOGRAPHING TRIGGER UNTIL SOUND OF SPECIFIC VALUE OR HIGHER IS FIRSTLY DETECTED | 1.5 SECONDS BEFORE AND 0.5 SECONDS AFTER IMPACT SOUND (TOTAL 2.0 SECONDS) |
| FIREWORKS | SOUND AT THE MOMENT OF EXPLOSION IN THE SKY | 0.1 SECONDS AROUND IMPACT SOUND | SPECIFIC RANGE BEFORE PHOTOGRAPHING TRIGGER | 0.1 SECONDS BEFORE AND 5.1 SECONDS AFTER IMPACT SOUND (TOTAL 5.2 SECONDS) |

610

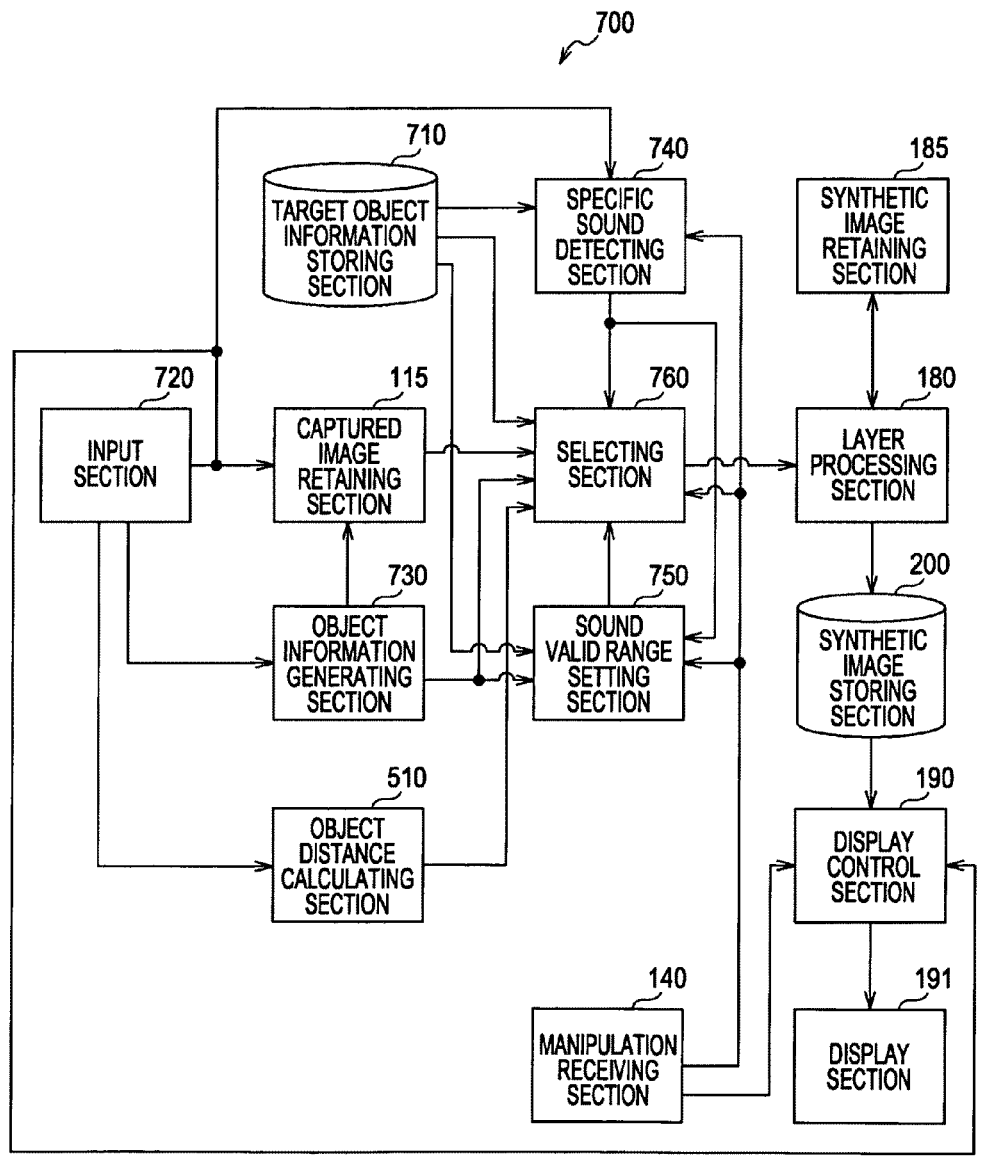

FIG. 28

| | IMPACT SOUND 711 | HIGH SPEED MOTION RANGE 712 | TRIGGER FOR DETERMINING SOUND VALID RANGE 713 | SOUND VALID RANGE 714 | SYNTHESIS TARGET IMAGE SELECTION RANGE 715 |
|---|---|---|---|---|---|
| GOLF | SOUND GENERATED BY HITTING BALL DURING SWING | 0.05 SECONDS AROUND IMPACT SOUND | WHEN GREAT CHEER OF SPECTATORS IS DETECTED | SPECIFIC RANGE BEFORE TRIGGER | 1.5 SECONDS BEFORE AND 0.5 SECONDS AFTER IMPACT SOUND (TOTAL 2.0 SECONDS) |
| BASEBALL (BATTING) | SOUND GENERATED BY HITTING BALL DURING SWING | 0.05 SECONDS AROUND IMPACT SOUND | WHEN GREAT CHEER OF SPECTATORS IS DETECTED | SPECIFIC RANGE BEFORE TRIGGER | 1.5 SECONDS BEFORE AND 0.5 SECONDS AFTER IMPACT SOUND (TOTAL 2.0 SECONDS) |
| TENNIS (SERVICE) | SOUND GENERATED BY HITTING BALL | 0.05 SECONDS AROUND IMPACT SOUND | WHEN FACE TURNS UP FOR A PREDETERMINED TIME | RANGE FROM TRIGGER UNTIL SOUND OF SPECIFIC VALUE OR HIGHER IS FIRSTLY DETECTED | 2.5 SECONDS BEFORE AND 0.5 SECONDS AFTER IMPACT SOUND (TOTAL 3.0 SECONDS) |
| ROOF TILE BREAKING | SOUND GENERATED BY BREAKING ROOF TILES WITH HAND | 0.1 SECONDS AROUND IMPACT SOUND | WHEN FACE IS FULL OF FIGHTING SPIRIT | RANGE FROM TRIGGER UNTIL SOUND OF SPECIFIC VALUE OR HIGHER IS FIRSTLY DETECTED | 1.5 SECONDS BEFORE AND 0.5 SECONDS AFTER IMPACT SOUND (TOTAL 2.0 SECONDS) |
| FIREWORKS | SOUND AT THE MOMENT OF EXPLOSION IN THE SKY | 0.1 SECONDS AROUND IMPACT SOUND | WHEN DARK STATE IN SCREEN IS TRANSITED TO BRIGHT STATE | SPECIFIC RANGE BEFORE TRIGGER | 0.1 SECONDS BEFORE AND 5.1 SECONDS AFTER IMPACT SOUND (TOTAL 5.2 SECONDS) |

710

IMAGE CAPTURING APPARATUS, IMAGE PROCESSING APPARATUS, CONTROL METHOD THEREOF AND PROGRAM

CROSS-REFERENCE TO RELATED APPLICATION

The present application claims priority from Japanese Patent Application No. JP 2009-264617 filed in the Japanese Patent Office on Nov. 20, 2009, the entire content of which is incorporated herein by reference.

BACKGROUND OF THE INVENTION

1. Field of the Invention

The present invention relates to an image capturing apparatus, and more particularly, to an image capturing apparatus, an image processing apparatus and a control method thereof for processing a plurality of images which continues in a time-series manner, and a program for allowing the method to be executed on a computer.

2. Description of the Related Art

In recent years, image capturing apparatuses are widely used such as a digital still camera, a digital video camera (for example, integrated camera recorder) or the like which generates image data by imaging objects such as people and records the generated image data as contents such as image files, moving image files or the like. Further, recording of images of sport, for example, golf, baseball or the like, as contents is widely used such an image capturing apparatus. The contents (for example, moving image contents) recorded in this way can be used, for example, for checking actions in sport (for example, a golf swing or batting (baseball)).

For example, in the case of confirming a sport action (for example, a golf swing or batting (baseball)), there has been proposed a synthetic image generation method which generates an image representing motion transitions as a synthetic image so that the motion transitions can be easily grasped. For example, there is proposed an image capturing apparatus which selects a plurality of images from images which are continuously shot at a predetermined intervals and generates a synthetic image using the selected plurality of images (refer to Japanese Unexamined Patent Application Publication No. 2009-44573 (FIG. 9), for example).

SUMMARY OF THE INVENTION

According to the above-described related art, it is possible to generate a synthetic image representing motion transitions of a person performing a golf swing, for example.

In this respect, for example, since the motion of a golf swing or batting (baseball) is performed in a relatively short time, when generating a synthetic image representing motion transitions, it is important to appropriately select images forming the synthetic image. However, in the above-described related art, a range for selection of a plurality of images to be used for generating the synthetic image is determined with reference to the time of a start manipulation by a user. Thus, for example, in a case where the user is not accustomed to photographing or is a beginner, it may be difficult to appropriately perform the start manipulation with respect to the golf swing or batting (baseball) which are performed in a relatively short time. In a case where the start manipulation is not appropriately performed in this way, if the synthetic image is generated using the plurality of images included in the range determined with reference to the start manipulation time, an appropriate synthetic image may not be generated. In this case, a processing time for the generation of the synthetic image becomes lengthened, and a chance to photograph an appropriate synthetic image may be lost.

Accordingly, it is desirable to provide a technique which can appropriately generate a synthetic image representing the transitions of a specific motion conducted by a target object.

According to an embodiment of the present invention, there are provided an image processing apparatus, a control method thereof and a program for causing the method to be executed on a computer, the image capturing apparatus including: a specific sound detecting section which detects a specific sound generated during motion of a specific motion conducted by a target object included in an image group including a plurality of images which continues in a time-series manner; a synthetic image generating section which generates a synthetic image representing transitions of the specific motion using a predetermined number of images included in a selection range of the image group in a time axis, with reference to a detection position of the detected specific sound in the time axis; a determination range setting section which sets, as a determination range, a range in the time axis for determination on the generation of the synthetic image on the basis of a user manipulation; and a control section which controls the synthetic image generating section to generate the synthetic image using the detected specific sound in a case where the specific sound is detected in the set determination range and controls the synthetic image generating section not to generate the synthetic image in a case where the specific sound is not detected in the set determination range. Accordingly, it is possible to set the determination range on the basis of the user manipulation relating to the image capturing operation by means of the image capturing section, and to control the synthetic image generating section to generate the synthetic image using the detected specific sound in the case where the specific sound is detected in the set determination range and to control the synthetic image generating section not to generate the synthetic image in the case where the specific sound is not detected in the set determination range.

In this embodiment, the user manipulation may be a specific manipulation received when the specific motion is terminated or a timer setting manipulation for such a setting that a termination time of the specific motion becomes a termination time of a time counter, and the determination range setting section may set the determination range with reference to a position in the time axis where the specific manipulation is received in a case where the user manipulation is the specific manipulation, and may set the determination range with reference to the termination time of the time counter by means of the timer setting manipulation in a case where the user manipulation is the timer setting manipulation. Accordingly, it is possible to set the determination range with reference to the position where the specific manipulation is received in the case where the user manipulation is the specific manipulation, and to set the determination range with reference to the termination time of the time counter by means of the timer setting manipulation in the case where the user manipulation is the timer setting manipulation.

In this embodiment, the determination range setting section may narrow the determination range set in the case where the user manipulation is the specific manipulation compared with the determination range set in the case where the user manipulation is the timer setting manipulation. Accordingly, it is possible to narrow the determination range set in the case where the user manipulation is the specific manipulation compared with the determination range set in the case where the user manipulation is the timer setting manipulation.

In this embodiment, the apparatus may further include an object distance calculating section which calculates a distance to the target object; and a delay time calculating section which calculates a delay time of the detected specific sound on the basis of the calculated distance, and the control section may correct the detection position of the detected specific sound in the time axis on the basis of the calculated delay time and determines whether or not to allow the synthetic image generating section to generate the synthetic image according to whether the corrected detection position exists in the set determination range. Accordingly, it is possible to calculate the distance to the target object, calculate the delay time of the detected specific sound on the basis of the calculated distance, correct the detection position of the detected specific sound on the basis of the calculated delay time, and to determine whether or not to allow the synthetic image generating section to generate the synthetic image according to whether the corrected detection position exists in the set determination range.

In this embodiment, the apparatus may further include a determining section which determines the selection range with reference to the corrected detection position in a case where the corrected detection position exists in the set determination range. Accordingly, it is possible to determine the selection range with reference to the corrected detection position in the case where the corrected detection position exists in the set determination range.

In this embodiment, the synthetic image generating section may make a selection interval close in a range narrower than the selection range having, as a central position, the detection position of the specific sound in the time axis compared with other selection intervals, with respect to the selection interval of the predetermined number of images in the selection range. Accordingly, it is possible to make the selection interval close in the range narrower than the selection range having, as the central position, the detection position of the specific sound compared with other selection intervals, with respect to the selection interval of the predetermined number of images in the selection range.

In this embodiment, the apparatus may further include: a storing section which stores the specific sounds and the determination ranges relating to a plurality of types of specific motions; and a manipulation receiving section which receives a designating manipulation for designating a desired specific motion from among the plurality of types of specific motions in which the specific sounds and the determination ranges are stored. Here, the specific sound detecting section may detect the specific sound relating to the designated specific motion, and the determination range setting section may set the determination range relating to the designated specific motion on the basis of the user manipulation. Accordingly, if the designating manipulation for designating the desired specific motion from among the plurality of types of specific motions is received, it is possible to detect the specific sound relating to the designated specific motion, and to set the determination range relating to the designated specific motion on the basis of the user manipulation.

According to another embodiment of the present invention, there is provided an image capturing apparatus, a control method thereof and a program for causing the method to be executed on a computer, the image capturing apparatus including: an image capturing section which images an object to generate a plurality of images which continues in a time-series manner; a specific sound detecting section which detects a specific sound generated during motion of a specific motion conducted by a target object included in an image group including the plurality of images; a synthetic image generating section which generates a synthetic image representing transitions of the specific motion using a predetermined number of images included in a selection range of the image group in a time axis, with reference to a detection position of the detected specific sound in the time axis; a determination range setting section which sets, as a determination range, a range in the time axis for determination on the generation of the synthetic image on the basis of a user manipulation relating to an image capturing operation by means of the image capturing section; and a control section which controls the synthetic image generating section to generate the synthetic image using the detected specific sound in a case where the specific sound is detected in the set determination range, and controls the synthetic image generating section not to generate the synthetic image in a case where the specific sound is not detected in the set determination range.

According to another embodiment of the present invention, there is provided an image processing apparatus, a control method thereof and a program for causing the method to be executed on a computer, the image capturing apparatus including: a specific sound detecting section which detects a specific sound generated during motion of a specific motion conducted by a target object included in an image group including a plurality of images which continues in a time-series manner; a certain change detecting section which detects a certain change in a time axis between the respective images forming the image group; a synthetic image generating section which generates a synthetic image representing the transitions of the specific motion using a predetermined number of images included in a selection range of the image group in a time axis, with reference to a detection position of the detected specific sound in the time axis; a determination range setting section which sets, as a determination range, a range in the time axis for determination on the generation of the synthetic image on the basis of a position in the time axis in which the certain change is detected; and a control section which controls the synthetic image generating section to generate the synthetic image using the detected specific sound in a case where the specific sound is detected in the set determination range, and the synthetic image generating section not to generate the synthetic image in a case where the specific sound is not detected in the set determination range. Accordingly, it is possible to set the determination range on the basis of the position in which the certain change is detected, and to control the synthetic image generating section to generate the synthetic image using the detected specific sound in the case where the specific sound is detected in the set determination range, and to control the synthetic image generating section not to generate the synthetic image in the case where the specific sound is not detected in the set determination range.

According to another embodiment of the present invention, there is provided an image capturing apparatus, a control method thereof and a program for causing the method to be executed on a computer, the image capturing apparatus including: an image capturing section which images an object to generate a plurality of images which continues in a time-series manner; a specific sound detecting section which detects a specific sound generated during motion of a specific motion conducted by a target object included in an image group including a plurality of images which continues in a time-series manner; a certain change detecting section which detects a certain change in a time axis between the respective images forming the image group; a synthetic image generating section which generates a synthetic image representing transitions of the specific motion using a predetermined number of images included in a selection range of the image group in a time axis, with reference to a detection position of the detected specific sound in the time axis; a determination range setting section which sets, as a determination range, a range in the time axis for determination on the generation of the synthetic image on the basis of a position in the time axis in which the certain change is detected; and a control section which controls the synthetic image generating section to generate the synthetic image using the detected specific sound in a case where the specific sound is detected in the set determination range, and the synthetic image generating section not to generate the synthetic image in a case where the specific sound is not detected in the set determination range.

In this embodiment, the certain change detecting section may detect the certain change using at least one of a characteristic amount extracted from each image forming the image group and a characteristic amount extracted on the basis of a sound relating to each image forming the image group. Accordingly, it is possible to detect the certain change using at least one of the characteristic amount extracted from each image forming the image group and the characteristic amount extracted on the basis of the sound relating to each image forming the image group.

According to the embodiments of the invention, it is possible to appropriately generate the synthetic image representing the transitions of the specific motion conducted by the target object.

BRIEF DESCRIPTION OF THE DRAWINGS

FIGS. 6A and 6B are diagrams illustrating an example of transitions of a display screen displayed on a display section according to a first embodiment of the present invention.

FIGS. 8A, 8B, 8C and 8D are diagrams schematically illustrating an example of a flow of a selection process of synthesis target images by a selecting section and a generation process of a synthetic image by a layer processing section, according to a first embodiment of the present invention.

FIG. 24 is a diagram illustrating an example of stored contents of a target object information storing section according to a third embodiment of the present invention.

FIG. 27 is a block diagram illustrating an example of a functional configuration of an image processing apparatus according to a fourth embodiment of the present invention.

FIG. 28 is a diagram illustrating an example of stored contents of a target object information storing section according to a fourth embodiment of the present invention.

DESCRIPTION OF THE PREFERRED EMBODIMENTS

Hereinafter, embodiments for carrying out the present invention will be described in the following order.

1. First embodiment (synthetic image generation control: an example of setting a valid sound range on the basis of user manipulation)
2. Second embodiment (synthetic image generation control: an example of calculating an object distance and correcting an impact sound detecting position)
3. Third embodiment (synthetic image generation control: an example of designating a desired object from a plurality of objects and generating a synthetic image relating to the object)
4. Fourth embodiment (synthetic image generation control: an example of generating a synthetic image in recorded image contents)

1. First Embodiment

Configuration Example of Image Capturing Apparatus

Figure 1:
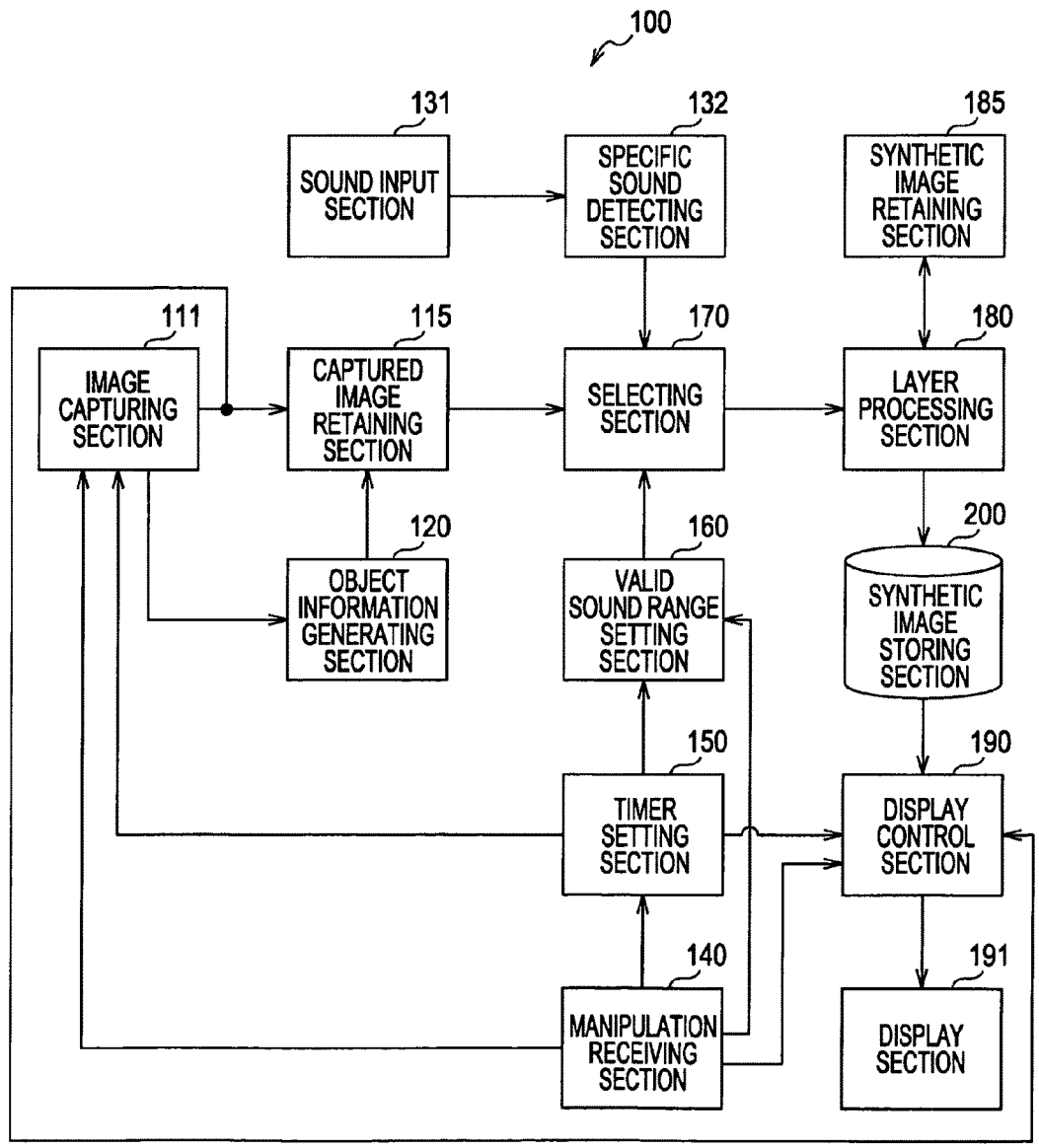
FIG. 1 is a block diagram illustrating an example of a functional configuration of an image capturing apparatus according to a first embodiment of the present invention.

FIG. 1 is a block diagram illustrating an example of a functional configuration of an image capturing apparatus 100 according to a first embodiment of the present invention. The image capturing apparatus 100 includes an image capturing section 111, an object information generating section 120, a captured image retaining section 115, a sound input section 131, a specific sound detecting section 132, a manipulation receiving section 140, and a timer setting section 150. Further, the image capturing apparatus 100 includes a valid sound range setting section 160, a selecting section 170, a layer processing section 180, a synthetic image retaining section 185, a display control section 190, a display section 191, and a synthetic image storing section 200. For example, the image capturing apparatus 100 can be realized by a digital video camera which can image an object to generate a captured image (image data), extract each characteristic amount for the image data by image analysis, and perform a variety of image processes using the each extracted characteristic amount.

The image capturing section 111 includes an image capturing element (for example, an image capturing element 112 shown in FIG. 19) which transforms light of an object incident through a lens (not shown) into an electric signal, and a signal processing section (not shown) which processes an output signal of the image capturing element to generate a captured image (image data). That is, in the image capturing section 111, an optical image of the object incident through the lens is formed on an imaging surface of the image capturing element, the image capturing element performs an image capturing operation in this state, and the signal processing section performs a signal process for the imaging signal, and thus, the captured image is generated. The captured image is generated on the basis of start instruction information of the image capturing operation output from the manipulation receiving section 140 or the timer setting section 150. Further, the generated captured image is supplied to and retained in the captured image retaining section 115. In addition, the generated captured image is supplied to the display control section 190 and then is displayed on the display section 191. Further, the generated captured image, and the position and focusing position of each lens (for example, a focus lens and a zoom lens) at the time of generation of the captured image are supplied to the object information generating section 120.

The captured image retaining section 115 is a ring buffer for retaining the captured image generated by the image capturing section 111 for a predetermined time, and supplies the retained captured image to the selecting section 170. Further, the captured image retaining section 115 retains the object information generated by the object information generating section 120 in relation to the captured image generated by the image capturing section 111. Here, the predetermined time when the captured image is retained in the captured image retaining section 115 can be 3 to 10 seconds, for example. That is, the latest the captured image generated by the image capturing section 111 and the object information generated by the object information generating section 120 is retained for 3 to 10 seconds in the captured image retaining section 115.

The object information generating section 120 generates object information relating to the captured image, on the basis of the captured image generated by the image capturing section 111 and each piece of information (for example, the position and focusing position of the lens) at the time of generation of the captured image. Further, the object information generating section 120 supplies the generated object information to the captured image retaining section 115 and allows it to be retained therein. The object information is information for discerning a target object region and a background region thereof from objects included in the captured image generated by the image capturing section 111, for example. As the object information, for example, a depth map is generated. Here, the depth map is data indicating the distance (object distance) from an image capturing position (for example, a position of the image capturing apparatus 100) to the object included in the captured image. As a technique of generating the depth map, for example, a technique such as TOF (time of flight), depth from defocus or the like may be used. For example, the TOF technique is a technique for calculating a distance to an object on the basis of the delay time during which light emitted from a light source is reflected from the object and reaches a sensor and the speed of the light.

The sound input section 131 obtains a sound around the image capturing apparatus 100, and outputs the obtained sound (sound data) to the specific sound detecting section 132. The sound input section 131 is realized by a plurality of microphones or the like, for example.

The specific sound detecting section 132 detects a specific sound on the basis of the sound output from the sound input section 131 and in a case where the specific sound is detected, outputs this to the selecting section 170. In the first embodiment of the present invention is exemplified a case where a sound (impact sound) generated at the moment that a golf club comes in contact with a golf ball during a golf swing is a specific sound. For example, the specific sound detecting section 132 stores a characteristic amount relating to a specific sound as specific sound identification information (reference data) in advance. Then, the specific sound detecting section 132 extracts the characteristic amount from the sound output from the sound input section 131 and compares the extracted characteristic amount and the specific sound identification information to calculate the similarity. In a case where the calculated similarity exceeds a threshold, the specific sound detecting section 132 determines that the sound output from the sound input section 131 is the specific sound. Specifically, the sound data output from the sound input section 131 is sampled by an AD (Analog to Digital) conversion process, and is converted into digital data. Further, a process such as a frequency analysis is performed for the digital data at an appropriate time interval, so that the digital data is converted into a parameter indicating a spectrum or other acoustic characteristics of the sound. Thus, the time-series characteristic amount for the sound is extracted. Further, a matching process with the extracted time-series characteristic amount is performed using the retained reference data, and then the sound recognition result is output as the result of the matching process. The sound analysis and recognition may be performed using various other existing methods.

The manipulation receiving section 140 receives manipulation contents manipulated by a user, and outputs a manipulation signal based on the received manipulation contents to the image capturing section 111, the timer setting section 150, the valid sound range setting section 160 and the display control section 190. For example, when receiving a synthetic image recording mode setting manipulation which instructs the setting of a synthetic image recording mode for generating the synthetic image, the manipulation receiving section 140 outputs a control signal for instructing a start of the image capturing operation to the image capturing section 111. Then, the manipulation receiving section 140 outputs a control signal for instructing a display start of the captured image to the display control section 190. The setting manipulation of the synthetic image recording mode is performed by a pressing manipulation of a setting button of the synthetic image recording mode, for example. Further, for example, when receiving a synthetic image recording mode release manipulation for instructing a release of the synthetic image recording mode, the manipulation receiving section 140 outputs a control signal for stopping the image capturing operation to the image capturing section 111. The synthetic image recording mode release manipulation is performed by a release button of the synthetic image recording mode, for example. Further, for example, when receiving a recording instruction manipulation of the synthetic image in a case where the synthetic image recording mode is set, the manipulation receiving section 140 outputs a control signal indicating that the recording instruction manipulation of the synthetic image is received to the valid sound range setting section 160. Then, the manipulation receiving section 140 outputs the control signal for stopping the image capturing operation to the image capturing section 111. The recording instruction manipulation of the synthetic image is performed by a video recording button (REC button), for example. Further, for example, when receiving a timer setting manipulation for performing the image capturing operation in the synthetic image recording mode by a timer setting, the manipulation receiving section 140 outputs a control signal for instructing the timer setting to the timer setting section 150. The timer setting manipulation is performed by a timer setting button, for example. Further, when the timer setting button is pressed, the setting manipulation of a counter value (for example, a setting of 8 to 17 seconds) may be performed. These manipulations may be input using a manipulation member such as buttons which are provided on the image capturing apparatus 100, and may be performed by wireless communication through a remote controller manipulation or the like.

The timer setting section 150 sets a timer (for example, a self timer function) for performing the image capturing operation in the synthetic image recording mode. Specifically, if the timer setting manipulation is received by the manipulation receiving section 140, the timer setting section 150 outputs the control signal for instructing the start of the image capturing operation to the image capturing section 111. Further, the timer setting section 150 outputs the control signal for instructing the display start of the captured image and the count value due to the timer setting to the display control section 190. In addition, after the display start of the count value, the timer setting section 150 sequentially outputs the count values according to the set contents to the display control section 190. Thus, as shown in FIGS. 6A and 6B, the captured image generated by the image capturing section 111 is displayed on the display section 191, and the count value is overlapped and displayed on the captured image. For example, a count value which is counted up one by one for every second is displayed on the display section 191. Further, in a case where the count value of the set timer is "zero", the timer setting section 150 outputs a control signal indicating the fact to the valid sound range setting section 160. Further, the timer setting section 150 outputs the control signal for stopping the image capturing operation to the image capturing section 111.

In a case where the synthetic image recording mode is set, the valid sound range setting section 160 sets a valid sound range for determining whether a specific sound detected by the specific sound detecting section 132 is valid or not. Further, the valid sound range setting section 160 outputs information about the set valid sound range (the valid sound range and the position in the time axis which serves as a reference at the time of setting the range) to the selecting section 170. Specifically, in a case where the recording instruction manipulation of the synthetic image is received by the manipulation receiving section 140, or in a case where the count value of the timer set by the timer setting section 150 becomes "zero", the valid sound range setting section 160 sets the valid sound range. Here, in a case where the recording instruction manipulation of the synthetic image is received by the manipulation receiving section 140, the position in the time axis in which the recording instruction manipulation of the synthetic image is received becomes the reference position. Further, the count value of the timer set by the timer setting section 150 becomes "zero", the position in the time axis in which the count value becomes "zero" becomes the reference position. These setting methods of the valid sound range will be described in detail with reference to FIGS. 5A to 7C and so on. Further, the valid sound range setting section 160 is an example of a determination range setting section disclosed in the claims.

The selecting section 170 selects synthesis target images used in the generation process of the synthetic image by means of the layer processing section 180, from the captured images retained in the captured image retaining section 115.

Further, the selecting section 170 outputs information about the selected synthesis target images (for example, the synthesis target images, object information about these images, and coordinates used in the generation process of the synthetic image) to the layer processing section 180. An internal configuration of the selecting section 170 will be described in detail with reference to FIG. 2. Further, the selecting section 170 is an example of a control section disclosed in the claims.

The layer processing section 180 generates the synthetic image using the synthesis target images selected by the selecting section 170 and then stores the generated synthetic image in the synthetic image storing section 200. An internal configuration of the layer processing section 180 will be described in detail with reference to FIG. 2. Further, the layer processing section 180 is an example of a synthetic image generating section disclosed in the claims.

The synthetic image retaining section 185 retains the synthetic image (history image) during the synthesis process at the time of the generation process of the synthetic image by means of the layer processing section 180, and supplies the retained synthetic image to the layer processing section 180. The synthetic image retaining section 185 will be described in detail with reference to FIG. 2.

The display control section 190 displays the synthetic image stored in the synthetic image storing section 200 or the captured image output from the image capturing section 111 on the display section 191, according to the manipulation input received by the manipulation receiving section 140. Further, the display control section 190 overlaps the count value of the timer set by the timer setting section 150 with the captured image to be displayed on the display section 191.

The display section 191 displays each image under the control of the display control section 190.

The synthetic image storing section 200 stores the synthetic image generated by the layer processing section 180 and supplies the stored synthetic image to the display control section 190.

Figure 2:
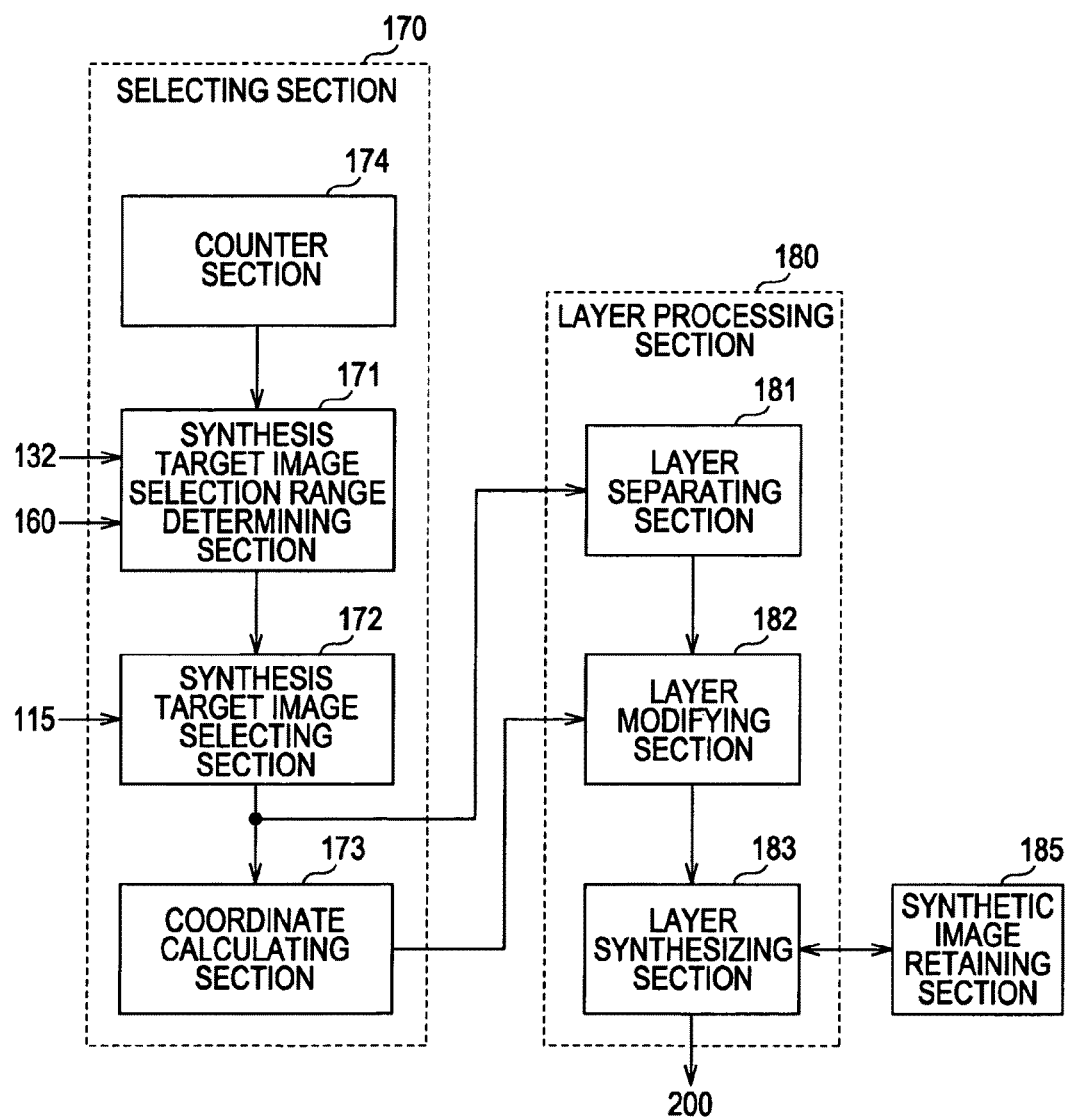
FIG. 2 is a block diagram illustrating an example of a functional configuration of a selecting section and a layer processing section according to a second embodiment of the present invention.

FIG. 2 is a block diagram illustrating an example of a functional configuration of the selecting section 170 and the layer processing section 180 according to a second embodiment of the present invention. The selecting section 170 includes the synthesis target image selection range determining section 171, the synthesis target image selecting section 172, a coordinate calculating section 173, and a counter section 174. Further, the layer processing section 180 includes the layer separating section 181, the layer modifying section 182 and a layer synthesizing section 183.

The synthesis target image selection range determining section 171 determines a range (synthesis target image selection range) for selecting the synthesis target images used in the generation process of the synthetic image by means of the layer processing section 180, among the captured images retained in the captured image retaining section 115. Specifically, the synthesis target image selection range determining section 171 determines the synthesis target image selection range, on the basis of the detection position (position in the time axis) of the specific sound detected by the specific sound detecting section 132 and the valid sound range set by the valid sound range setting section 160. For example, the synthesis target image selection range determining section 171 determines the synthesis target image selection range on the basis of the detection position of the specific sound, in a case where the detection position of the specific sound is included in the valid sound range. On the other hand, the synthesis target image selection range determining section 171 determines the synthesis target image selection range on the basis of the position in the time axis which becomes the reference at the time of setting the valid sound range, in a case where the detection position of the specific sound is not included in the valid sound range. Here, in a case where the recording instruction manipulation of the synthetic image is received by the manipulation receiving section 140, the position in the time axis in which the recording instruction manipulation of the synthetic image is received becomes the reference position. Further, in a case where the count value of the timer set by the timer setting section 150 becomes "zero", the position in the time axis in which the count value becomes "zero" becomes the reference position. Further, the synthesis target image selection range determining section 171 outputs the information about the determined synthesis target image selection range (for example, the synthesis target image selection range and object information about images included in this range) to the synthesis target image selecting section 172. The synthesis target image selection range determining section 171 is an example of a determining section disclosed in the claims.

The synthesis target image selecting section 172 selects the synthesis target images used in the generation process of the synthetic image by means of the layer processing section 180 from the respective images included in the synthesis target image selection range determined by the synthesis target image selection range determining section 171. For example, the synthesis target image selecting section 172 selects images at a predetermined time interval as the synthesis target images from the respective images (captured images retained in the captured image retaining section 115) included in the synthesis target image selection range determined by the synthesis target image selection range determining section 171. Further, for example, the synthesis target images may be selected to have an interval suitable for visualizing the motion transitions of the target object. Further, the synthesis target image selecting section 172 outputs the information about the selected synthesis target images (for example, the synthesis target images, object information about these images) to the coordinate calculating section 173 and the layer separating section 181.

The coordinate calculating section 173 calculates coordinates used in the generation process of the synthetic image by the layer processing section 180, with respect to each synthesis target image output from the synthesis target image selecting section 172, and outputs the calculated coordinates to the layer modifying section 182. In this coordinate calculation, a pixel position to be synthesized with the synthetic image relating to the synthesis target image which is the calculation target is calculated. That is, in this coordinate calculation, a pixel range (for example, a range including F0 and F10 shown in FIG. 8D) is calculated corresponding to the synthesis target images which are the calculation target among a synthetic image which is finally generated (for example, a synthetic image 402 shown in FIG. 8D).

The counter section 174 supplies a value of the counter (impact sound detection counter) used at the time of the synthesis target image selection range determination by the synthesis target image selection range determining section 171 to the synthesis target image selection range determining section 171. Here, the counter section 174 continuously increases the impact sound detection counter. Further, in a case where the fact that the specific sound is detected from the specific sound detecting section 132 is output to the synthesis target image selection range determining section 171, the value of the impact sound detection counter is reset to "zero" by the synthesis target image selection range determining section 171. Similarly, after the reset, the counter section 174 also continuously increases the impact sound detection counter. Further, the synthesis target image selection range determining section 171 estimates the impact sound detection position using the value of the impact sound detection counter at the time of the determination of the synthesis target image selection range. That is, at the time of the determination of the synthesis target image selection range, a position (preceding position in the time axis) preceding the determination time by the value of impact sound detection counter is estimated as the impact sound detection position.

The layer separating section 181 performs layer separation using corresponding object information, for the synthesis target images selected by the synthesis target image selecting section 172. Here, the term "layer" refers to each image obtained by separating the target object section and the background section for one image (frame). Further, the layer separating section 181 outputs each separated layer image to the layer modifying section 182.

The layer modifying section 182 performs a variety of modifying processes for generating the respective layer images output from the layer separating section 181 as the synthetic image, using the coordinates calculated by the coordinate calculating section 173. As this modifying process, geometric arithmetic processes such as cutout, scaling, rotation and coordinate movement are performed. For example, the scaling has its process contents determined according to the number of synthesis target images, the size of the synthetic image, or the like. Further, as the modifying process, image processing such as emphasis on a motion portion of the target object may be performed. In addition, the layer modifying section 182 outputs the layer image which is processed to the layer synthesizing section 183.

The layer synthesizing section 183 performs an image synthesis process for the layer image output from the layer modifying section 182, and stores the generated synthetic image to the synthetic image storing section 200. Specifically, the layer synthesizing section 183 synthesizes the respective layer images so that the layer image output from the layer modifying section 182 is arranged in a corresponding pixel range. Further, the layer synthesizing section 183 synthesizes the layer images which are immediately before the synthesis targets, and then sequentially retain the synthetic images (history images) in the synthetic image retaining section 185. Further, when performing the synthesis process of the layer images which become the next synthesis target, the layer synthesizing section 183 obtains, from the synthetic image retaining section 185, the synthetic images (history images) retained in the synthetic image retaining section 185, and uses them in the synthesis process.

The synthetic image retaining section 185 sequentially retains the synthetic images (history images) generated by the layer synthesizing section 183, and supplies the retained synthetic images to the layer synthesizing section 183. That is, the synthetic images generated by the layer synthesizing section 183 are sequentially updated and retained in the synthetic image retaining section 185.

Example of Transitions of Synthetic Image Generation Process

Next, an example of transitions of the generation process in a case where the synthetic image is generated will be briefly described.

Figure 3A:
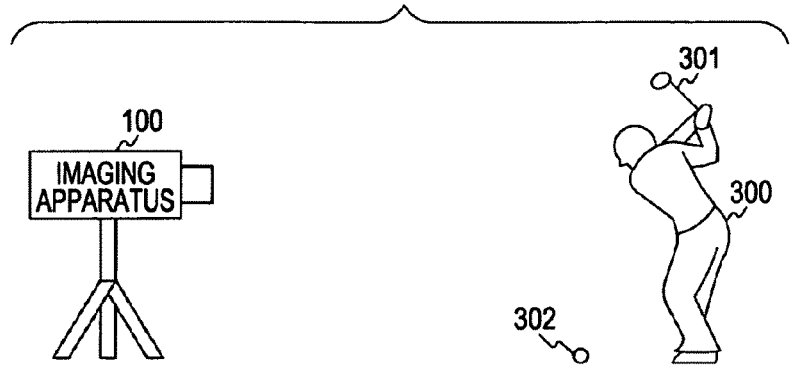
FIGS. 3A, 3B and 3C are diagrams schematically illustrating the positional relation between an image capturing apparatus and a person who is an image capturing target, and the relation between moving images generated from the positional relation, according to a first embodiment of the present invention.
Figure 3B:
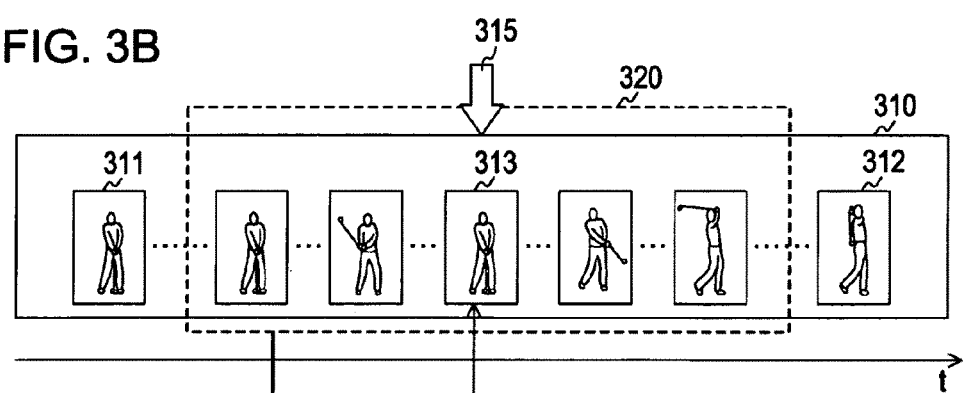
Figure 3C:
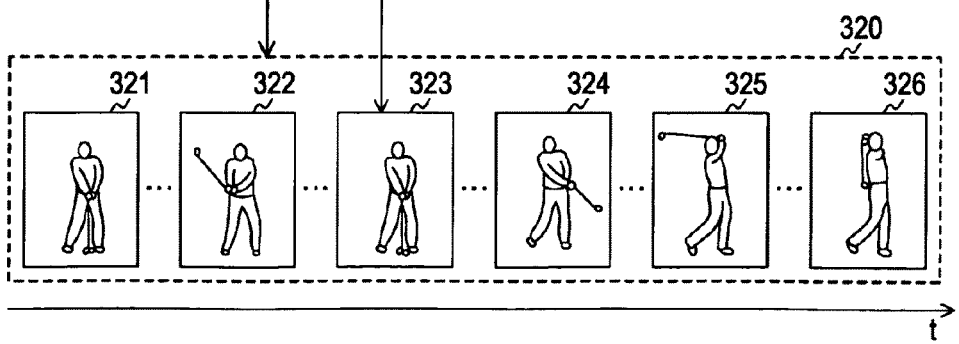

FIGS. 3A to 3C are diagrams schematically illustrating the positional relation of the image capturing apparatus 100 and a person 300 who is the image capturing target and the relation of moving images generated in this positional relation, according to the first embodiment of the present invention.

FIG. 3A schematically illustrates the positional relation between the image capturing apparatus 100 and the person 300 who is the image capturing target with respect to the image capturing apparatus 100. The person 300, for example, has a practice swing of a golf club 301 in a golf practice range. As the person 300 swings around the golf club 301 from a posture shown in FIG. 3A, the person 300 hits the golf ball 302 with the golf club 301 to drive the golf ball 302 in a desired direction.

FIG. 3B schematically illustrates a moving image 310 generated by the image capturing section 111 in a rectangular shape. Further, in FIG. 3B, in a rectangular shape corresponding to the moving image 310, some frames (images 311 to 313 and the like) among frames for forming the moving image 310 are arranged along a time axis. Further, the moving image 310 is a moving image obtained by imaging the appearance of the golf practice swing of the person 300 by the image capturing apparatus 100 in a state shown in FIG. 3A. Here, the image 311 is an image obtained by imaging a state where the person 300 is ready for the golf swing, and the image 312 is an image obtained by imaging a state where the person 300 views a direction where the golf ball 302 flies after the golf swing is finished. Further, the image 313 is an image obtained by imaging a state of the moment when the golf club 301 comes in contact with the golf ball 302 when the person 300 performs a golf swing. Here, when the person 300 performs the golf swing, a specific sound (impact sound) is generated at the moment when the golf club 301 comes in contact with the golf ball 302. The position in the moving image 310 in which the impact sound is generated is represented as an impact sound generation position 315.

In a case where the synthetic image indicating the transitions of the golf swing of the person 300 is generated using the moving image 310 thus generated, for example, a predetermined range (synthesis target image selection range) for selecting the synthesis target images is selected. The synthesis target image selection range is a range in which a series of motion transitions, for example, from the start of the golf swing to the end thereof is included. Further, in the predetermined range, the images which are the synthesis targets are selected and synthesized. This synthesis example is shown in FIG. 4B.

For example, as shown in FIG. 3B, a synthesis target image selection range 320 is determined in the moving image 310, and frames which satisfy a predetermined condition are determined as the synthesis target images, among respective frames included in the synthesis target image selection range 320.

In FIG. 3C, some frames (images 321 to 326) among the respective frames included in the synthesis target image selection range 320 determined in the moving image 310 shown in FIG. 3B are arranged along the time axis. Here, the moving image 321 is an image imaged when the person 300 starts the golf swing, and the image 326 is an image imaged when the person 300 finishes the golf swing. Further, the image 323 is an image corresponding to the image 313 shown in FIG. 3B. In addition, the images 322, 324 and 325 are images obtained by sequentially imaging the motion transitions of the person 300 who performs the golf swing in a time-series manner, between the images 321 and 326.

Figure 4A:
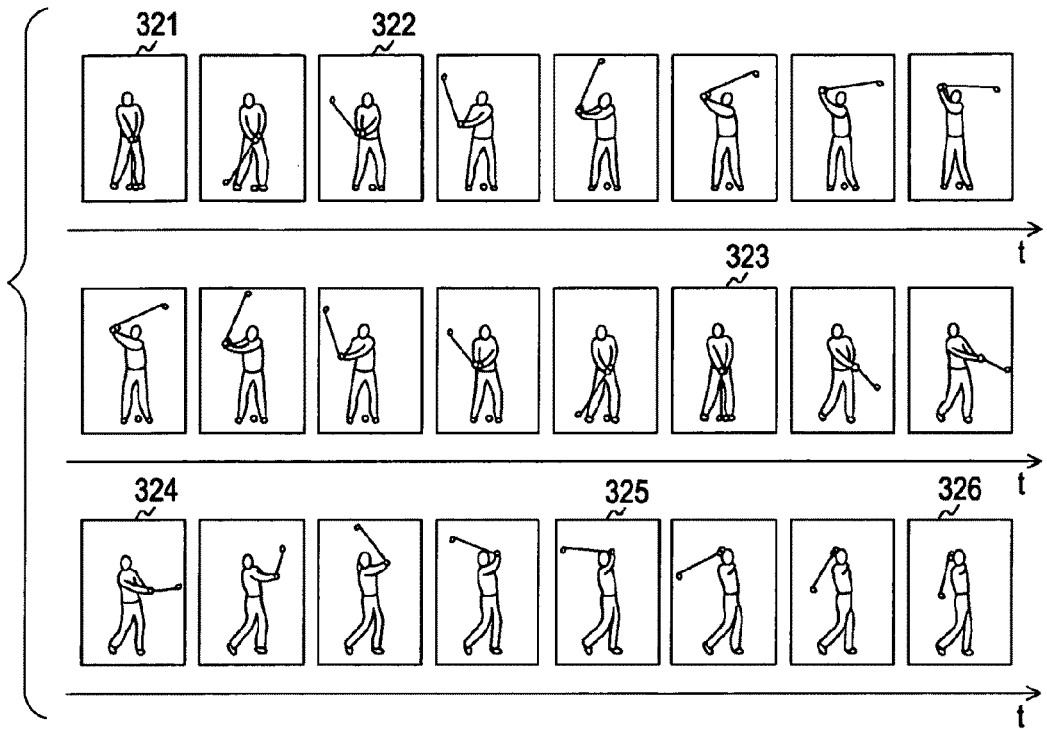
FIGS. 4A and 4B are diagrams illustrating an example of synthesis target images selected by a synthesis target image selecting section and a synthetic image generated by a layer processing section, according to a first embodiment of the present invention.
Figure 4B:
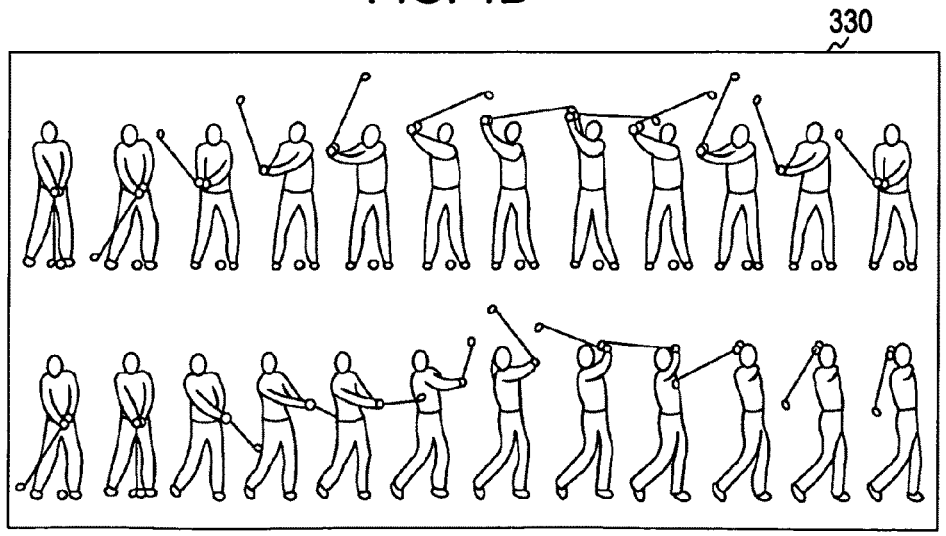

FIGS. 4A and 4B are diagrams illustrating an example of the synthesis target images selected by the synthesis target image selecting section 172 and the synthetic image generated by a layer processing section 180, according to the first embodiment of the present invention. In FIG. 4A, 24 images selected as the synthesis target images among the respective frames included in the synthesis target image selection range 320 in the moving image 310 shown in FIG. 3B are arranged in a time-series manner. Images including the same object as the images 321 to 326 shown in FIG. 3C among the 24 images shown in FIG. 4A are given the same reference numbers. Here, as the selection method of the synthesis target images, for example, a selection method for selecting frames at a predetermined interval as the synthesis target images may be used. Further, for example, it may be considered that the motion transitions around the time when the golf ball 301 comes in contact with the golf ball 302 are minutely confirmed in some cases. In this case, an interval of the neighboring images of the image (for example, the image 323) when the impact sound is generated may be closer than other intervals to select the synthesis target images.

FIG. 4B schematically illustrates the synthetic image 330 generated by the layer processing section 180. In this way, the synthesis target image selection range in which the motion transitions from the start of the golf swing of the person 300 to the end thereof are included is determined and the synthesis target images are selected in the synthesis target image selection range for synthesis. Thus, the synthetic image indicating the motion transitions of the golf swing of the person 300 can be generated.

As described above, in a case where the synthetic image is generated from the moving image 310, it is important to appropriately select the synthesis target image selection range for selection of the synthesis target images. However, since the golf swing is performed in a relatively short time, it may be difficult to appropriately select the synthesis target image selection range from the moving image 310. That is, it may be difficult to select the synthesis target image selection range from the moving image 310 including images ranging from an image including a state before the start of the golf swing of the person 300 to an image including a state after the end of the golf swing.

Here, as described above, the impact sound is generated in the middle of the golf swing. In this way, since the impact sound is frequently generated in a predetermined position during the golf swing, the synthesis target image selection range may be selected on the basis of the impact sound. However, in a case where the person 300 practices at a golf practice range where there are a lot of other people, it is highly likely that the impact sound is generated by the golf swing of a person other than the person 300 as the person 300 gets ready for a golf swing or the like. That is, in a case where an instant motion relating to sport causing the impact sound is appropriately recorded, if the detected impact sound is always valid, it is highly likely to mistakenly detect an impact sound from a person other than a detection target. For this reason, in a case where the synthetic image relating to the person 300 is generated, it is important to appropriately detect the impact sound generated by the golf swing of the person 300 when the synthesis target image selection range is selected on the basis of the impact sound. Thus, in the first embodiment of the present invention, an example that a valid sound range is provided in which only adjacent timing around a photographing trigger based on the user manipulation is valid is set to reduce the false detection of the impact sound. The synthesis target image selection range is set using only the impact sound detected in the valid sound range, to thereby select appropriate synthesis target images.

Figure 5A:
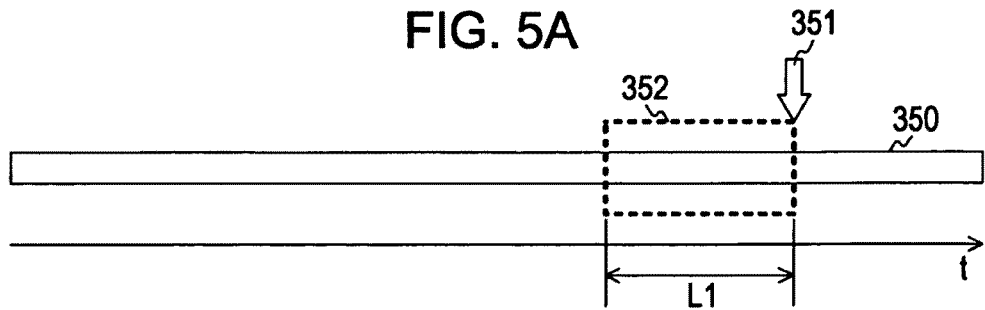
FIGS. 5A, 5B and 5C are diagrams schematically illustrating a setting method of a valid sound range by a valid sound range setting section and a determination method of a synthesis target image selection range by a synthesis target image selection range determining section, according to a first embodiment of the present invention.
Figure 5B:
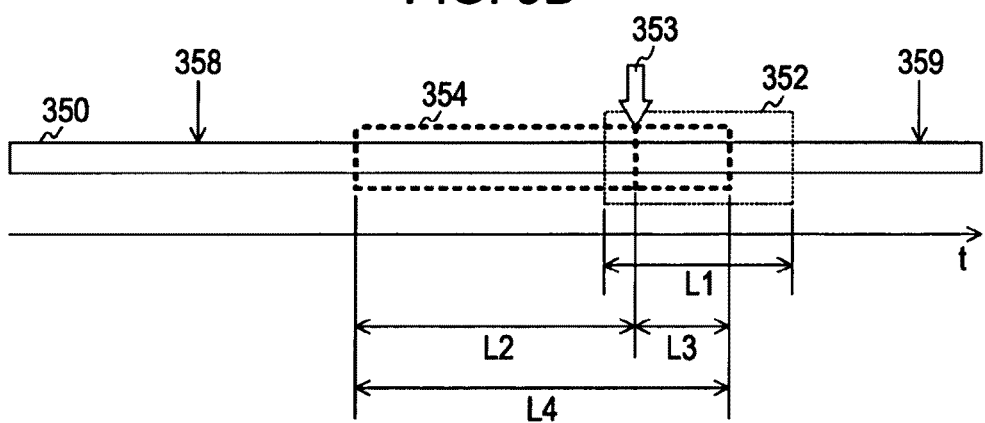
Figure 5C:
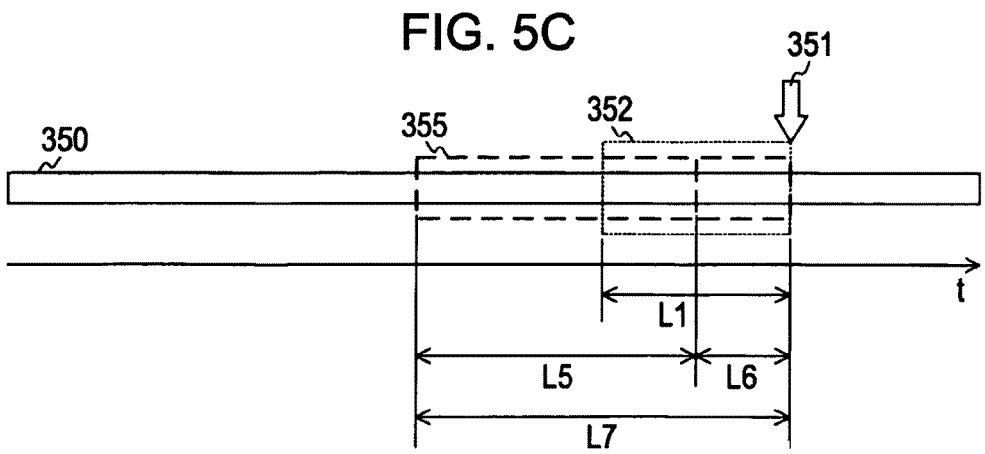

Determination Example of Synthesis Target Image Selection Range Based on Video Recording Button Manipulation FIGS. 5A, 5B and 5C are diagrams schematically illustrating a setting method of a valid sound range by the valid sound range setting section 160 and a determination method of a synthesis target image selection range by the synthesis target image selection range determining section 171, according to the first embodiment of the present invention.

FIG. 5A schematically illustrates a moving image 350 generated by the image capturing section 111 in a rectangular shape. Further, in a similar way to the example shown in FIG. 3B, the moving image 350 is a moving image obtained by imaging a golf practice swing of a person (for example, Koda Goro) by the image capturing apparatus 100. Here, it is assumed that Koda Goro asks his friend (for example, Otogawa Rokuro) to photograph his golf swing. In this case, Otogawa Rokuro holds the image capturing apparatus 100 with his hands with an optical axis direction thereof being toward Koda Goro, and presses a setting button of a synthetic image recording mode. If the press manipulation is received by the manipulation receiving section 140, captured images are generated by the image capturing section 111, and the generated captured images are sequentially retained in the imaging image retaining section 115. Further, the display control section 190 sequentially displays the generated captured images (so-called through images) on the display section 191. In this way, in a state where Otogawa Rokuro performs photographing using the image capturing apparatus 100 in which the synthetic image recording mode is set, Koda Goro performs a golf swing. Right after Koda Goro finishes the golf swing, Otogawa Rokuro rapidly presses the video recording button. If the press manipulation is received by the manipulation receiving section 140, the valid sound range setting section 160 sets the valid sound range.

For example, it is assumed that a position (position in the time axis) where the video recording button is pressed by Otogawa Rokuro is a press position (video recording button press position 351) of the video recording button in the time axis of the moving image 350 shown in FIG. 5A. In this case, the valid sound range setting section 160 sets a valid sound range 352 on the basis of the video recording button press position 351. Specifically, the valid sound range setting section 160 sets a range which precedes the video recording button press position 351 by a time L1 in the time axis, as the valid sound range 352. In this example, since the pressing (photographing trigger) of the video recording button may be generated after the end of a series of golf swing motions, the generation position of the impact sound may exist before the timing of the photographing trigger. Accordingly, this example is an example in which the valid sound range is set before the pressing of the video recording button.

Here, the time L1 can be 1.0 second, for example. The synthesis target image selection range is determined on the basis of the impact sound detected in the valid sound range set in this way. The determination method of the synthesis target image selection range will be described with reference to FIG. 5B. Further, in a case where the impact sound is not detected in the valid sound range set in this way, the synthesis target image selection range is determined on the basis of the video recording button press position 351. The determination method of the synthesis target image selection range will be described with reference to FIG. 5C.

FIG. 5B schematically illustrates a determination method of the synthesis target image selection range in a case where the impact sound is detected in the valid sound range 352 set by the valid sound range setting section 160. In FIG. 5B, the position (position in the time axis) where the impact sound is detected by the specific sound detecting section 132 is represented as an impact sound detection position 353. As shown in FIG. 5B, in the case where the impact sound is detected in the valid sound range 352 set by the valid sound range setting section 160, the synthesis target image selection range determining section 171 determines the synthesis target image selection range on the basis of the impact sound detection position 353. That is, the synthesis target image selection range determining section 171 determines a predetermined range before and after the impact sound detection position 353 in the time axis with reference to the impact sound detection position 353, as the synthesis target image selection range 354. Specifically, the synthesis target image selection range determining section 171 determines a range L4, which includes a range which precedes the impact sound detection position 353 by a time L2 and a range which exceeds the impact sound detection position 353 by a time L3, in the time axis, as a synthesis target image selection range 354.

Here, in consideration of the rotation speed of the golf club, the time during a golf swing after the golf club comes in contact with the golf ball is shorter than the time before the golf club comes in contact with the golf ball. That is, the time during a golf swing after the impact sound is generated is shorter than the time before the impact sound is generated. Thus, the synthesis target image selection range 354 is determined so that the time L2 before the impact sound detection position 353 is longer than the time L3 thereafter. For example, the time L2 can be 1.5 seconds and the time L3 can be 0.5 seconds. In this way, as the synthesis target image selection range is determined on the basis of the impact sound detected in the valid sound range, an appropriate synthesis target image selection range can be determined.

Here, it is assumed that an impact sound is detected in positions (for example, positions indicated by arrows 358 and 359 shown in FIG. 5B) other than the valid sound range 352 set by the valid sound range setting section 160. In a case where the impact sound is detected in the positions other than the valid sound range 352, the impact sound is not used for determination of the synthesis target image selection range. In a case where the impact sound is not used, as shown in FIG. 5C, the synthesis target image selection range can be determined on the basis of the press position of the video recording button. Further, in a case where the impact sound is detected in the positions other than the valid sound range 352, the impact sound is not used for determination of the synthesis target image selection range, but may be used for the generation process of the next synthetic image.

FIG. 5C schematically illustrates a determination method of the synthesis target image selection range in a case where the impact sound is not detected in the valid sound range 352 set by the valid sound range setting section 160. In FIG. 5C, in a similar way to the case of FIG. 5A, a position where the video recording button is pressed is represented as the video recording button press position 351. As shown in FIG. 5C, in a case where the impact sound is not detected in the valid sound range 352, the synthesis target image selection range determining section 171 determines the synthesis target image selection range on the basis of the video recording button press position 351. That is, the synthesis target image selection range determining section 171 determines a predetermined range before the video recording button press position 351 in the time axis with reference to the video recording button press position 351, as a synthesis target image selection range 355. Specifically, the synthesis target image selection range determining section 171 determines a range which precedes the impact sound detection position 353 by a time L7 (L5+L6) in the time axis, as the synthesis target image selection range 355. In this way, in a case where the impact sound is not detected in the valid sound range 352, a position, which precedes the press position of the video recording button by a time L6 in the time axis, is considered as the impact sound detection position to determine the synthesis target image selection range 355. That is, the times L5 and L6 correspond to the times L2 and L3 shown in FIG. 5B. Here, for example, in a similar way to the case of FIG. 5B, the time L7 can be 2.0 seconds. That is, the time L5 is 1.5 seconds and the time L6 is 0.5 seconds. However, in a case where the synthesis target image selection range is determined on the basis of the video recording button press position, since the synthesis target image selection range is determined on the basis of the user manipulation, accuracy may be decreased compared with the synthesis target image selection range 354 shown in FIG. 5B. Thus, in a case where the synthesis target image selection range is determined on the basis of the video recording button press position, for example, the time L7 may be longer than the time L4 to determine the synthesis target image selection range.

Further, these times L1 to L7 may be changed by the user manipulation.

Determination Example of Synthesis Target Image Selection Range Based on Timer

FIGS. 6A and 6B are diagrams illustrating an example of transitions of a display screen displayed on the display section 191 according to the first embodiment of the present invention. FIG. 6A illustrates a display example (display screen 370) in which a count value "17" (372) of a timer set by the timer setting section 150 is overlapped with an image generated by the image capturing section 111 before the start of the golf swing of the person 300. FIG. 6B illustrates a display example (display screen 371) in which a count value "0" (373) of the timer set by the timer setting section 150 is overlapped with an image generated by the image capturing section 111 at the end of the golf swing of the person 300.

In this example, it is assumed that the person 300 (for example, Koda Goro) photographs his appearance of golf practice swing by himself. In this case, for example, Koda Goro who is practicing installs the image capturing apparatus 100 so that the optical axis direction thereof is directed toward himself, as shown in FIG. 3A, and then presses a timer setting button. Through this press manipulation, captured images are generated by the image capturing section 111, and the display control section 190 displays the generated captured images (so-called through images) on the display section 191. Further, the timer setting section 150 sets the timer through the press manipulation of the timer setting button, and the display control section 190 overlaps the count value (for example, 17 seconds) corresponding to the set contents with the through images to be displayed on the display section 191. For example, as shown in FIG. 6A, after the press of the timer setting button, the display screen 370 is displayed in which the count value "17" (372) of the timer set by the timer setting section 150 is overlapped with the captured image including the person 300 who is ready for the golf swing. Thereafter, similarly, a display screen in which the count values (for example, values decreased from 17 seconds at intervals of one second) of the timer are overlapped with the captured image including the person 300 is displayed on the display section 191. The person 300 performs the golf swing so that the golf swing is terminated around the time when the count value of the timer becomes "0" while viewing the display screen displayed on the display section 191 in this way. Further, in a case where the count value of the timer is "0", the valid sound range setting section 160 sets the valid sound range. Then, the imaging motion is stopped after a predetermined time. The setting method of the valid sound range will be described in detail with reference to FIGS. 7A, 7B and 7C.

As the timer setting is performed as described above, for example, even in a case where a friend does not perform the photographing, the person 300 can easily photograph the appearance of the golf swing of his own.

Figure 7A:
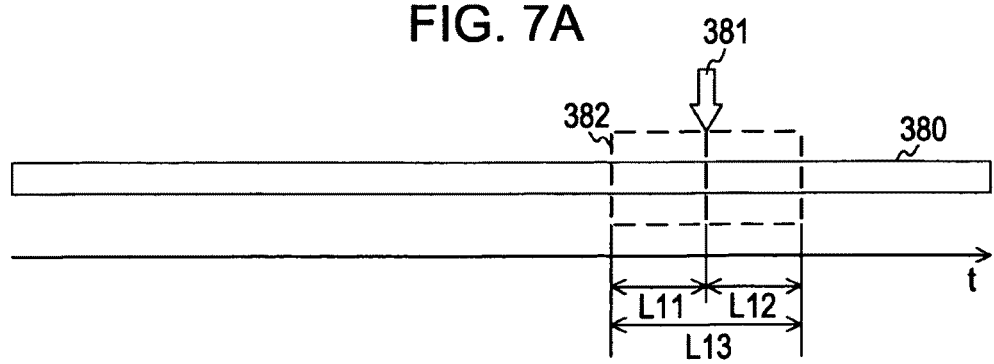
FIGS. 7A, 7B and 7C are diagrams schematically illustrating a setting method of a valid sound range by a valid sound range setting section and a determination method of a synthesis target image selection range by a synthesis target image selection range determining section, according to a first embodiment of the present invention.
Figure 7B:
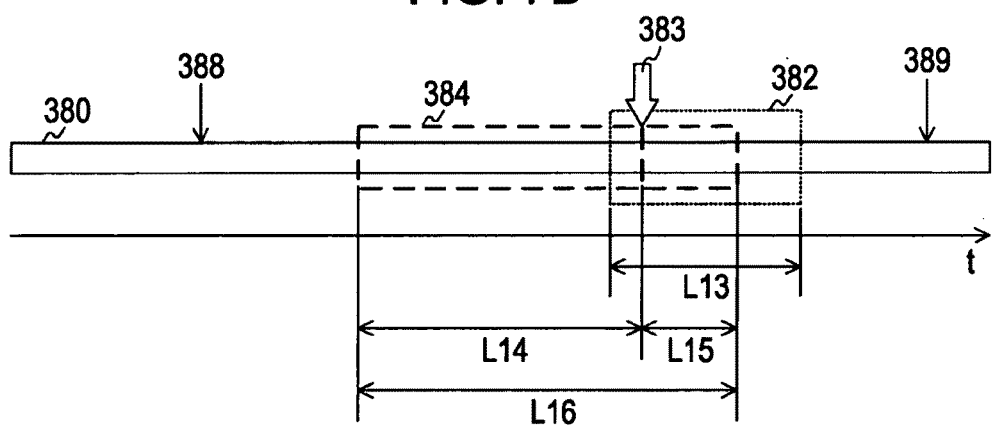
Figure 7C:
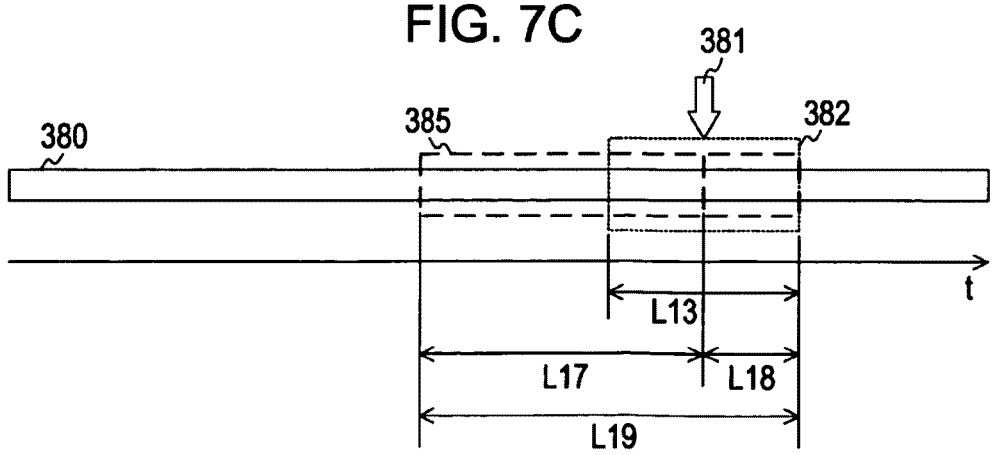

FIGS. 7A, 7B and 7C are diagrams schematically illustrating a setting method of a valid sound range by the valid sound range setting section 160 and a determination method of the synthesis target image selection range by the synthesis target image selection range determining section 171, according to the first embodiment of the present invention. Here, the first embodiment provides an example in which the valid sound range is set on the basis of the timer set by the timer setting section 150.

FIG. 7A schematically illustrates a moving image 380 generated by the image capturing section 111 in a rectangular shape. In a similar way to the example shown in FIG. 3B, the moving image 380 is a moving image obtained by imaging the appearance of a golf practice swing of a person (for example, Koda Goro) by the image capturing apparatus 100. For example, as shown in FIGS. 6A and 6B, in a case where the person 300 (for example, Koda Goro) photographs his appearance of golf practice swing by himself, it is assumed that the count value of the timer set by the timer setting section 150 is "0". In this case, as described above, the valid sound range setting section 160 sets the valid sound range.

For example, it is assumed that a position in which the count value of the timer set by the timer setting section 150 is "0" is a position of the time counter "0" in the time axis of the moving image 380 shown in FIG. 7A (time counter "0" position 381). In this case, the valid sound range setting section 160 sets the valid sound range 382 on the basis of the time counter"0" position 381. Specifically, the valid sound range setting section 160 sets a predetermined range before and after the time counter "0" position 381 in the time axis with reference to the time counter "0" position 381, as the valid sound range 382. For example, the valid sound range setting section 160 sets a range L13 including a range which precedes the time counter "0" position 381 by a time L11 and a range which exceeds the time counter "0" position 381 by a time L12, in the time axis, as the valid sound range 382.

Here, it may be difficult for the person 300 to perform the golf swing so as to terminate the series of golf swing motions at the timing of the time counter "0". Thus, in this example, the instant when the impact sound is generated may correspond to the position of the time counter "0", and the valid sound range is set to cover a range before and after the position of the time counter "0". In this way, a case where the valid sound range is set on the basis of the press position of the video recording button and a case where the valid sound range is set on the basis of the position of the time counter "0" can have different set contents. As the valid sound range is set according to a plurality of photographing trigger characteristics, it is possible to reduce the risk that sounds other than the impact sound to be detected are mistakenly detected.

In this respect, the time L11 can be 0.5 seconds and the time L12 can be 0.5 seconds, for example. That is, the time L13 of the valid sound range 382 can be 1.0 second, for example. The person 300 performs the golf swing so that the golf swing is terminated around the time when the count value of the timer becomes "0" while viewing the display screen displayed on the display section 191. For this reason, compared with the case where the valid sound range is set on the basis of the position where the video recording button is pressed, accuracy may be reduced. Accordingly, the valid sound range based on the timer setting manipulation may be relatively wider than the valid sound range based on the video recording button press manipulation. That is, the valid sound range based on the video recording button press manipulation may be narrower than the valid sound range based on the timer setting manipulation. The synthesis target image selection range is determined on the basis of the impact sound detected in the valid sound range set in this way. The determination method of the synthesis target image selection range will be described with reference to FIG. 7B. Further, in a case where the impact sound is not detected in the valid sound range set in this way, the synthesis target image selection range is determined on the basis of the time counter "0" position 381. The determination method of the synthesis target image selection range will be described with reference to FIG. 7C.

FIG. 7B schematically illustrates the determination method of the synthesis target image selection range in a case where the impact sound is detected in the valid sound range 382 set by the valid sound range setting section 160. In FIG. 7B, a position (position in the time axis) in which the impact sound is detected by the specific sound detecting section 132 is represented as the impact sound detection position 383. As shown in FIG. 7B, in a case where the impact sound is detected in the valid sound range 382 set by the valid sound range setting section 160, the synthesis target image selection range determining section 171 determines the synthesis target image selection range on the basis of the impact sound detection position 383. That is, the synthesis target image selection range determining section 171 determines a predetermined range before and after the impact sound detection position 383 in the time axis with reference to the impact sound detection position 383, as the synthetic target image selection range 384. Specifically, a range L16 including a range which precedes the impact sound detection position 383 by a time L14 and a range which exceeds the impact sound detection position 383 by a time L15, in the time axis, is determined as the synthetic target image selection range 384.

Here, as described above, the time during a golf swing after the golf club comes in contact with the golf ball is shorter than the time before the golf club comes in contact with the golf ball. Thus, the synthesis target image selection range 384 is determined so that the time L14 before the impact sound detection position 383 is longer than the time L15 thereafter. For example, the time L14 can be 1.5 seconds and the time L15 can be 0.5 seconds. In this way, as the synthesis target image selection range is determined on the basis of the impact sound detected in the valid sound range, an appropriate synthesis target image selection range can be determined.

It is assumed that the impact sound is detected in positions (for example, positions indicated by arrows 388 and 389 in FIG. 7B) other than the valid sound range 382 set by the valid sound range setting section 160. In a case where the impact sound is detected in the positions other than the valid sound range 382 in this way, the impact sound is not used for determination of the synthesis target image selection range, in a similar way to the example shown in FIG. 5B. In a case where the impact sound is not used, as shown in FIG. 7C, the synthesis target image selection range can be determined on the basis of the time counter "0" position. Further, in a case where the impact sound is detected in the positions other than the valid sound range 382, the impact sound is not used for determination of the synthesis target image selection range, but may be used for a generation process of the next synthetic image.

FIG. 7C schematically illustrates the determination method of the synthesis target image selection range in a case where the impact sound is not detected in the valid sound range 382 set by the valid sound range setting section 160. In FIG. 7C, the position in which the count value of the timer set by the timer setting section 150 is "0" is represented as the time counter "0" position 381, in a similar way to the example of FIG. 7A. As shown in FIG. 7C, in a case where the impact sound is not detected in the valid sound range 382, the synthesis target image selection range determining section 171 determines the synthesis target image selection range on the basis of the time counter "0" position 381. That is, the synthesis target image selection range determining section 171 determines a predetermined range before and after the time counter "0" position 381 in the time axis with reference to the time counter "0" position 381, as a synthesis target image selection range 385. Specifically, the valid sound range setting section 160 sets a range L19, which includes a range which precedes the time counter "0" position 381 by a time L17 and a range which exceeds the time counter "0" position 381 by a time L18, in the time axis, as the synthesis target image selection range 385.

Here, the person 300 performs the golf swing so that the golf swing is terminated around the time when the count value of the timer becomes "0" while viewing the display screen displayed on the display section 191. For this reason, as shown in FIG. 5C, compared with the case where the synthesis target image selection range is determined on the basis of the position where the video recording button is pressed, accuracy may be reduced. Accordingly, in a case where the impact sound is not detected in the valid sound range 382, a position where the count value of the timer is "0" (time counter "0" position 381) in the time axis is considered as the impact sound detection position to determine the synthesis target image selection range 385.

Further, the times L17 and L18 correspond to the times L14 and L15 shown in FIG. 7B. Further, for example, the time L17 is 1.5 seconds and the time L18 is 0.5 seconds, in a similar way to the example of FIG. 7B. As described above, in a case where the synthesis target image selection range is determined on the basis of the position where the count value of the timer is "0", the synthesis target image selection range is determined on the basis of an action due to a sense of the user. For this reason, accuracy may be reduced, compared with the synthesis target image selection range 384 shown in FIG. 7B. Thus, in a case where the synthesis target image selection range is determined on the basis of the position where the count value of the timer is "0", for example, the time L19 may be longer than the time L16 to determine the synthesis target image selection range.

Further, the respective times L11 to L19 may be changed by the user manipulation.

Generation Example of Synthetic Image

Next, an example of generating a synthetic image will be described in detail with reference to the drawings, using each frame included in the determined synthesis target image selection range. In the first embodiment of the present invention, a case where a synthetic image of a still image is generated will be described as an example.

FIGS. 8A, 8B, 8C and 8D are diagrams schematically illustrating an example of a flow of a selection process of synthesis target images by the selecting section 170 and a generation process of a synthetic image by the layer processing section 180, according to the first embodiment of the present invention.

FIG. 8A schematically illustrates a moving image 400 generated by the image capturing section 111 and a synthesis target image selection range 401 determined by the synthesis target image selection range determining section 171 in the moving image 400. The moving image 400 is a moving image obtained by imaging the appearance of a golf practice swing of a person by the image capturing apparatus 100, in a similar way to the example shown in FIG. 3B or the like. Further, it is assumed that the synthesis target image selection range 401 is a synthesis target image selection range determined by the synthesis target image selection range determining section 171, in a similar way to the examples shown in FIGS. 5B and 5C and FIGS. 7B and 7C.

FIG. 8B schematically illustrates respective frames included in the synthesis target image selection range 401 in the moving image 400. In FIG. 8B, the respective frames included in the synthesis target image selection range 401 are shown in a rectangular shape. Here, F1 to F90 indicating the respective frames are given in a rectangular shape.

The synthesis target image selecting section 172 selects synthesis target images on the basis of a predetermined condition, from the respective frames included in the synthesis target image selection range 401. For example, the synthesis target image selecting section 172 selects frames at a predetermined interval (for example, 10-frame interval) among the frames F1 to F90, as the synthesis target images. In this case, for example, intervals of frames included in a predetermined range (for example, 0.05 seconds) around a position where the impact sound is detected may be closer than other intervals, to be selected. Accordingly, the synthetic image can be generated using the images selected around motion transitions to be observed. The synthesis target images selected in this way are shown in FIG. 8C. In this example, for simplicity of the description, a relatively small number of frames are exemplified.

FIG. 8C schematically illustrates a plurality of synthesis target images (frames F0, F10 and the like) selected as the synthesis target image, from the respective frames included in the synthesis target image selection range 401. In FIG. 8C, the synthesis target images are shown in a rectangular shape. Here, F0, F10 or the like indicating each synthesis target image is given in a rectangular shape. In this example, for simplicity of the description, a relatively small number of frames (for example, 10 frames) are exemplified.

FIG. 8D schematically illustrates a synthetic image 402 generated by the synthesis target images (the plurality of frames F0, F10 and the like). In FIG. 8D, the synthesis target images are shown in a rectangular shape, in a similar way to the example of FIG. 8C. Here, F1, F10 or the like indicating each synthesis target image is given in a rectangular shape.

The layer processing section 180 synthesizes the synthesis target images (frames F0, F10 and the like) selected by the synthesis target image selecting section 172 through a modifying process, to thereby generate a synthetic image. For example, the layer processing section 180 performs the modifying process (for example, cutout of opposite ends) for synthesis with respect to ten synthesis target images selected by the synthesis target image selection range determining section 171, to thereby synthesize the synthesis target images after modification in a time-series manner. For example, the layer processing section 180 synthesizes five synthesis target images (F0, F10, F20, F30 and F40) to be arranged in a time-series manner from an upper left end part, and synthesis five synthesis target images (F50, F60, F70, F80 and F90) to be arranged in a time-series manner from a lower left end part. The synthesis positions of the synthesis target images are determined on the basis of the calculation result by the coordinate calculating section 173. Accordingly, as shown in FIG. 4B, the synthetic image indicating the motion transitions of the person who practices the golf swing is generated.

In FIGS. 8A, 8B, 8C and 8D, the example in which the image synthesis is easily performed (example in which the image synthesis is performed after the cutout of the opposite ends of the synthesis target image) has been described. Hereinafter, an example in which the synthesis target images are separated into a target object layer and a background layer to generate a synthetic image will be described.

Layer Separation Example of Synthesis Target Images

Figure 9A:
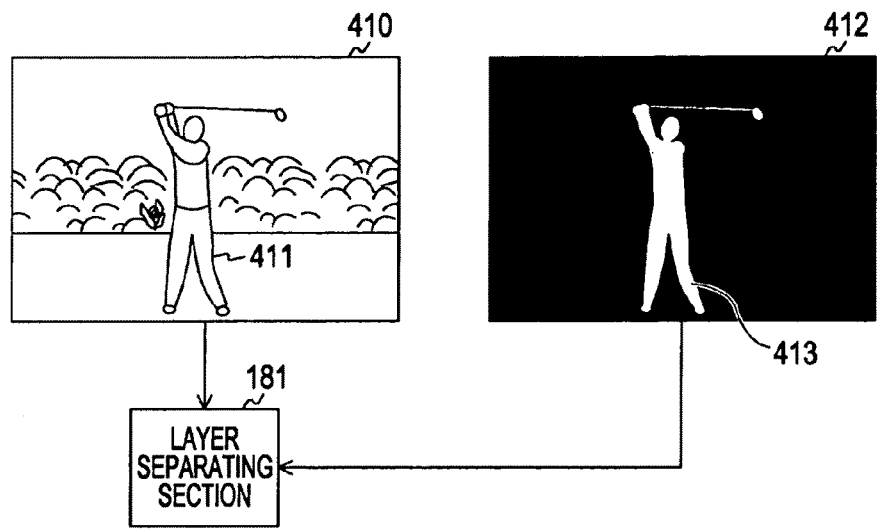
FIGS. 9A and 9B are diagrams schematically illustrating a separation method of synthesis target images by a layer separating section according to a first embodiment of the present invention.
Figure 9B:
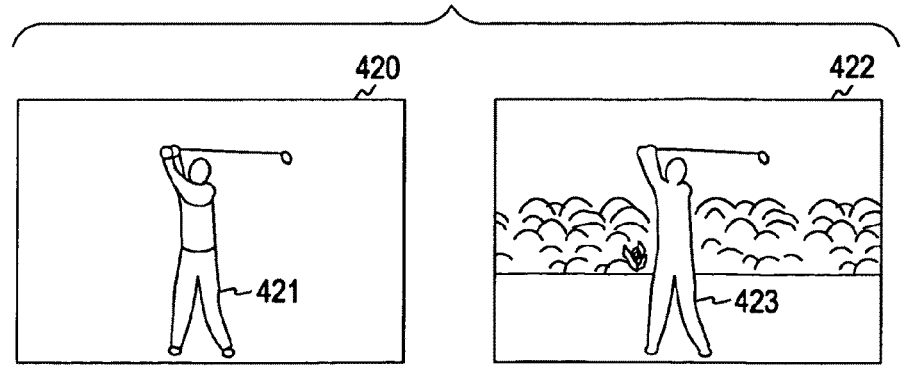

FIGS. 9A and 9B are diagrams schematically illustrating a separation method of synthesis target images by the layer separating section 181 according to the first embodiment of the present invention. In this example, the synthesis target images selected by the synthesis target image selecting section 172 are separated into two layers on the basis of the object information generated by the object information generating section 120.

FIG. 9A illustrates the synthesis target image 410 and an object information 412 generated for the synthesis target image 410. The synthesis target image 410 is an image including a person 411. Further, as the object information generated by the object information generating section 120, for example, information indicating that "1" is given to pixels corresponding to a target object region and "0" is given to pixels corresponding to a region (for example, background region) other than the target object is generated. In FIG. 9A, a region (target object region) corresponding to the person 411 is a white region 413 and the region (background region) other than the person 411 is a black region, to thereby schematically illustrate the object information 412.

As described above, in the captured image retaining section 115, the captured images generated by the image capturing section 111 are sequentially retained, and the object information generated by the object information generating section 120 is retained in relation to the captured images. Further, the synthesis target image selecting section 172 outputs the selected synthesis target images and the object information generated for the synthesis target images to the layer separating section 181. Then, the layer separating section 181 separates the synthesis target images output from the synthesis target image selecting section 172 into two layers, using the corresponding object information.

FIG. 9B illustrates a target object layer 420 separated by the layer separating section 181 and a background layer 422. The target object layer 420 is an image obtained by extracting the target object region (that is, a pixel region which is given "1" as the object information 412) in the synthesis target image 410 shown in FIG. 9A. That is, a region 421 corresponding to the person 411 included in the synthesis target image 410 is extracted. Further, the background layer 422 is an image obtained by extracting the background region (that is, a pixel region which is given "0" as the object information 412) in the synthesis target image 410 shown in FIG. 9A. That is, a region is extracted (region other than a region 423) corresponding to the region (background region) other than the person 411 included in the synthesis target image 410.

A variety of modifying processes is performed by the layer modifying section 182, for the respective layer images separated in this way. This modification example will be described in detail with reference to FIGS. 10A to 10C.

Modification Example of Synthesis Target Images

Figure 10A:
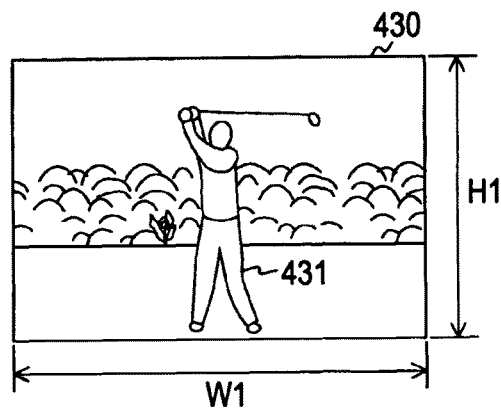
FIGS. 10A, 10B and 10C are diagrams schematically illustrating an image which is a target of a modification process by a layer modifying section and an image which is modified by the layer modifying apparatus, according to a first embodiment of the present invention.
Figure 10B:
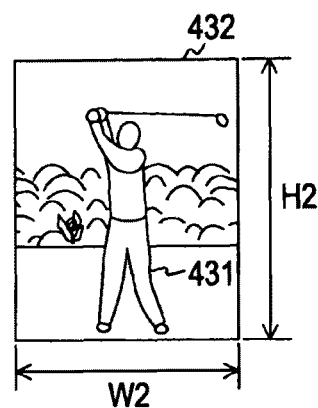
Figure 10C:
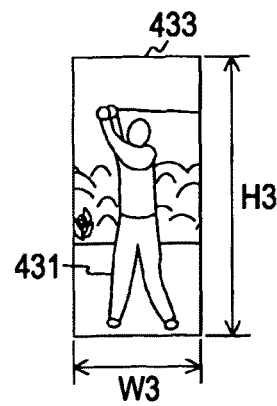

FIGS. 10A, 10B and 10C are diagrams schematically illustrating an image which is a target of a modification process by the layer modifying section 182 and an image which is modified by the layer modifying apparatus 182, according to the first embodiment of the present invention. Here, a case where a synthetic image is generated for sport performed in a standing posture such as golf will be described as an example. Further, in FIGS. 10A, 10B and 10C, for simplicity of the description, a case where the modifying process is performed using a synthesis target image of a state before layer separation is shown as an example.

FIG. 10A illustrates a synthesis target image 430 before modification by means of the layer modifying section 182. Further, FIGS. 10B and 10C illustrate synthesis target images 432 and 433 after modification by means of the layer modifying section 182. A person 431 who performs the golf swing is included in the synthesis target images 430, 432 and 433.

The synthesis target image 430 shown in FIG. 10A has an image size of a width W1 and a height H1, for example. The image size of the synthesis target image 430 can be the VGA size (640 pixels×480 pixels), for example. That is, the width W1 can be 640, and the height H1 can be 480.

The synthesis target image 432 shown in FIG. 10B is an image corresponding to a transition motion valid region in the synthesis target image 430 shown in FIG. 10A, and for example, has an image size of a width W2 and a height H2. Here, the transition motion valid region is a region for cutting out the target object from objects included in the synthesis target image before modification. For example, the image size of the synthesis target image 432 can be 320 pixels×480 pixels. That is, the width W2 can be 320, and the height H2 can be 480.

The synthesis target image 433 shown in FIG. 10C is an image corresponding to a remaining background region in the synthesis target image 430 shown in FIG. 10A, and for example, has an image size of a width W3 and a height H3. The remaining background region is a region which is used as a background image in the synthesis process. For example, the image size of the synthesis target image 433 can be 160 pixels×480 pixels. That is, the width W3 can be 160, and the height H3 can be 480.

It is assumed that a central position between the transition motion valid region and the remaining background region coincides with a central position of the synthesis target image. Further, the size (W2×H2) of the transition motion valid region and the size (W3×H3) of the remaining background region may be the same in their sizes (at least one of the width and height) according to the transition direction of the target object. For example, the transition direction of the target object is a direction in which the images proceed in a temporal manner when the images are represented as motion transition images.

For example, in a case where a synthetic image is generated for motion transitions of sport performed in a standing posture such as golf, as shown in FIG. 4B, it is likely that each target object image is transited in a transverse direction. For this reason, as shown in FIGS. 10B and 10C, it may be preferable that the heights H2 and H3 of the transition motion valid region and the remaining background region are the same as the height H1 of the synthesis target image. On the other hand, in a case where a synthetic image is generated for motion transitions of sport performed in a horizontal direction state, each target object image may be transited in a longitudinal direction. In this case, it may be preferable that the widths W2 and W3 of the transition motion valid region and the remaining background region are the same as the width W1 of the synthesis target image. For example, in a case where ground work or the like in judo becomes a target object, it is likely that the motion transitions are performed in a longitudinal direction.

FIGS. 10A, 10B and 10C shows an example, in which it is preferable to perform appropriate setting for the width and the height of the transition motion valid region and the remaining background region according to the size or motion of the object, so as to cut out the image as an image used for the synthesis process.

Image Synthesis Example

Figure 11A:
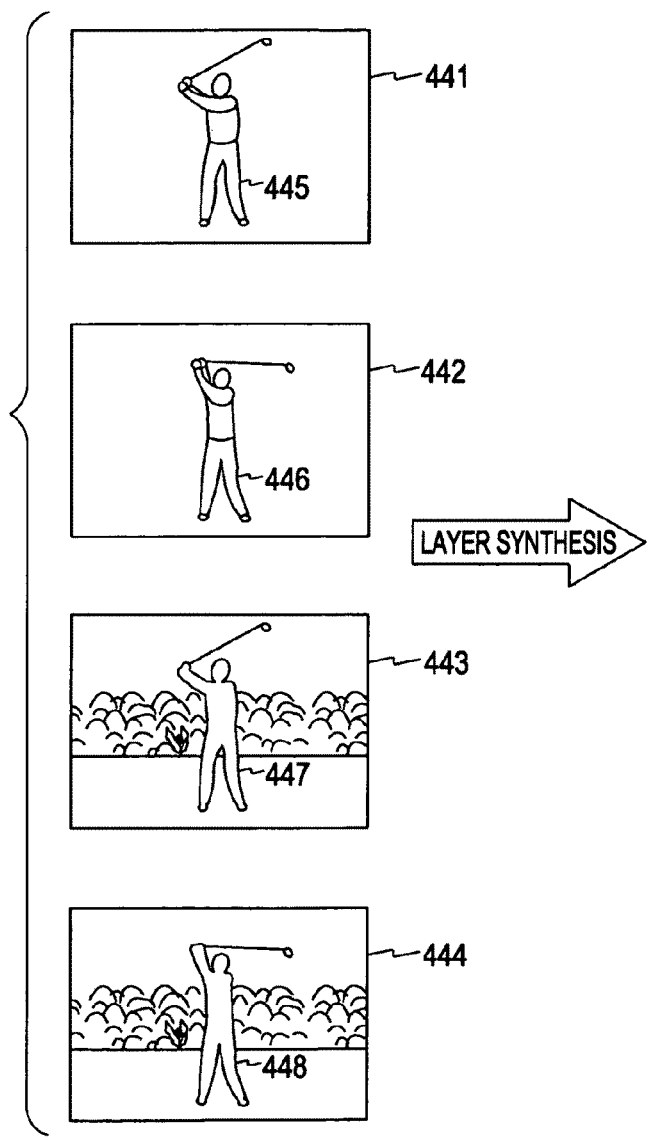
FIGS. 11A and 11B are diagrams schematically illustrating a synthesis method by a layer synthesizing section according to a first embodiment of the present invention.
Figure 11B:
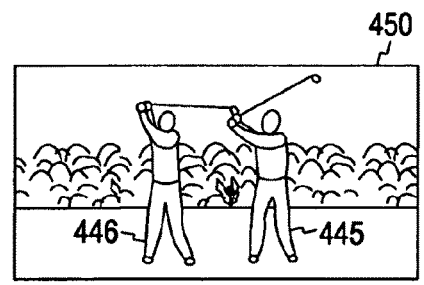

FIGS. 11A and 11B are diagrams schematically illustrating a synthesis method by the layer synthesizing section 183 according to the first embodiment of the present invention. Here, this embodiment provides an example in which a synthesis process is performed for two synthesis target images which continue in a time-series manner.

FIG. 11A schematically illustrates synthesis target images (two synthesis target images which continue in a time-series manner) separated by the layer separating section 181 and modified by the layer modifying section 182. As described above, the synthesis target images are separated into a target object layer and a background layer by the layer separating section 181. Further, the layer modifying section 182 performs a modification process for the target object layer and the background layer separated by the layer separating section 181. In this way, as the separation and modification are performed for two synthesis target images which continue in a time-series manner, as shown in FIG. 11A, four layers (a first priority image 441 to a fourth priority image 444) are generated.

It is assumed that the first priority image 441 is a target object layer of a synthesis target image which comes later in the time axis, and the third priority image 443 is a background layer of the synthesis target image. Further, it is assumed that the second priority image 442 is a target object layer of a synthesis target image which comes earlier in the time axis, and the fourth priority image 444 is a background layer of the synthesis target image. Furthermore, in a case where these images are synthesized, the synthesis is performed so that an image having a higher priority is overwritten.

FIG. 11B illustrates a synthetic image 450 generated on the basis of the priority of the respective layer images. That is, the layer synthesizing section 183 synthesizes four layers (the first priority image 441 to the fourth priority image 444) on the basis of the priority, to thereby generate the synthetic image 450. The synthetic image 450 is an image obtained by synthesizing a person image 445 included in the first priority image 441 and a person image 446 included in the second priority image 442 to be overwritten on the background region synthesized by the third priority image 443 and the fourth priority image 444. In this case, the third priority image 443 is synthesized to be overwritten on the fourth priority image 444. Further, the person image 445 included in the first priority image is synthesized to be overwritten on the person image 446 included in the second priority image 442.

Figure 12A:
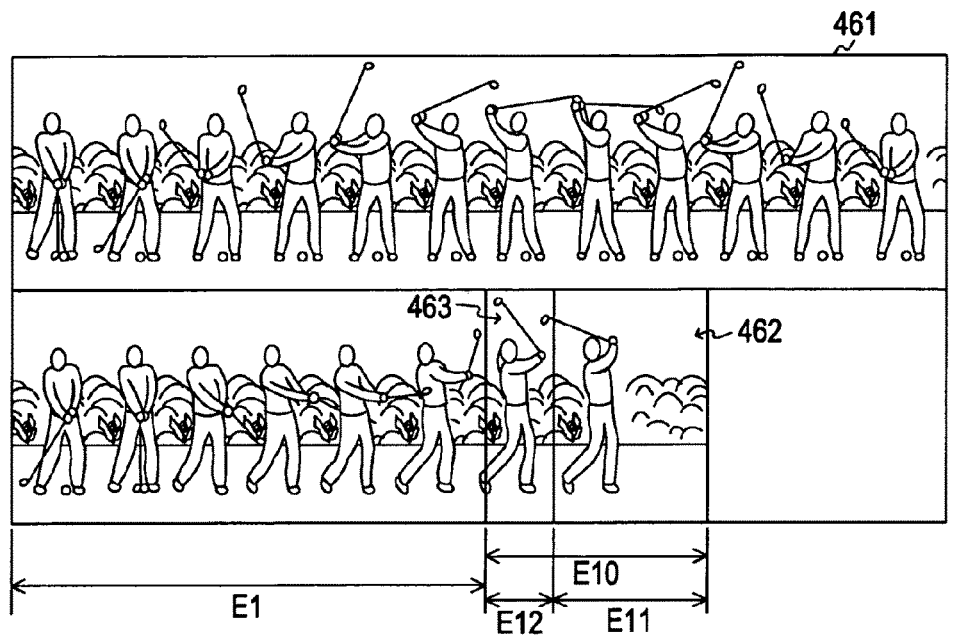
FIGS. 12A and 12B are diagrams schematically illustrating a synthesis method of synthesis target images by a layer synthesizing section according to a first embodiment of the present invention.
Figure 12B:
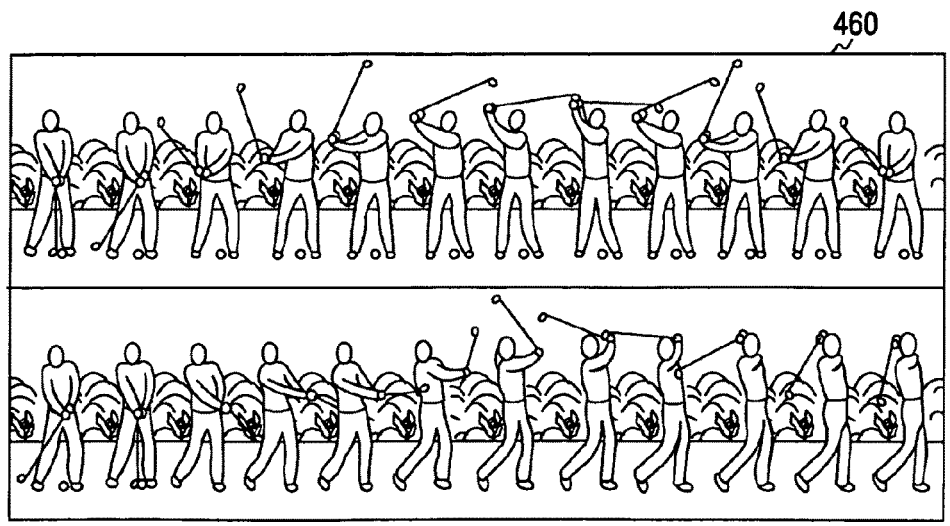

As shown in FIGS. 12A and 12B, in a case where three or more synthesis target images are sequentially synthesized to generate a synthetic image, the synthesis target images are sequentially synthesized in a time-series manner, to thereby generate the synthetic image. Further, a synthesis target image which comes earlier in the time axis among two synthesis target images which continue in a time-series manner is retained in the synthetic image retaining section 185, until a synthesis process time of a synthesis target image which comes later.

FIGS. 12A and 12B are diagrams schematically illustrating a synthesis method of synthesis target images by means of the layer synthesizing section 183 according to the first embodiment of the present invention. Here, a synthesis example of the synthesis target images until a synthetic image 460 shown in FIG. 12B is generated is shown.

FIG. 12A illustrates a synthesis state at a certain time point until the synthetic image 460 shown in FIG. 12B is generated. For example, it is assumed that the state shown in FIG. 12A is a state at a time point when the synthesis process is performed for a synthesis target image 462 (two layer images). That is, FIG. 12A shows a transition motion valid region E10 corresponding to the synthesis target image 462, and a synthetic image 461 in which the synthesis process is performed for a synthesis target image 463 which comes right before. In this example, the respective layer images which are immediately before the synthesis targets are retained in the synthetic image retaining section 185.

Here, in a region E11 in the synthesis target image 462, there is no overlapped region between the adjacent synthesis target image 463 and the synthesis target image 462. For this reason, in a case where the synthesis target image 462 is synthesized with the synthetic image 461, with respect to the region E11 in the synthesis target image 462, pixels of the transition motion valid region of the synthesis target image 462 are synthesized to be overwritten on the synthetic image 461 as a new synthetic image as they are.

However, a region E12 in the synthesis target image 462 is overlapped with a part of the adjacent synthesis target image 463. Thus, as shown in FIGS. 11A and 11B, the respective layer images are synthesized in the region E12 in the synthesis target image 462 according to the priority.

That is, the layer synthesizing section 183 synthesizes the respective layer images according to the priority for the region E12, using the respective layer images of the synthesis target image 462 which is a current synthesis target and the adjacent synthesis target image 463 retained in the synthetic image retaining section 185. Through such a synthesis, a synthetic image of a region E11+E12 is generated from the synthesis target images 462 and 463. Further, the layer synthesizing section 183 synthesizes the synthetic image of the region E11+E12 generated in this way to be overwritten, with the synthetic image (synthetic image synthesized with the adjacent synthesis target image 463) retained in the synthetic image retaining section 185. That is, the layer synthesizing section 183 performs the process of pasting the synthetic image of the region E11+E12 generated by such a synthesis on a region E1 corresponding to the synthetic images retained in the synthetic image retaining section 185.

Further, the synthesis target image 462 (two layer images) which becomes the current synthesis target and the synthetic image generated by the current synthesis process are retained in the synthetic image retaining section 185 and are used for the next synthesis process. An example of the synthetic image generated in this way is shown in FIG. 12B.

In this way, as the respective layer images are synthesized according to the priority, with respect to a region (for example, region E12) which is overlapped between continuous images in the synthesis process, the synthetic image can be generated without damaging a part of the target object. Thus, in a case where the synthetic image is generated using a plurality of synthesis target images, it is also possible to generate the motion transition images capable of appropriately expressing motions of the target object.

Figure 13:
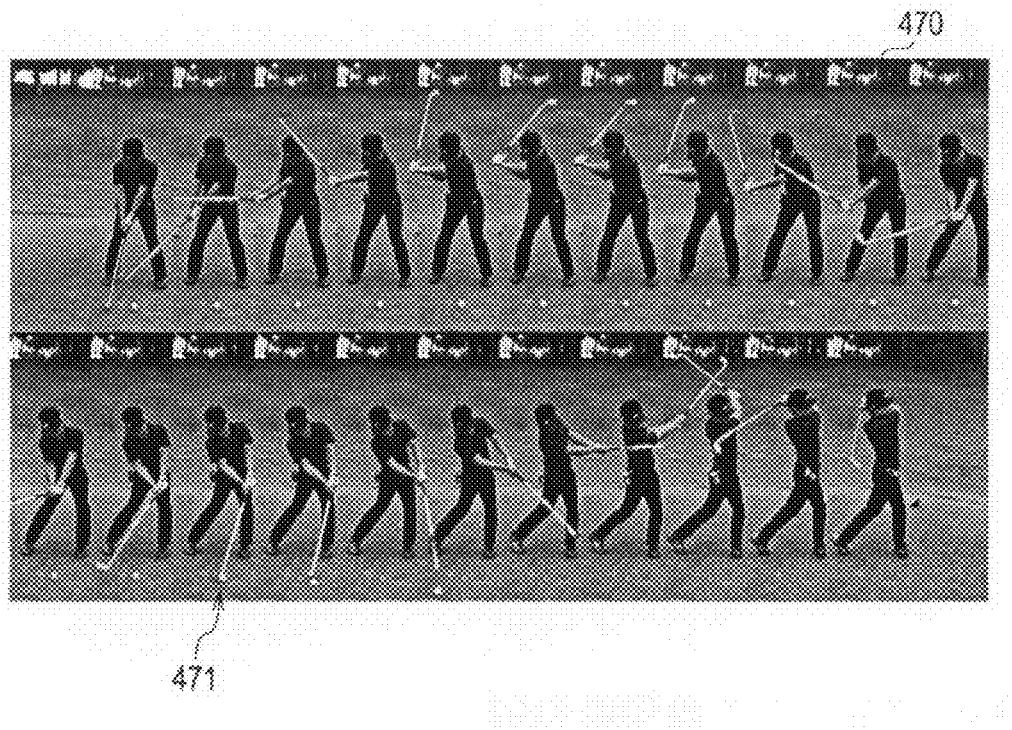
FIG. 13 is a diagram illustrating an example of a synthetic image generated by a layer processing section according to a first embodiment of the present invention.

In this way, the synthetic image 460 generated by the layer synthesizing section 183 is stored in a synthetic image storing section 200. Further, for example, the synthetic image 460 is displayed on the display section 191 according to the user manipulation. Further, for example, whenever the synthetic image is generated by the layer synthesizing section 183, it may be automatically displayed on the display section 191. FIG. 13 illustrates an example of the synthetic image generated in this way.

Synthetic Image Example

FIG. 13 is a diagram illustrating an example of a synthetic image generated by the layer processing section 180 according to the first embodiment of the present invention. A synthetic image 470 shown in FIG. 13 indicates motion transitions of a person who practices a golf swing. In the synthetic image 470, a region indicated by an arrow 471 is a region including an image corresponding to a position where an impact sound is generated.

Operation Example of Image Capturing Apparatus

Figure 14:
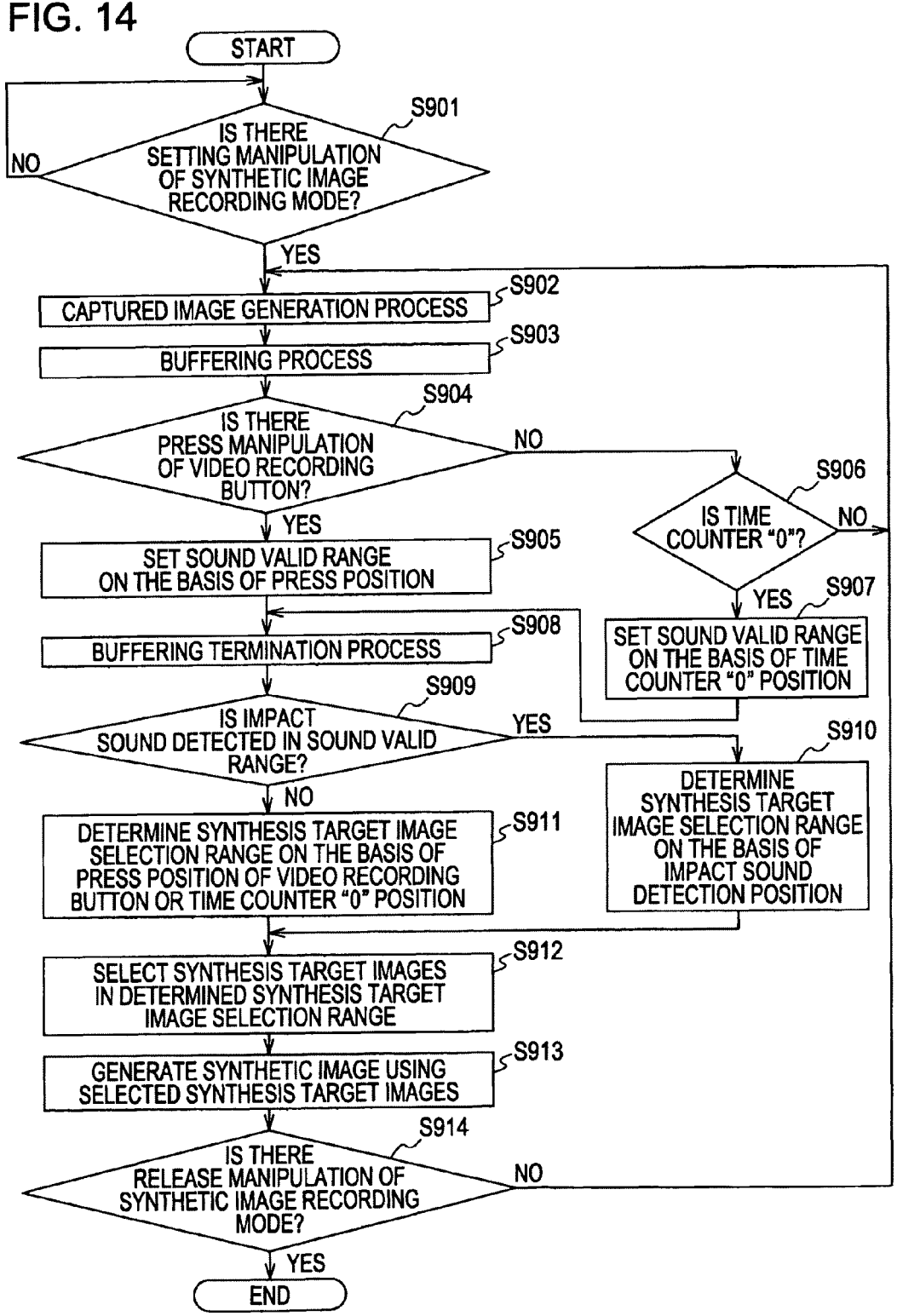
FIG. 14 is a flowchart illustrating an example of a process procedure of a synthetic image generation process by an image capturing apparatus according to a first embodiment of the present invention.

FIG. 14 is a flowchart illustrating an example of a process procedure of a synthetic image generation process by means of the image capturing apparatus 100 according to the first embodiment of the present invention.

Firstly, it is determined whether a setting manipulation of a synthetic image recording mode is performed (step S901). For example, it is determined whether a press manipulation of a setting button of the synthetic image recording mode or a timer setting button is performed. In a case where setting of the manipulation of the synthetic image recording mode is not performed (step S901), monitoring is continued until setting of the manipulation of the synthetic image recording mode is performed. In a case where the setting manipulation of the synthetic image recording mode is performed (step S901), the image capturing section 111 performs the generation process of the captured image (step S902), and the generated captured image is retained in the captured image retaining section 115 (step S903). That is, the buffering process is performed. Step S902 is an example of an imaging procedure disclosed in the claims.

Subsequently, it is determined whether the press manipulation of the video recording button is performed (step S904). In a case where the press manipulation of the video recording button is performed, the valid sound range setting section 160 sets the valid sound range on the basis of the press position (step S905). For example, as shown in FIG. 5A, the valid sound range 352 is set on the basis of the video recording button press position 351. On the other hand, in a case where the press manipulation of the video recording button is not performed (step S904), it is determined whether the count value of the timer set by the timer setting section 150 is "0" (step S906). In a case where the count value of the timer is "0" (step S906), the valid sound range setting section 160 sets the valid sound range on the basis of the position where the count value of the timer is "0" (step S907). For example, as shown in FIG. 7A, the valid sound range 382 is set on the basis of the time counter "0" position 381. Further, in a case where the count value of the timer is not "0", or the timer setting is not performed by the timer setting section 150 (step S906), the procedure returns to step S902. Steps S904 to S907 represent an example of a determination range setting step disclosed in the claims.

Next, the buffering termination process is performed (step S908), and it is determined whether the impact sound is detected in the set valid sound range (step S909). In a case where the impact sound is detected in the set valid sound range (step S909), the synthesis target image selection range determining section 171 determines the synthesis target image selection range on the basis of the position where the impact sound is detected (step S910). For example, as shown in FIG. 5C, the synthesis target image selection range 355 is determined, on the basis of the impact sound detection position 353. Further, for example, as shown in FIG. 7C, the synthesis target image selection range 385 is determined on the basis of the impact sound detection position 383.

Further, in a case where the impact sound is not detected in the set valid sound range (step S909), the synthesis target image selection range determining section 171 determines the synthesis target image selection range on the basis of the position which is a reference when the valid sound range is set (step S911). That is, in a case where the valid sound range is set on the basis of the press position of the video recording button, the synthesis target image selection range is determined on the basis of the press position. For example, as shown in FIG. 5C, the synthesis target image selection range 355 is determined on the basis of the video recording button press position 351. On the other hand, in a case where the valid sound range is set on the basis of the position where the count value of the timer is "0", the synthesis target image selection range is determined on the basis of the position. For example, as shown in FIG. 7C, the synthesis target image selection range 385 is determined on the basis of the time counter "0" position 381.

Subsequently, the synthesis target image selecting section 172 selects synthesis target images from the respective images included in the determined synthesis target image selection range (step S912). Then, the generation process of the synthetic image is performed using the selected synthesis target images (step S913).

Next, it is determined whether a release manipulation of the synthetic image recording mode is performed (step S194). In a case where the release manipulation of the synthetic image recording mode is not performed, the procedure returns to step S902, and the image synthesis process relating to the next synthetic image is subsequently performed. On the other hand, in a case where the release manipulation of the synthetic image recording mode is performed (step S914), the operation of the synthetic image generation process is terminated.

In this way, in the first embodiment of the present invention, a time span in which an impact sound which becomes the detection target can exist is set as the valid sound range, and thus, it is possible to reduce false detection of sounds other than the impact sound which becomes the detection target. Thus, in a case where a synthetic image using an extremely fast motion causing the impact sound such as a golf swing as a target is generated, it is possible to detect the generation position of the impact sound with a high degree of accuracy. Further, it is possible to generate the synthetic image with the emphasis around the accurate generation position of the impact sound, and to generate the synthetic image having a high visibility. In this case, since a manual work of the user is unnecessary for the detection of the generation position of the impact sound, it is possible to reduce inconvenience for the user.

Further, as described above, it may be determined whether the synthetic image is generated according to whether the impact sound is detected in the valid sound range. This example is shown in FIG. 15.

Figure 15:
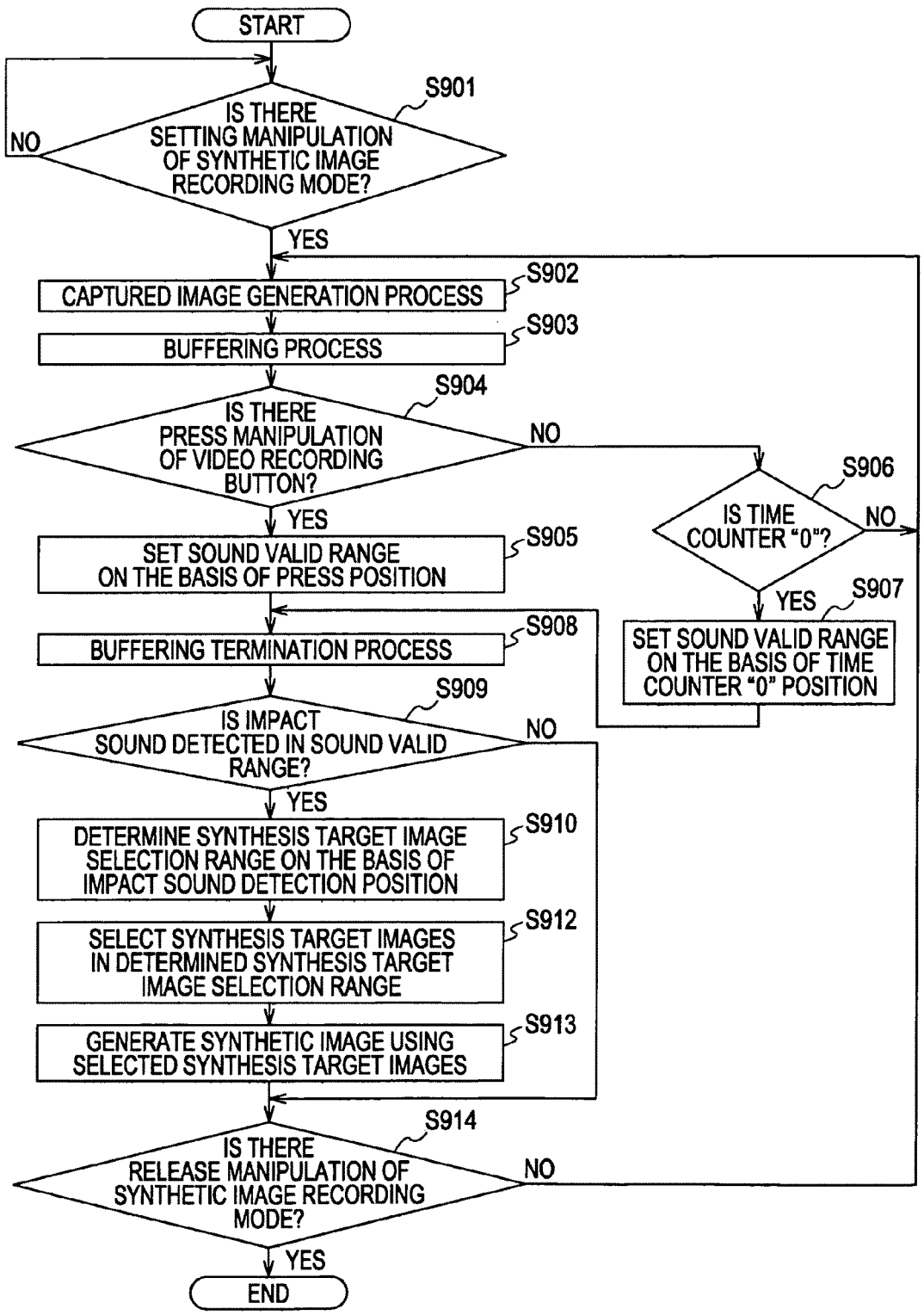
FIG. 15 is a flowchart illustrating an example of a process procedure of a synthetic image generation process by an image capturing apparatus according to a first embodiment of the present invention.

FIG. 15 is a flowchart illustrating an example of a process procedure of the synthetic image generation process by means of the image capturing apparatus 100 according to the first embodiment of the present invention. This example is a modified example of the process procedure of the synthetic image generation process shown in FIG. 14, in which step S911 is omitted. Thus, the same reference numerals are given to the same process steps as shown in FIG. 14, and description thereof will be omitted.

It is determined whether the impact sound is detected in the valid sound range set in step S905 or S907 (step S909). In a case where the impact sound is not detected in the set valid sound range (step S909), the procedure goes to step S914. That is, in a case where the impact sound is not detected in the set valid sound range, the generation process of the synthetic image is performed using the press position of the next video recording button, or the position where the count value of the timer is "0", without generating the synthetic image. That is, the selecting section 170 performs a control, in a case where the impact sound is detected in the valid sound range, so that the synthetic image using the specific sound is generated in the layer processing section 180, and performs a control so that the synthetic image is not generated in the layer processing section 180 in a case where the impact sound is not detected in the valid sound range. Steps S909, S910, S912 and S913 are an example of a control step disclosed in the claims.

In this way, in a case where the impact sound is not able to be detected in the valid sound range, it is possible to reduce a loss of a photographing chance for the user, by returning to the next photographable state without generating the synthetic image. Further, since the synthetic image can be generated using the accurate impact sound, it is possible to generate an appropriate synthetic image.

As the synthetic image is generated in this way, even a beginner who is not accustomed to the handling of the image capturing apparatus can easily generate an appropriate synthetic image.

In a case where the captured images generated by the image capturing section 111 are recorded as image contents (for example, a moving image file or continuous still image file), the impact sound detection position may be recorded as metadata of frame. Thus, for example, in a case where a list of the image contents is displayed, the frame corresponding to the impact sound detection position can be used as a representative thumbnail.

2. Second Embodiment

In the first embodiment of the present invention, the case where the distance between the image capturing apparatus and the target object (person who practices the golf swing) is relatively short has been described by way of example. However, the image capturing apparatus may be located in a position where the distance from the target object is relatively long and may photograph the target object by means of a zoom function of the image capturing apparatus. In such a case where the distance between the image capturing apparatus and the target object is relatively long, the time until the impact sound reaches the image capturing apparatus becomes long according to the length of the distance. In this case, a delay occurs between the time when the impact sound is generated and the time when the impact sound reaches the image capturing apparatus. Thus, the second embodiment of the present invention provides an example in which the detection position of the impact sound in the time axis is corrected, in a case where the distance between the image capturing apparatus and the target object is relatively long, according to the length of the distance.

Figure 16A:
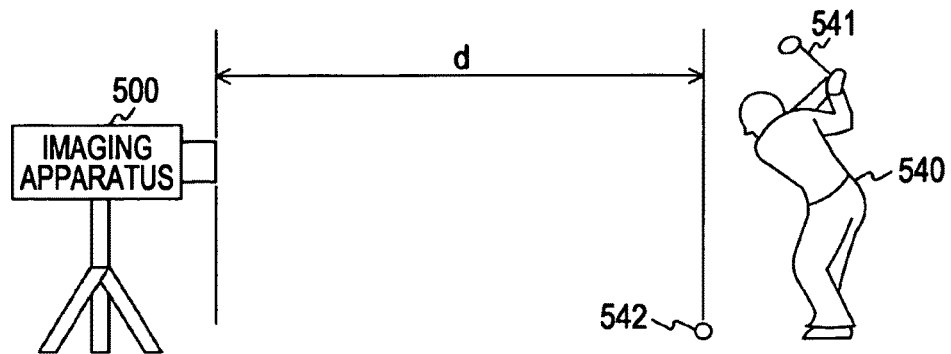
FIGS. 16A and 16B are diagrams illustrating the distance between an image capturing apparatus and a target object, and the relation between a generation position of an impact sound and an arrival position thereof, according to a second embodiment of the present invention.
Figure 16B:
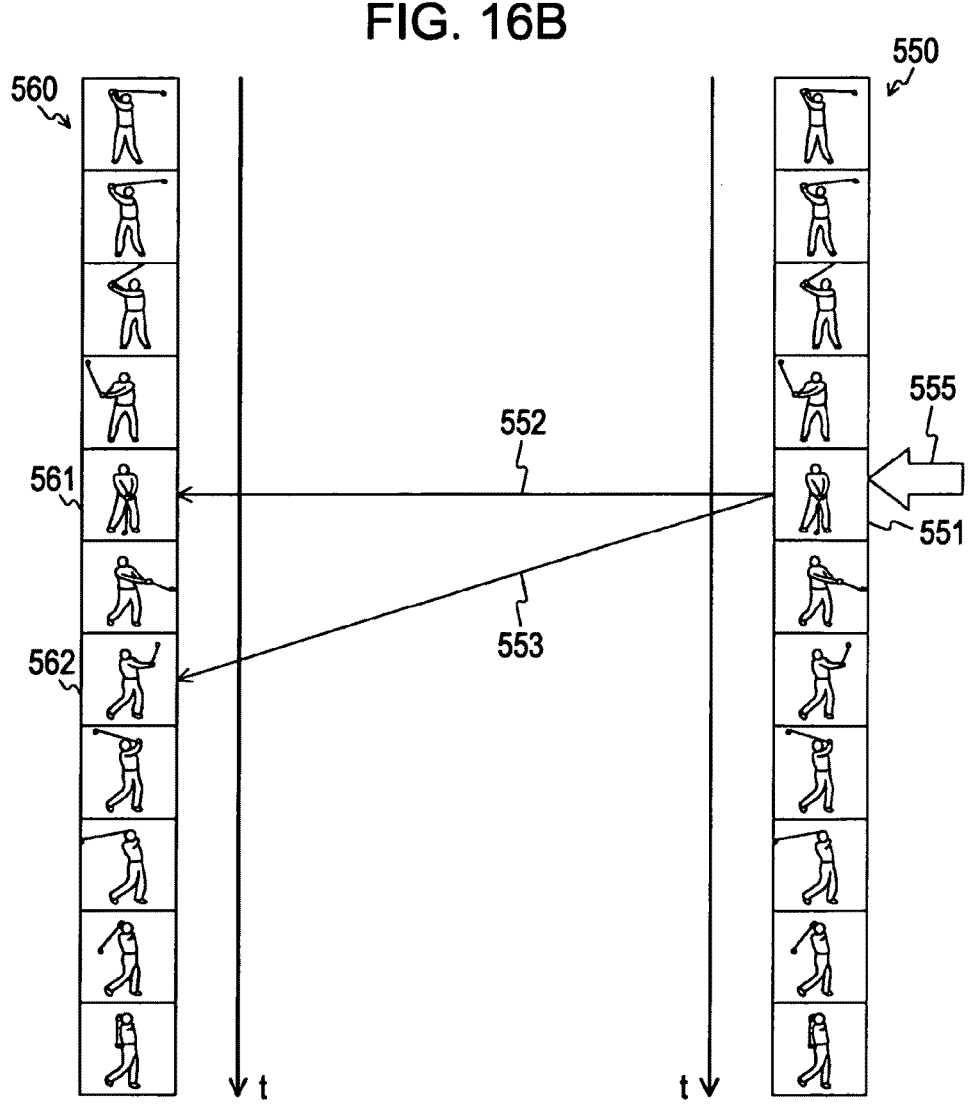

FIGS. 16A and 16B are diagrams illustrating the distance between an image capturing apparatus 500 and a target object and the relation between a generation position of an impact sound and an arrival position thereof, according to the second embodiment of the present invention. FIG. 16A schematically illustrates the positional relation between the image capturing apparatus 500 and a person 540 who becomes an image capturing target by the image capturing apparatus 500. Here, the distance between the image capturing apparatus 500 and the person 540 is referred to as a distance d. The relation between the image capturing apparatus 500 and the person 540 is approximately the same as the example shown in FIG. 3A, except that the distance d is different, and thus, description thereof will be omitted.

Figure 17:
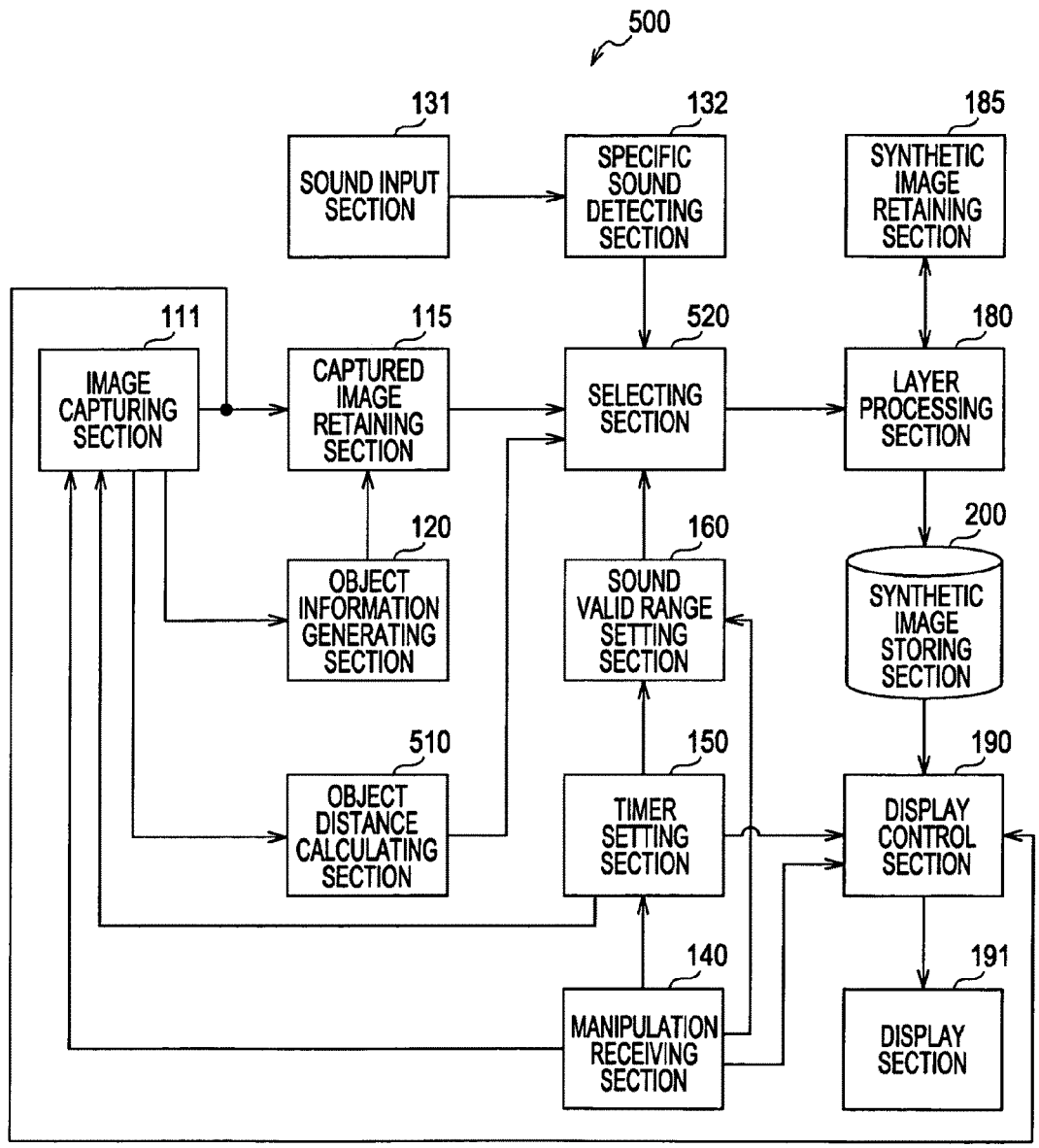
FIG. 17 is a block diagram illustrating an example of a functional configuration of an image capturing apparatus according to a second embodiment of the present invention.

FIG. 16B schematically illustrates the relation between respective images forming a moving image generated by the image capturing section 111 shown in FIG. 17 and motion transitions of the person 540. An image group 550 represents the motion transitions of the person 540 in a state shown in FIG. 16A, in which respective images forming the image group 550 are arranged in the time axis. An image group 560 represents the respective images forming the moving image generated by the image capturing section 111 in the state shown in FIG. 16A, in which the respective images forming the image group 560 are arranged in the time axis. Here, the position (position in the time axis) where the impact sound is generated by the golf swing by the person 540 is represented as an impact sound generation position 555.

In this respect, the speed of sound in air is about 340 m/sec. Thus, in a case where the distance d between the image capturing apparatus 500 and the person 540 is relatively long, the time until the impact sound reaches the image capturing apparatus 500 becomes long, and thus, a delay occurs between the time when the impact sound is generated and the time when the impact sound is input to the image capturing apparatus 500.

For example, it is assumed that the position of an image 551 among the images forming the image group 550 shown in FIG. 16B is the impact sound generation position 555. In this case, for example, in a case where the distance d is relatively short (several meters, for example), as indicated by an arrow 552, the image 551 corresponding to the position where the impact sound is generated and an image 561 generated when the impact sound is input to the image capturing apparatus 500 are approximately the same as each other. On the other hand, in the case where the distance d is relatively long (340 m or longer, for example), as indicated by an arrow 553, the image 551 corresponding to the position where the impact sound is generated and an image 562 generated when the impact sound is input to the image capturing apparatus 500 are different from each other, thereby causing a delay. In this respect, even in the case where the distance d is relatively long, it is likely that an image on a display screen displayed on the display section 191 is viewed at approximately the same angle of view as in the case where the distance d is relatively short. For this reason, it may be difficult to correct the delay of the impact sound by a manual manipulation of a user. Thus, hereinafter, an example in which the delay of the impact sound generated according to the distance between the image capturing apparatus and the target object is corrected is shown.

Configuration Example of Image Capturing Apparatus

FIG. 17 is a block diagram illustrating an example of a functional configuration of an image capturing apparatus 500 according to the second embodiment of the present invention. The image capturing apparatus 500 is different from the image capturing apparatus 100 shown in FIG. 1 in that an object distance calculating section 510 is added, and a selecting section 520 is installed instead of the selecting section 170. The configuration other than these components is approximately the same as in the image capturing apparatus 100. Thus, the same reference numerals are given to common components, and description of a part thereof will be omitted.

The object distance calculating section 510 calculates distance (object distance) from the object included in the captured image generated by the image capturing section 111, and outputs the calculated object distance to the selecting section 520. For example, the object distance calculating section 510 detects a face of the person included in the captured image generated by the image capturing section 111, and calculates the object distance of the target object, using the detected face and the imaging information (for example, position of each lens and focus position) at the time of generation of the captured image. For example, a face detection method (for example, see Japanese Unexamined Patent Application Publication No. 2004-133637) through matching of a template in which luminance distribution information of the face is recorded and a content image can be used as the detection method of the face included in the captured image. Further, a face detection method based on a characteristic amount of a flesh-colored portion or a human face included in the captured image can be used. Through such a face detection method, the position and size of the person's face in the captured image can be calculated.

The selecting section 520 estimates the delay time of the impact sound on the basis of the object distance output from the object distance calculating section 510, and selects the synthesis target images in consideration of the delay time. Specifically, the synthesis target image selection range determining section 171 (shown in FIG. 2) of the selecting section 520 corrects the detection position (position in the time axis) of the specific sound detected by the specific sound detecting section 132, on the basis of the object distance output from the object distance calculating section 510. Further, the synthesis target image selection range determining section 171 determines the synthesis target image selection range on the basis of the position after correction (corrected position) and the valid sound range set by the valid sound range setting section 160. The selecting section 520 is an example of a control section disclosed in the claims. Further, the synthesis target image selection range determining section 171 is an example of a delay time calculating section disclosed in the claims.

Calculation Example of Object Distance

Next, a distance calculation method for calculating the distance between the image capturing apparatus 500 and the target object will be described in detail with reference to the drawings. Here, the distance calculation method for estimating the distance between the image capturing apparatus 500 and the face using the size (reference value) of an ordinary human face will be described.

Figure 18A:
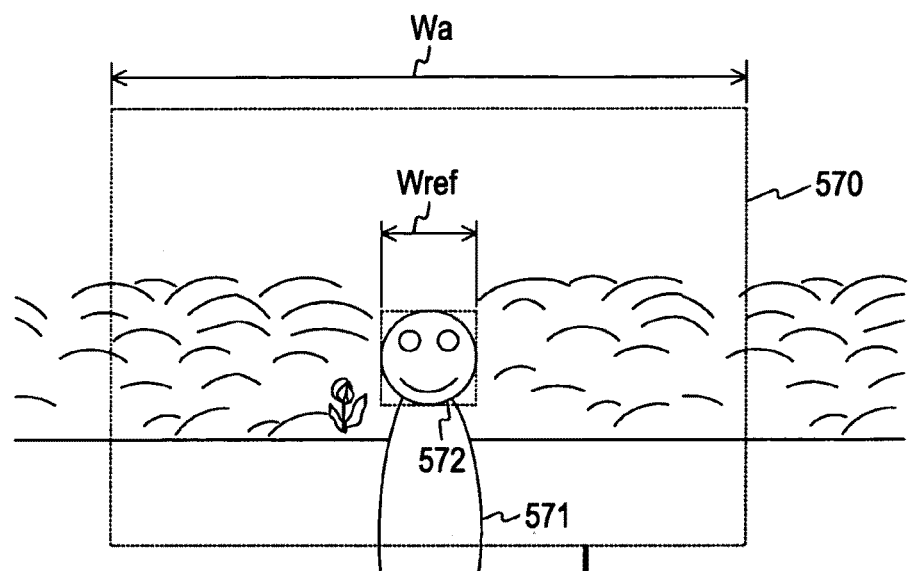
FIGS. 18A and 18B are diagrams schematically illustrating an image capturing range which is an image capturing target by an image capturing section and a captured image displayed on a display section, according to a second embodiment of the present invention.
Figure 18B:
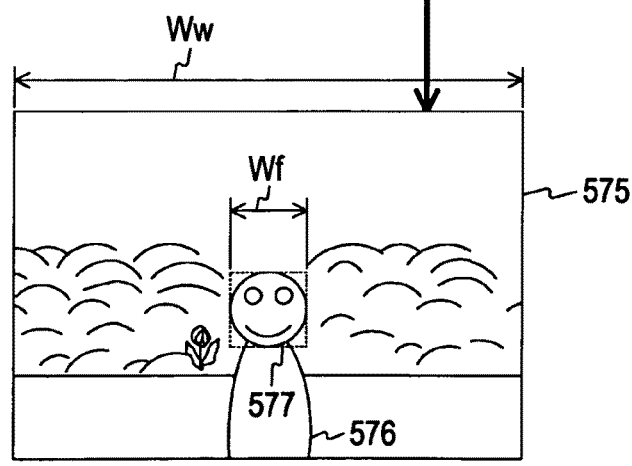

FIGS. 18A and 18B are diagrams schematically illustrating an image capturing range which is an image capturing target by the image capturing section 111 and the captured image displayed on a display section 191, according to the second embodiment of the present invention. FIG. 18A is a diagram schematically illustrating an image capturing range 570 in a case where a person 571 against a golf range is imaged, and FIG. 18B is a diagram illustrating a display example of the display section 191 for a captured image 575 corresponding to the image capturing range 570 shown in FIG. 18A.

For example, as shown in FIG. 18A, in a case where the person 571 is imaged against the golf range as an object, a range (image capturing range 570) where the person 571 is imaged is determined according to the position of the image capturing apparatus 500, the position of a zoom lens or the like. Further, as shown in FIG. 18B, light incident from the object included in the image capturing range 570 is converted into a captured image by the image capturing section 111, and the captured image (so-called through image) is displayed on the display section 191.

Here, the width of the image capturing apparatus 500 in the left and right direction is represented as an image capturing range width Wa, and the width of a face 572 of the person 571 included in the image capturing range 570 in the left and right direction is represented as a face width Wref, in the image capturing range 570 shown in FIG. 18A. The face width Wref corresponds to the size of an ordinary human face, not the actual face width of the person 571. Further, the width in the left and right direction of the captured image 575 shown in FIG. 18B is represented as an image width Ww, and the width of a face 577 of a person 576 included in the captured image 575 in the left and right direction is represented as a face image width Wf. In this case, the ratio of the image capturing range width Wa to the face width Wref is generally the same as ratio of the image width Ww to the face image width Wf.

Figure 19:
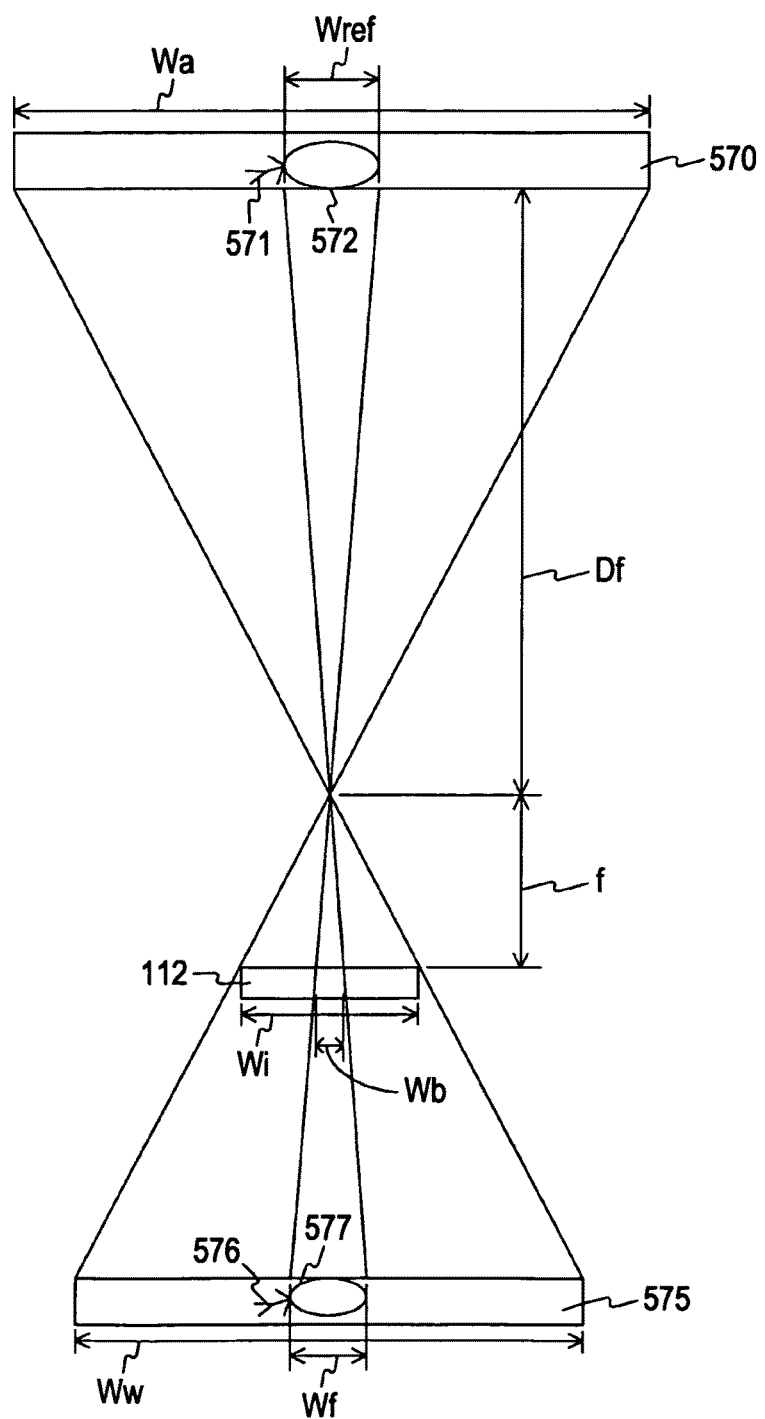
FIG. 19 is a top view schematically illustrating the positional relation between an image capturing range which is an image capturing target by an image capturing section and a captured image displayed on a display section, according to a second embodiment of the present invention.

FIG. 19 is a top view schematically illustrating the positional relation between an image capturing range which is an image capturing target by the image capturing section 111 and a captured image displayed on the display section 191, according to the second embodiment of the present invention. In an example shown FIG. 19, the positional relation between the person 571 shown in FIG. 18A and an image capturing element 112 and the display section 191 provided in the image capturing apparatus 500 is schematically shown. As shown in FIG. 19, the distance from the image capturing apparatus 500 to the face 572 is represented as an object distance Df; the focus distance in the image capturing apparatus 500 is represented as a focus distance f; and the width of the image capturing element 112 is represented as an image capturing element width Wi. The image capturing range width Wa and the face width Wref are the same as those shown in FIG. 18A.

As shown in FIG. 19, if the light incident from the object included in the image capturing range 570 enters the image capturing element 112, the captured image corresponding to the object included in the image capturing range 570 is generated, and then the generated captured image 575 is displayed on the display section 191. Further, the width of the face on the image capturing element 112 in a case where the light incident from the face 572 of the person 571 enters the image capturing element 112 is a face width Wb on the image capturing element.

Here, the following two equations are established from the proportional relation with parallel lines.

$$Df/Wref = f/Wb \qquad \text{Equation 1}$$

$$Wf/Ww = Wb/Wi \qquad \text{Equation 2}$$

Here, the equation 1 is changed into $Df = f \times Wref/Wb$, and the equation 2 is changed into $Wb = Wf \times Wi/Ww$. Then, $Wb = Wf \times Wi/Ww$ obtained by changing the equation 2 is replaced with the equation 1, to thereby calculate the following equation 3. This equation 3 is calculated on the basis of a basic physical law of a lens.

$$Df = Wref \times (f/Wf) \times (Ww/Wf) \qquad \text{Equation 3}$$

Here, Wi (image capturing element width) and Ww (image width) are constant numbers, and the size of an ordinary human face is used as Wref. In this case, as Wf (face image width) is detected, it is possible to calculate Df (estimation distance to the face) using the equation 3.

For example, as shown in FIG. 18A, in a case where the face 572 of one person is included in the image capturing range 570, the face 577 is detected from the captured image 575 corresponding to the image capturing range 570 by the object distance calculating section 510. In this way, in a case where the face is detected, the object distance calculating section 510 calculates the object distance Df using the width (face image width) of the detected face on the basis of the equation 3.

The second embodiment of the present invention provides an example in which the object distance is calculated using one reference value as the ordinary human face size. Here, the person who becomes the image capturing target may have different face sizes according to the person's attributes (for example, age and gender). For example, in a case where a child face is compared with an adult face, the face sizes may be different from each other. Further, in a case where a female face is compared with a male face, the face sizes may be different from each other. Thus, a plurality of reference values according to the person's attributes may be retained in the object distance calculating section 510. Then, the object distance calculating section 510 may detect the attributes for the face detected from the captured image, and the object distance calculating section 510 may calculate the distance d using the reference value according to the attributes. In order to detect the attributes, for example, a detection method in which the respective attributes are detected by a weak learner using difference values of luminance between two points in the face image can be used (for example, see Japanese Unexamined Patent Application Publication No. 2009-118009).

Correction Example of Delay Time

Figure 20A:
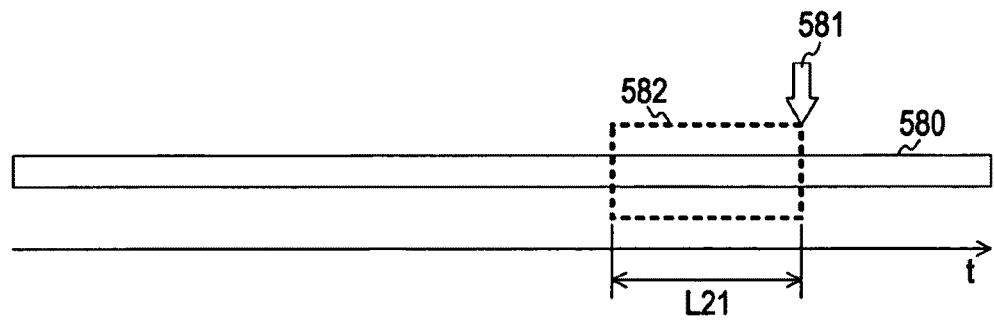
FIGS. 20A and 20B are diagrams schematically illustrating a setting method of a valid sound range by a valid sound range setting section and a determination method of a synthesis target image selection range by a synthesis target image selection range determining section, according to a second embodiment of the present invention.
Figure 20B:
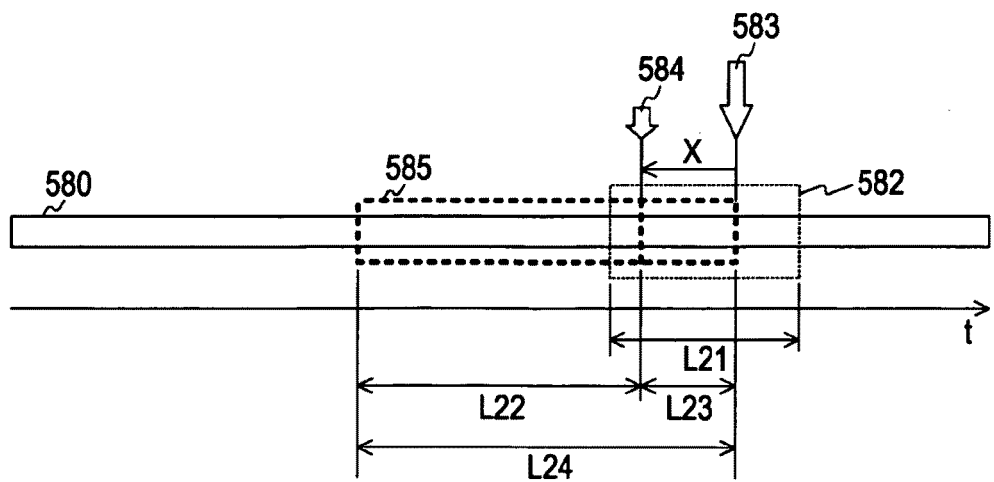

FIGS. 20A and 20B are diagrams schematically illustrating a setting method of a valid sound range by means of the valid sound range setting section 160 and a determination method of a synthesis target image selection range by means of the synthesis target image selection range determining section 171, according to the second embodiment of the present invention. Since this example is a modified example of FIG. 5A and 5B, description of a part of common components will be omitted.

FIG. 20A schematically illustrates a moving image 580 generated by the image capturing section 111 in a rectangular shape. Further, it is assumed that the position where the video recording button is pressed is the press position (video recording button press position 581) of the video recording button in the time axis of the moving image 580 shown in FIG. 20A. In this case, the valid sound range setting section 160 sets a valid sound range 582 on the basis of the video recording button press position 581. Specifically, the valid sound range setting section 160 sets a range which precedes the video recording button press position 581 by a time L21 in the time axis, as the valid sound range 582. Here, for example, the time L21 can be 1.0 second, in a similar way to the time L1 shown in FIG. 5A. Further, the time L21 may be longer than the time L1, and may be changed according to the size of the object distance calculated by the object distance calculating section 510.

FIG. 20B schematically illustrates a determination method of the synthesis target image selection range in a case where the impact sound is detected in the valid sound range 582 set by the valid sound range setting section 160. In FIG. 20B, the position (position in the time axis) where the impact sound is detected by the specific sound detecting section 132 is represented as an impact sound detection position 583.

In the second embodiment of the present invention, before determination of whether the impact sound is detected in the valid sound range 582, the synthesis target image selection range determining section 171 estimates the delay time of the sound on the basis of the object distance d(m) estimated by the object distance calculating section 510. Specifically, the synthesis target image selection range determining section 171 estimates the delay time of the sound on the basis of the object distance d(m) estimated by the object distance calculating section 510. As described above, since the speed of sound is 340 (m/s), the time x(sec) until the impact sound reaches the image capturing apparatus 500 can be calculated using the following equation 4.

$$x = d/340 \qquad \text{Equation 4}$$

The synthesis target image selection range determining section 171 moves the impact sound detection position 583 in the time axis by the time x calculated using the equation 4. The position after the movement is represented as a correction position 584.

Subsequently, the synthesis target image selection range determining section 171 determines whether the correction position 584 is included in the valid sound range 582 set by the valid sound range setting section 160. As shown in FIG. 20B, in a case where the correction position 584 is included in the valid sound range 582 set by the valid sound range setting section 160, the synthesis target image selection range determining section 171 determines the synthesis target image selection range on the basis of the correction position 584. That is, the synthesis target image selection range determining section 171 determines a predetermined range before and after the correction position 584 in the time axis with reference to the correction position 584, as a synthesis target image selection range 585. Specifically, the synthesis target image selection range determining section 171 determines a range L24 including a range which precedes the correction position 584 by a time L22 and a range which exceeds the correction position 584 by a time L23 in the time axis, as the synthesis target image selection range 585.

Here, the times L22 to L24 may be the same values as the times L2 to L4 shown in FIG. 5B, for example. Further, the time L24 may be longer than the time L4, and may be changed according to the size of the object distance calculated by the object distance calculating section 510.

Further, for example, in a case where the distance between the image capturing apparatus 500 and the person 540 is relatively distant, a timer setting can be performed by a remote controller manipulation. Thus, in a case where the valid sound range is set on the basis of the count value of the timer set by the timer setting section 150 and the synthesis target image selection range is determined using the valid sound range, similarly, the delay time of the sound may be estimated and the correction may be performed on the basis of the delay time.

In this way, even in the case where the distance between the image capturing apparatus 500 and the person 540 is relatively distant, the detection position of the impact sound is corrected to determine the synthesis target image selection range on the basis of the position after correction. Thus, it is possible to determine an appropriate synthesis target image selection range.

Here, the correction position may not exist in the valid sound range 582 set by the valid sound range setting section 160. In this case, in a similar way to the example in FIG. 5C, the impact sound is not used. Further, in a case where the impact sound is not used, as shown in FIG. 5C, the synthesis target image selection range can be determined on the basis of the press position of the video recording button.

Figure 21:
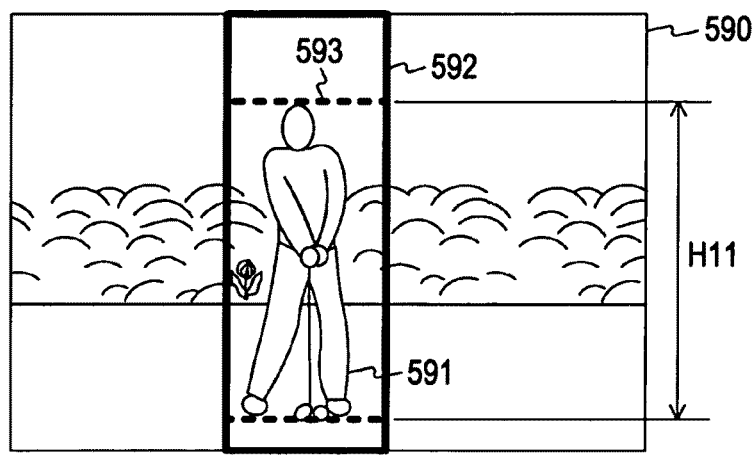
FIG. 21 is a diagram illustrating a display example in a display section according to a second embodiment of the present invention.

In FIGS. 18A, 18B and FIG. 19, an example where the object distance is calculated using the size of the person's face is shown, but as shown in FIG. 21, the object distance may be calculated by the size of portions other than the face.

Calculation Example of Object Distance

FIG. 21 is a diagram illustrating a display example in the display section 191 according to the second embodiment of the present invention. Manipulation support images 592 and 593 for arranging a person 591 who performs a golf swing in an appropriate position are displayed to be overlapped on a captured image, in a display screen 590 shown in FIG. 21. This example is a modified example of the calculation method of the object distance shown in FIGS. 18A and 18B and FIG. 19, and is an example in which the object distance is calculated on the basis of the size (length in the vertical direction) of a region occupied by the object in the display screen 590.

The manipulation support images 592 and 593 represent recommendation regions in which the person 591 who performs the golf swing is to be arranged in the display screen 590. The manipulation support image 592 is indicated by a black line in the display screen 590 and represents the recommendation region of the person 591 who performs the golf swing in the left and right direction. Further, the manipulation support image 593 is indicated by a dotted black frame in the display screen 590 and represents the recommendation region of the person 591 who performs the golf swing in the up and down direction. Here, the recommendation region in the up and down direction specified by the manipulation support image 593 can be a value H11 of a predetermined ratio (for example, 70 W) of the length of the display screen 590 in the vertical direction.

For example, in a case where photographing is performed by setting the synthetic image recording mode using the image capturing apparatus 500, a photographer confirms the manipulation support images 592 and 593 included in the display screen 590 and performs an adjustment so that the person of the target object is included in the manipulation support images 592 and 593. Further, in a case where a zoom manipulation or the like is performed, similarly, the photographer performs an adjustment so that the person of the target object is included in the manipulation support images 592 and 593.

In this way, by applying the object distance calculation method for calculating the object distance on the basis of the reference value relating to the face as described above and the size of the face included in the captured image, it is possible to calculate the object distance. That is, since the size of the person included in the captured image can be the predetermined value H11 in the example shown in FIG. 21, the object distance can be calculated on the basis of the reference value (for example, 170 cm) relating to an ordinary height of the person who plays golf and the predetermined value H11.

In the examples shown in FIGS. 18A, 18B, FIG. 19, and FIG. 21, the object distance is calculated using the size of each portion of the person, but other object distance calculation methods may be used. For example, a depth map relating to the captured image may be generated and the object distance may be calculated using the depth map. Further, a distance measurement sensor may be installed in the image capturing apparatus 500 and the object distance measured by the distance measurement sensor may be used. Furthermore, the object distance may be calculated using focus position information.

Further, any one of the object distance calculation method using the focus position information and the object distance calculation method using the zoom position information may be selected for use according to photographing situations. For example, in a case where a focus is formed in a zoom position of a wide edge, it is likely that the focus position information has a higher accuracy than the zoom position information. For this reason, in a case where the focus is formed in the zoom position of the wide edge, the object distance calculation method using the focus position information can be selected. Further, the object distance may be estimated by a specific method, and it may be determined whether to use the estimation result or to perform re-estimation by other methods with reference to the estimation result.

Operation Example of Image Capturing Apparatus

Figure 22:
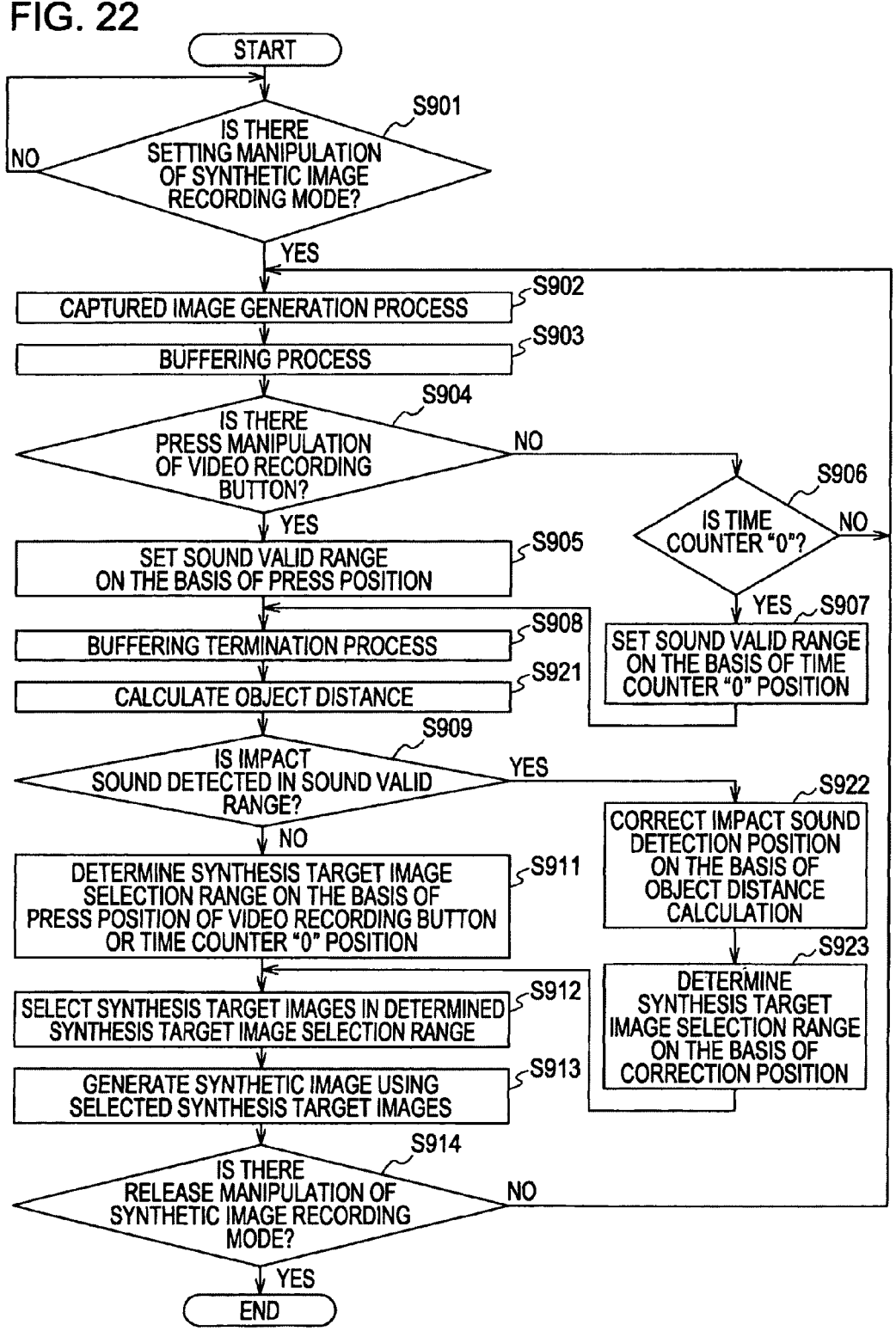
FIG. 22 is a flowchart illustrating an example of a process procedure of a synthetic image generation process by an image capturing apparatus according to a second embodiment of the present invention.

FIG. 22 is a flowchart illustrating an example of a process procedure of a synthetic image generation process by means of the image capturing apparatus 500 according to the second embodiment of the present invention. This example is a modified example of the process procedure of the synthetic image generation process shown in FIG. 14, in which step S921 is added and a process procedure of steps S922 and S923 is performed instead of step S910. Thus, the same reference numerals are given to the same process procedure as shown in FIG. 14, and description thereof will be omitted.

After a buffering termination process is performed (step S908), the object distance calculating section 510 calculates the object distance (step S921).

Further, in a case where the impact sound is detected in the set valid sound range (step S909), the synthesis target image selection range determining section 171 corrects the impact sound detection position on the basis of the calculated object distance (step S922). Specifically, the synthesis target image selection range determining section 171 calculates the delay time on the basis of the object distance, and subtracts the count value supplied from the counter section 174 by the calculated delay time to calculate a correction value. Then, the synthesis target image selection range determining section 171 specifies a position after correction of the impact sound detection position on the basis of the correction value. For example, as shown in FIG. 20B, the impact sound detection position 583 is moved by the correction value x to calculate the correction position 584.

Subsequently, the synthesis target image selection range determining section 171 determines the synthesis target image selection range on the basis of the position after correction (correction position) (step S923). For example, as shown in FIG. 20B, the synthesis target image selection range 585 is determined on the basis of the correction position 584.

In this way, according to the second embodiment of the present invention, it is possible to detect the generation position of the impact sound with a high accuracy, without relying on the change in the distance between the image capturing apparatus 500 and the target object due to the zoom manipulation. Thus, it is possible to generate the synthetic image having a high visibility, without relying on the change in the distance between the image capturing apparatus 500 and the target object due to the zoom manipulation. Further, since the manual work of the user is unnecessary, it is possible to reduce the user's inconvenience.

Further, for example, in a case where the captured images generated by the image capturing section 111 are recorded as the image contents, when the metadata is recorded in relation to the image contents, it is possible to record the impact sound detection position after correction. Thus, since the impact sound detection position after correction can be used in a case where the image file is reproduced, it is possible to detect the correct generation position of the impact sound. Further, for example, in a case where a list of the image contents is displayed, a frame corresponding to the impact sound detection position after correction can be used as a representative thumbnail.

3. Third Embodiment

The first and second embodiments of the present invention mainly provide the examples in which the motion transitions of the person who performs the golf swing are generated as the synthetic image. Here, for example, in the case of sport other than golf such as a ball hitting game or an object collision game, a characteristic sound is generated at the moment when a player hits a ball or objects collide with each other. Further, for example, in the case of fireworks, an explosion sound is generated at a splendidly exploding moment. As the synthesis target image selection range is determined using these specific sounds, an appropriate synthetic image can be generated. In this respect, the third embodiment of the present invention provides an example in which such a synthetic image is easily generated according to the user's preference.

Configuration Example of Image Capturing Apparatus

Figure 23:
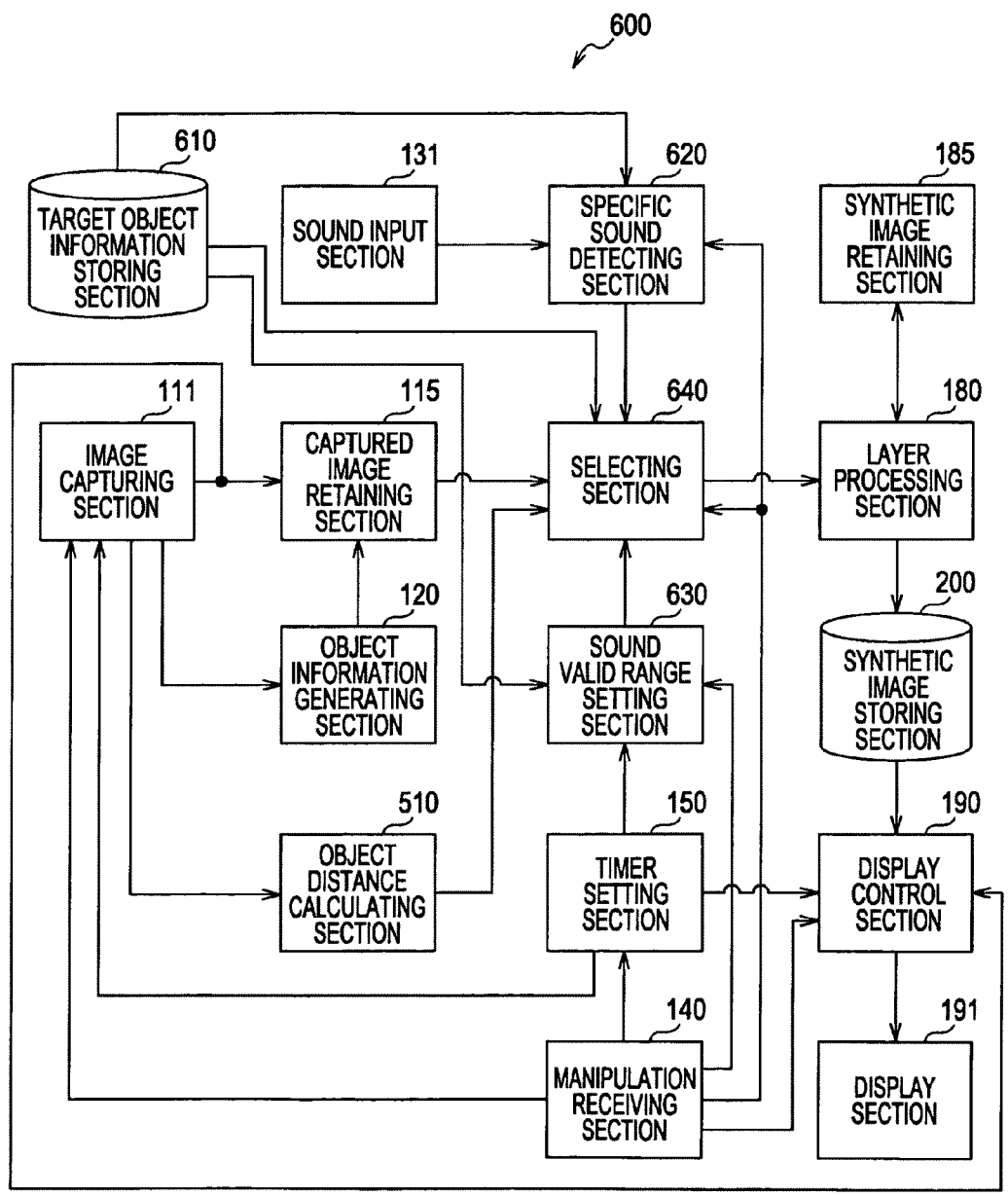
FIG. 23 is a block diagram illustrating an example of a functional configuration of an image capturing apparatus according to a third embodiment of the present invention.

FIG. 23 is a block diagram illustrating an example of a functional configuration of an image capturing apparatus 600 according to the third embodiment of the present invention. The image capturing apparatus 600 is different from the image capturing apparatus 500 shown in FIG. 17 in that a target object information storing section 610 is added and a part of other components are modified. That is, the image capturing apparatus 600 is provided with a specific sound detecting section 620, a valid sound range setting section 630 and a selecting section 640, instead of the specific detecting section 132, the valid sound range setting section 160 and the selecting section 520 in the image capturing apparatus 500. The configuration other than these components is approximately the same as the image capturing apparatus 500. Thus, the same reference numerals are given to common components, and description of a part thereof will be omitted.

Hereinafter, an example of conditions (a first condition and a second condition, for example) of a specific motion (for example, sport or the like) suitable for the selection process of the synthesis target image according to the embodiments of the present invention will be described. The first condition is that a body portion of a target object basically exists in the same position throughout overall motions. Further, the second condition is that a rapid motion involving an impact sound exists among a series of motions. As an example of sport, other than golf, satisfying these conditions, batting of baseball, a tennis serve, breaking of roof tile or the like can be exemplified. Further, an object such as fireworks, other than sport, can be exemplified. Thus, the third embodiment of the present invention provides an example in which such an object or sport becomes a target object.

The target object information storing section 610 stores information about specific sounds and valid sound ranges with respect to specific motions of a plurality of types of target objects, and supplies the respective stored information to the specific sound detecting section 620, the valid sound range setting section 630 and the selecting section 640. The stored contents of the target object information storing section 610 will be described in detail with reference to FIG. 24.

The target object information storing section 610 is an example of a storing section disclosed in the claims.

The specific sound detecting section 620 detects a specific sound on the basis of sounds output from the sound input section 131, and outputs, in a case where the specific sound is detected, the fact to the selecting section 640. Further, the specific sound detecting section 620 detects a sound of a specific value or higher relating to tennis (service) and roof tile breaking. In this respect, the third embodiment of the present invention provides an example in which each impact sound shown in an impact sound 611 in FIG. 24, in addition to an impact sound relating to the golf swing, becomes a specific sound. For example, in baseball (batting) and tennis (service), a sound generated at the moment when a bat or a racket comes in contact with a ball in motion becomes the impact sound. Further, for example, in roof tile breaking, a sound generated at the moment when a hand comes in contact with roof tiles becomes the impact sound. In addition, in fireworks, a sound generated at the moment when fireworks explode in the sky becomes the impact sound. In order to detect these sounds, the specific sound detection method according to the first embodiment of the present invention can be used.

Further, the specific sound detecting section 620, the valid sound range setting section 630 and the selecting section 640 acquires target object information on a specific motion designated by a user manipulation from the target object information storing section 610, among the specific motions of the plurality of types of target objects. Then, the specific sound detecting section 620, the valid sound range setting section 630 and the selecting section 640 perform respective processes using the acquired target object information. In these respective processes, this example is approximately the same as the examples shown in the first and second embodiments of the present invention except that the value of the impact sound and the valid sound range or the like is different, and thus description thereof will be omitted. The valid sound range setting section 630 is an example of a determination range setting section disclosed in the claims. Further, the selecting section 640 is an example of a control section disclosed in the claims.

Storage Example of Target Object Information Storing Section

FIG. 24 is a diagram illustrating an example of the stored contents of the target object information storing section 610 according to the third embodiment of the present invention. In the target object information storing section 610 are stored the impact sound 611, a high speed motion range 612, a valid sound range 613 and a synthesis target image selection range 614.

Specific sound identification information (reference data) for detecting a specific sound (impact sound) by the specific sound detecting section 620 is stored in the impact sound 611. The impact sound 611 shown in FIG. 24 discloses only words indicating a corresponding specific sound.

In the high speed motion range 612 is stored a range with intervals closer than other intervals for selection of synthesis target images, in the synthesis target image selection range. For example, in a case where the specific motion due to the target object is baseball (batting), it may be considered that the motion transitions around the moment when a baseball bat comes in contact with a ball are minutely confirmed. Thus, in the synthesis target image selection range, a high speed motion range in which intervals of the images around the moment may be closer than other intervals for selection of the synthesis target images is set. In this high speed motion range, a predetermined range around the impact sound is set, for example.

The valid sound range 613 stores the valid sound range which becomes the setting target by the valid sound range setting section 630. The third embodiment of the present invention provides an example in which the press manipulation of the video recording button is used as the photographing trigger. In a similar way to the examples shown in the first and second embodiments of the present invention, in the golf and baseball (batting), the photographing trigger may be generated after the motion which is the target is terminated. In the case of the fireworks, the photographing trigger may be generated at the moment when fireworks are exploded in the sky. Further, in a similar way to the examples shown in the first and second embodiments of the present invention, in the golf, baseball (batting) and fireworks, a specific range before the photographing trigger may be set as the valid sound range.

In addition, in the case of tennis (service), the photographing trigger may be generated at the moment when a player turns up for a predetermined time. In the roof tile breaking, the photographing trigger may be generated at the moment when the face of a person who breaks the roof tiles is full of fighting spirit. Further, in the tennis (service) and roof tile breaking, a specific range before a sound of a specific value or higher is initially detected from the photographing trigger can be set as the valid sound range. In this way, in the case of the tennis (service) and roof tile breaking, a rear edge of the valid sound range is set corresponding to the time when the sound of the specific value or higher is detected. However, in a case where the sound is not detected over a predetermined time, the sound detection may become invalid, and then a new valid sound range may be set. For this new valid sound range, the photographing trigger is newly generated. Accordingly, it is possible to reduce a false detection of an impact sound. In this respect, the sound of the specific value or higher in the tennis (service) and roof tile breaking is detected by the specific sound detecting section 620.

In the synthesis target image selection range 614 is stored a synthesis target image selection range determined by the synthesis target image selection range determining section 171. The third embodiment of the present invention provides an example in which a specific range with reference to the impact sound detected in the valid sound range is set as the synthesis target image selection range.

Display Example of Designation Screen of Target Object

Figure 25:
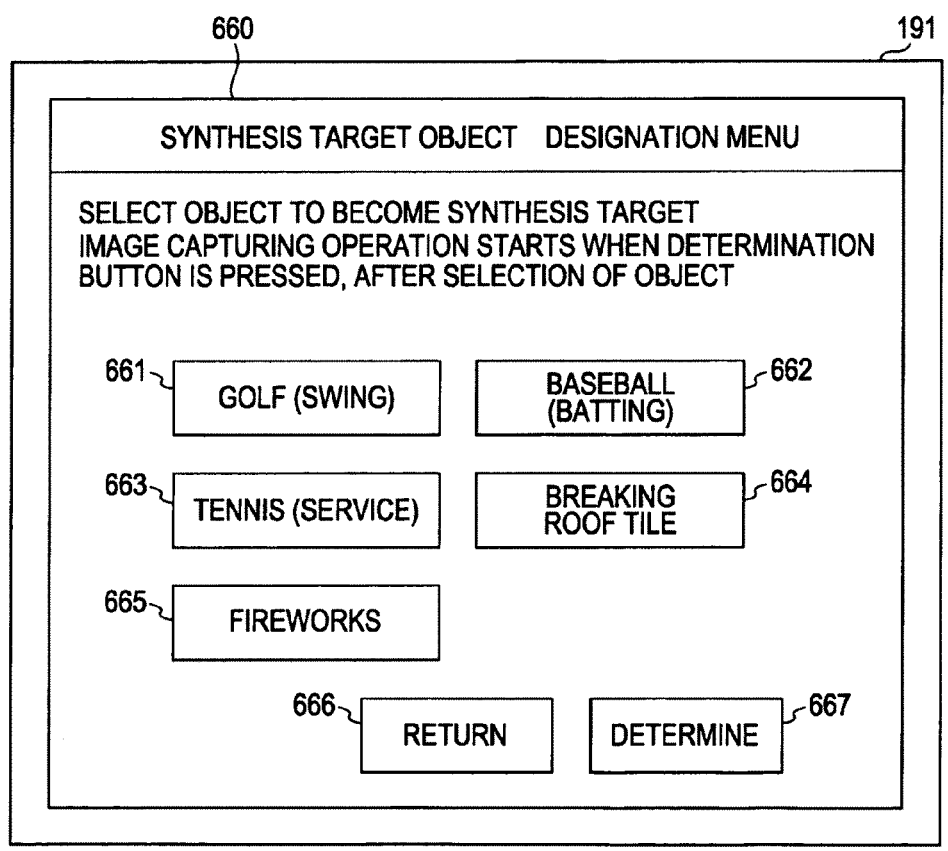
FIG. 25 is a diagram illustrating a display example (display screen) of a display section according to a third embodiment of the present invention.

FIG. 25 is a diagram illustrating a display example of (display screen 660) of the display section 191 according to the third embodiment of the present invention. The display screen 660 is provided with a golf (swing) button 661, a baseball (batting) button 662, a tennis (service) button 663, a roof tile breaking button 664 and a firework button 665. Further, the display screen 660 is provided with a return button 666 and a determination button 667.

The golf (swing) button 661, the baseball (batting) button 662, the tennis (service) button 663, the roof tile breaking button 664 and the firework button 665 are pressed to designate the sport type which is a target when a synthetic image is generated for motion transitions. For example, in a case where the display section 191 is made of a touch panel, the designation can be performed by a press manipulation of a desired button.

The determination button 667 is pressed to determine the designation after the press manipulation for designating the sport type which is the target of the synthetic image. Through this press, the synthesis target image recording mode is set.

The return button 666 is pressed to return to the display screen displayed right before, for example.

For example, in the display screen 660, in a case where a desired button (for example, the tennis (service) button 663) is pressed and the determination button 667 is pressed, a manipulation signal indicating the fact is output from the manipulation receiving section 140 to the respective sections. Then, the specific sound detecting section 620, the valid sound range setting section 630 and the selecting section 640 acquire target object information (target object information about the tennis (service), for example) of the designated sport type from the target object information storing section 610. Then, the specific sound detecting section 620, the valid sound range setting section 630 and the selecting section 640 perform the respective processes using the acquired target object information.

Synthetic Image Example

Figure 26A:
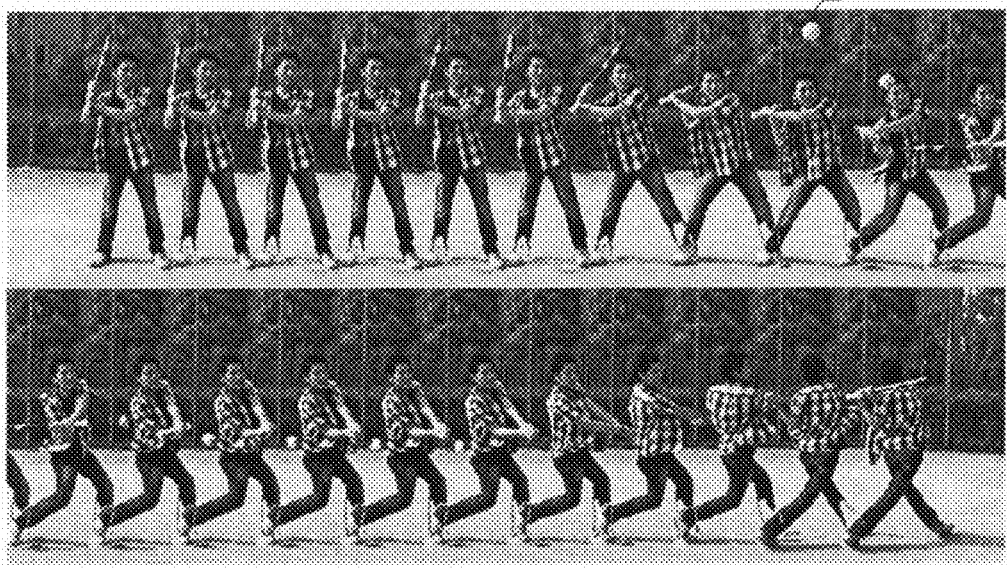
FIGS. 26A and 26B are diagrams illustrating an example of a synthetic image generated by a layer processing section according to a third embodiment of the present invention.
Figure 26B:
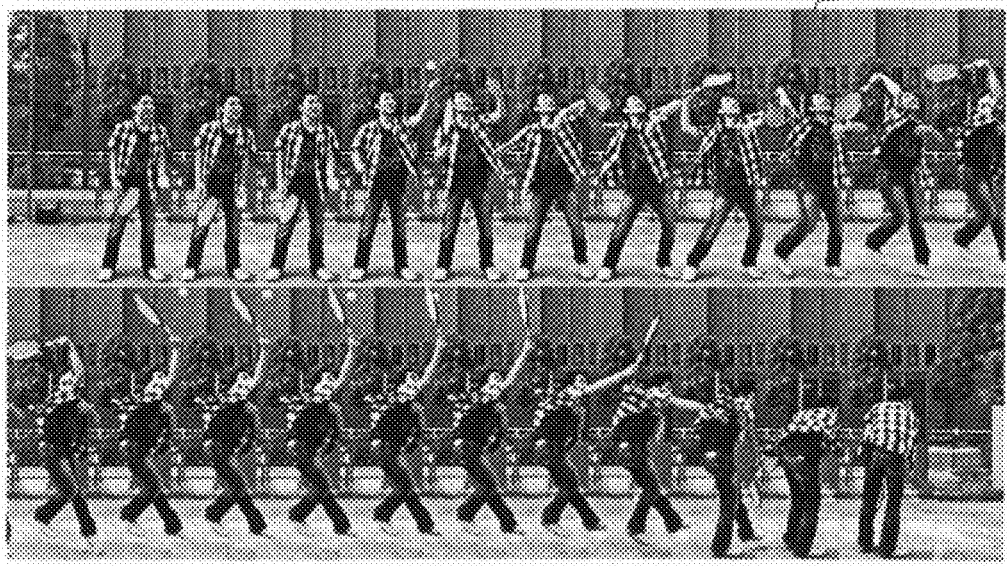

FIGS. 26A and 26B are diagrams illustrating an example of a synthetic image generated by the layer processing section 180 according to the third embodiment of the present invention.

FIG. 26A illustrates a synthetic image 671 in a case where a person who performs baseball batting is imaged. That is, the synthetic image 671 is a synthetic image generated using a moving image obtained by the image capturing operation started after the baseball (batting) button 662 shown in FIG. 25 is pressed and the determination button 667 is pressed.

FIG. 26B illustrates a synthetic image 672 in a case where a person who performs tennis service is imaged. That is, the synthetic image 672 is a synthetic image generated using a moving image obtained by the image capturing operation started after the tennis (service) button 663 shown in FIG. 25 is pressed and the determination button 667 is pressed.

In this way, during specific motions other than a golf swing, a time span in which an impact sound which becomes the detection target can exist is set as the valid sound range, and thus, it is possible to reduce a false detection of sounds other than the impact sound which becomes the detection target. Thus, in a case where a synthetic image using an extremely fast motion causing the impact sound as a target is generated, it is possible to detect the generation position of the impact sound with a high degree of accuracy. Further, it is possible to generate the synthetic image with the emphasis around the accurate generation position of the impact sound, and to generate the synthetic image having a high visibility. In this case, since manual work of the user is unnecessary for the detection of the generation position of the impact sound, it is possible to reduce inconvenience for the user. As the synthetic image is generated in this way, even a beginner who is not accustomed to the handling of the image capturing apparatus can easily generate an appropriate synthetic image according to the user's preference.

4. Fourth Embodiment

The first to third embodiments of the present invention provide the examples in which the image capturing operation is performed by the image capturing apparatus and the synthetic image is generated using the impact sound generated at the time of the image capturing operation. Here, in the case of generating the synthetic image for the contents (for example, moving image contents) recorded by the image capturing apparatus, the synthetic image may be generated using the impact sound included in the contents. Further, for example, in the case of a golf game, a characteristic sound may be generated other than the impact sound, such as great cheers of spectators after golf swing. For this reason, the valid sound range may be set using the characteristic sound as a trigger, instead of the press manipulation of the video recording button or the timer setting. Thus, the fourth embodiment of the present invention provides an example in which the valid sound range is set using the characteristic sound instead of the press manipulation of the video recording button or the timer setting, and the synthetic image is generated for the moving image contents recorded by the image capturing apparatus.

Configuration Example of Image Processing Apparatus

FIG. 27 is a block diagram illustrating an example of a functional configuration of an image processing apparatus 700 according to the fourth embodiment of the present invention. The image processing apparatus 700 is different from the image capturing apparatus 600 shown in FIG. 23 in that the sound input section 131 and the timer setting section 150 are omitted and some other components are modified. That is, the image capturing apparatus 700 is provided with a target object information storing section 710, an input section 720 and an object information generating section 730, instead of the target object information storing section 610, the image capturing section 111 and the object information generating section 120 in the image capturing apparatus 600. Further, the image capturing apparatus 700 is provided with a specific sound detecting section 740, a valid sound range setting section 750 and a selecting section 760, instead of a specific sound detecting section 620, the valid sound range setting section 630 and the selecting section 640 in the image capturing apparatus 600. The configuration other than these components is approximately the same as in the image capturing apparatus 600. Thus, the same reference numerals are given to common components, and description of a part thereof will be omitted.

The target object information storing section 710 stores information about specific sounds or valid sound ranges for specific motions of a plurality of types of target objects, and supplies the respective stored information to the specific sound detecting section 740, the valid sound range setting section 750 and the selecting section 760. The storing contents of the target object information storing section 710 will be described in detail with reference to FIG. 28.

The input section 720 is an input section, through which the image contents (for example, moving image files) recorded by the image capturing apparatus such as a digital video camera are input. It is assumed that the image contents are contents in which metadata (for example, sound information, zoom information or focus position information) relating to respective frames at the time of the image capturing operation of moving images or continuous still images is recorded in relation to the respective frames, for example. The input section 720 supplies respective images (frames) for forming the input image contents to the captured image retaining section 115, the display control section 190 and the specific sound detecting section 740, at a predetermined interval. Further, the input section 720 outputs the respective images for forming the input image contents and attribute information (for example, lens position and focus position) about the images to the object distance calculating section 510 and the object information generating section 730.

The object information generating section 730 generates object information about the respective images on the basis of the respective images supplied from the input section 720 and the attribute information about the images. Further, the object information generating section 730 supplies the generated object information to the captured image retaining section 115 to retain the object information therein, and also supplies the object information to the valid sound range setting section 750 and the selecting section 760. As the object information, for example, information for detecting a specific change in the time axis between the respective images is generated, in addition to information for discerning a region of the target object and a background region thereof. For example, a face included in the image is detected, and attribute information about an expression, direction or the like of the face is generated. For example, an attribute such as a delight, anger, sorrow or expression of pleasure, strain, face direction, mouth expression (opening/closing), eye expression (for example, wink) or the like may be detected, and the attribute information may be generated on the basis of the detection result. As the attribute detection method, for example, an identification method based on the characteristic amount extracted from the face image relating to the attribute which becomes the detection target can be used. That is, the characteristic amount extracted from the face image relating to the attribute which becomes the detection target is stored in advance as an identification dictionary. Further, the characteristic amount is extracted from the face image including the detected face, and the extracted characteristic amount is compared with the characteristic amount included in the identification dictionary, to thereby calculate the similarity between these characteristic amounts. In addition, in a case where the calculated similarity exceeds a threshold value, it is determined that the detected face is an attribute corresponding to the identification dictionary which becomes the calculation target of the similarity which exceeds the threshold value. Furthermore, for example, the above-described attribute detection method may be used (for example, refer to Japanese Unexamined Patent Application Publication No. 2009-118009).

The valid sound range setting section 750 detects a specific change in the time axis between the respective images, on the basis of the attribute information generated in this way. As this specific change, for example, a face change can be detected. For example, the change in expression at the time of delight, anger, sorrow, pleasure or strain, the change in the face direction, for example, in a case where the face direction is changed to the front side from below, the change at the time of opening or closing the mouth, or the change in eyes at the time of wink can be detected as a face change. Further, a case where the person's face comes on the screen or the person's face goes out of the screen may be detected as the specific change in the time axis between the respective images. Further, as information for detecting the specific change in the time axis between the respective images, brightness information indicating the brightness of the entire image and luminance value distribution information indicating a distribution state of luminance values in the image may be generated. Then, a specific change in the information may be detected as the specific change in the time axis between the respective images.

The specific sound detecting section 740 detects the specific sound on the basis of the sound included in the image contents supplied from the input section 720, and then outputs, in a case where the specific sound is detected, the fact to the valid sound range setting section 750 and the selecting section 760. The impact sound which becomes the detection target by the specific sound detecting section 740 is the same as in the third embodiment of the present invention. Further, in the fourth embodiment of the present invention, when the specific change in the time axis between the respective images is detected, the specific sound detected by the specific sound detecting section 740 is used. For example, great cheers (wild applauses) of spectators in a case where a golf or baseball game is held, or a shout at the moment when fighting spirit is put into roof tile breaking is detected as the specific sound. Further, for example, a whistling sound of a piper or a splash sound of the water (for example, in a case where the target object relates to the water) may be detected as the specific sound. Further, the valid sound range setting section 750 detects the change in the specific sound as the specific change in the time axis between the respective images. For example, the time when the great cheers are detected from a state where the sound barely exists, or the time when the sound barely exists from the state where the great cheers are detected, can be detected as the specific change in the time axis between the respective images. As the specific sound detection method, the specific sound detection method shown in the first embodiment of the present invention can be applied. That is, the valid sound range setting section 750 can detect the specific change using at least one of the characteristic amount extracted from the respective images and the characteristic amount extracted on the basis of the sound in relation to the respective images. The valid sound range setting section 750 is an example of a specific change detecting section disclosed in the claims.

The specific sound detecting section 740, the valid sound range setting section 750 and the selecting section 760 acquire target object information about the specific motion designated by the user manipulation among the specific motions of the plurality of types of target objects, from the target object information storing section 710. Further, the specific sound detecting section 740, the valid sound range setting section 750 and the selecting section 760 perform the respective processes using the acquired target object information. The respective processes are approximately the same as the examples as shown in the first to third embodiments of the present invention, except that the trigger when the impact sound is set, the impact sound, the value of the valid sound range and the like are different, and thus, description thereof will be omitted. The valid sound range setting section 750 is an example of a determination range setting section disclosed in the claims. Further, the selecting section 760 is an example of a control section disclosed in the claims.

Storage Example of Target Object Information Storing Section

FIG. 28 is a diagram illustrating an example of stored contents of the target object information storing section 710 according to the fourth embodiment of the present invention. In the target object information storing section 710 are stored an impact sound 711, a high speed motion range 712, a trigger 713 for determining a valid sound range, a valid sound range 714 and a synthesis target image selection range 715. The impact sound 711, the high speed motion range 712 and the synthesis target image selection range 715 are approximately the same as the impact sound 611, the high speed motion range 612 and the synthesis target image selection range 614 shown in FIG. 24, and thus, description thereof will be omitted.

The trigger 713 for determining the valid sound range stores a trigger when the valid sound range is set by the valid sound range setting section 750. For example, in the case of golf and baseball (batting), the trigger may be generated at the moment when the great cheer of spectators is detected in the contents input from the input section 720. The detection of the great cheer of spectators is performed by the valid sound range setting section 750 on the basis of the specific sound detected by the specific sound detecting section 740. Further, in the case of fireworks, the trigger may be generated at the moment when a dark state in the screen is transited to a bright state in the contents input from the input section 720. The detection of the moment when the dark state in the screen is transited to the bright state is performed by the valid sound range setting section 750, on the basis of the attribute information generated by the object information generating section 730. Further, in the case of tennis (service), the trigger may be generated at the moment when a player turns up for a predetermined time in the contents input from the input section 720. The detection of the moment when the player turns up for the predetermined time is performed by the valid sound range setting section 750, on the basis of the attribute information generated by the object information generating section 730. Further, in the case of roof tile breaking, the trigger may be generated at the moment when the face of a person who performs the roof tile breaking is full of fighting spirit in the contents input from the input section 720. The detection of the moment when the face of a person who performs roof tile breaking is full of fighting spirit is performed by the valid sound range setting section 750, on the basis of the attribute information generated by the object information generating section 730 or the specific sound detected by the specific sound detecting section 740.

The valid sound range 714 stores the valid sound range which becomes the setting target by the valid sound range setting section 750. The fourth embodiment of the present invention provides an example in which the detection time of the specific change stored in the trigger 713 for determining the valid sound range is the trigger of the valid sound range. This valid sound range is approximately the same as the valid sound range 613 shown in FIG. 24, except that the detection time of the specific change stored in the trigger 713 for determining the valid sound range is the trigger of the valid sound range, and thus, description thereof will be omitted.

Determination Example of Synthesis Target Image Selection Range

Figure 29A:
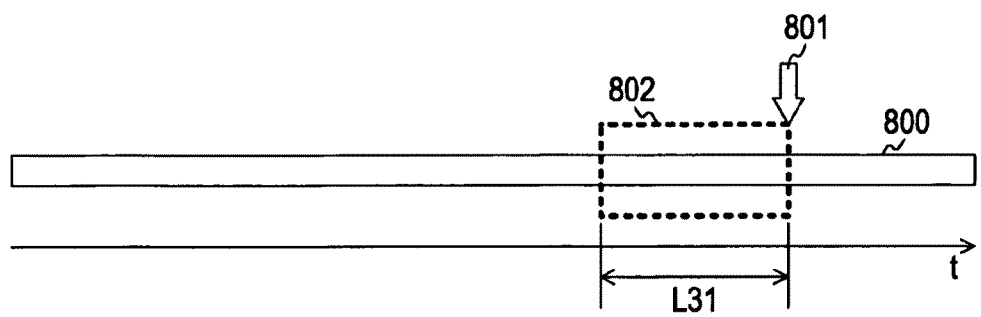
FIGS. 29A and 29B are diagrams schematically illustrating a setting method of a valid sound range by a valid sound range setting section and a determination method of a synthesis target image selection range by a synthesis target image selection range determining section, according to a fourth embodiment of the present invention.
Figure 29B:
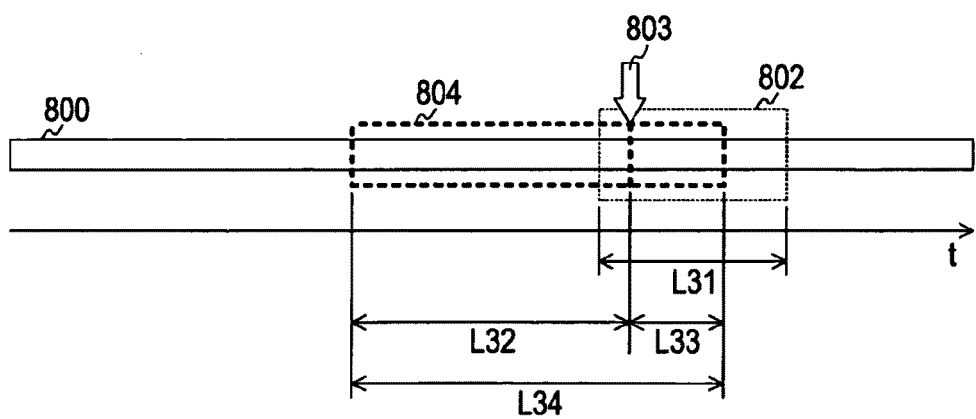

FIGS. 29A and 29B are diagrams schematically illustrating a setting method of a valid sound range by means of the valid sound range setting section 750 and a determination method of a synthesis target image selection range by means of the synthesis target image selection range determining section 171, according to the fourth embodiment of the present invention. This is an example in which the synthesis target image selection range is determined in a case where the baseball (batting) shown in FIG. 28 is designated. Further, this example is a modified example in FIGS. 5A and 5B, and thus, description of a part of common components will be omitted.

FIG. 29A schematically illustrates a moving image 800 input through the input section 720 in a rectangular shape. The moving image 800 is a moving image in which the appearance of a baseball game is recorded, for example. Further, in respective images for forming the moving image 800, the position where the great cheer of spectators is detected by the specific sound detecting section 740 is represented as a great cheer detecting position 801 in the time axis of the moving image 800 shown in FIG. 29A. In this case, the valid sound range setting section 750 sets a valid sound range 802 on the basis of the great cheer detection position 801. Specifically, the valid sound range setting section 750 sets a range which precedes the great cheer detection position 801 by a time L31 in the time axis, as the valid sound range 802. Here, the time L31 can be 1.0 second, in a similar way to the time L1 shown in FIG. 5A, for example. Further, the time L31 may be longer than the time L1.

For example, it is considered that a generation position of the impact sound when a player has a great shot in a golf tournament occurs prior to the great cheer of spectators. Thus, the valid sound range is set (in a preceding position in the time axis) prior to the great cheer of spectators, thereby making it possible to appropriately detect the impact sound.

FIG. 29B schematically illustrates a determination method of the synthesis target image selection range in a case where the impact sound is detected in the valid sound range 802 set by the valid sound range setting section 750. In FIG. 29B, the position (position in the time axis) where the impact sound is detected by the specific sound detecting section 740 is represented as an impact sound detection position 803.

For example, the synthesis target image selection range determining section 171 determines whether the impact sound detection position 803 is included in the valid sound range 802 set by the valid sound range setting section 750. As shown in FIG. 29B, in a case where the impact sound detection position 803 is included in the valid sound range 802, the synthesis target image selection range determining section 171 determines the synthesis target image selection range on the basis of the impact sound detection position 803. That is, the synthesis target image selection range determining section 171 determines a specific range before and after the impact sound detection position 803 in the time axis with reference to the impact sound detection position 803 as a synthesis target image selection range 804. Specifically, a range L34, which includes a range which precedes the impact sound detection position 803 by a time L32 in the time axis, and a range which exceeds the impact sound detection position 803 by a time L33, is determined as the synthesis target image selection range 804.

Here, the times L32 to L34 may be the same values as the times L2 to L4 shown in FIG. 5B, for example. Further, the time L34 may be longer than the time L4.

Figure 30A:
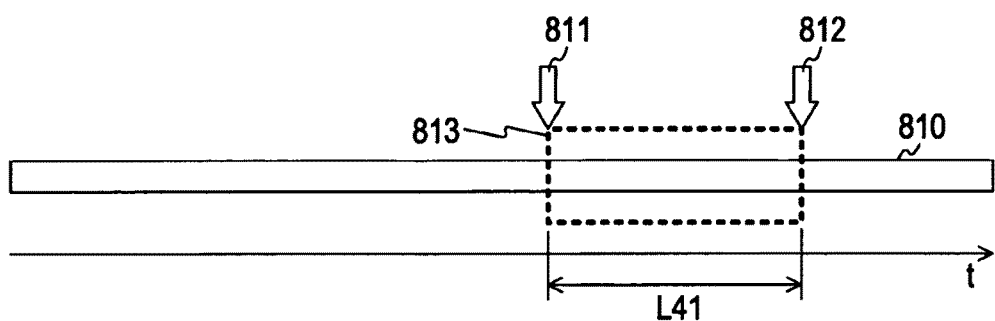
FIGS. 30A and 30B are diagrams schematically illustrating a setting method of a valid sound range by a valid sound range setting section and a determination method of a synthesis target image selection range by a synthesis target image selection range determining section, according to a fourth embodiment of the present invention.
Figure 30B:
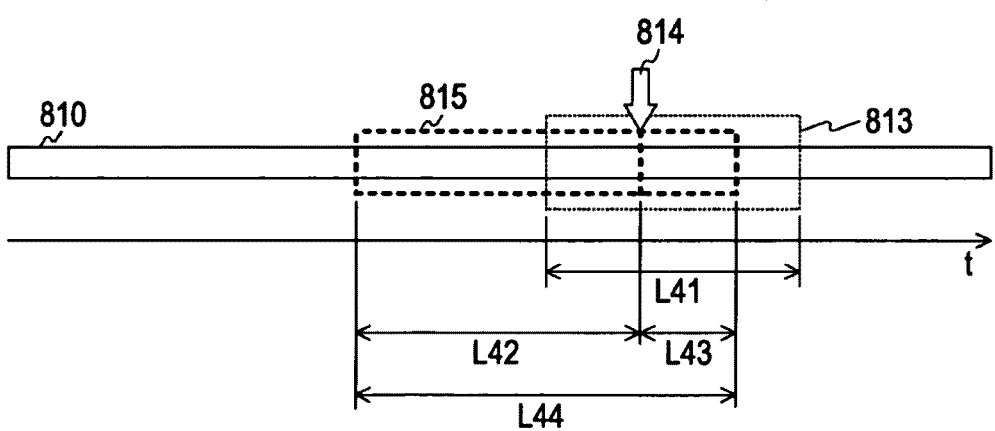

FIGS. 30A and 30B are diagrams schematically illustrating a setting method of a valid sound range by means of the valid sound range setting section 750 and a determination method of a synthesis target image selection range by means of the synthesis target image selection range determining section 171, according to the fourth embodiment of the present invention. This is an example in which the synthesis target image selection range is determined in a case where the tennis (service) in FIG. 28 is designated. Further, this example is a modified example shown in FIGS. 5A and 5B, and thus, description of a part of common components will be omitted.

FIG. 30A schematically illustrates a moving image 810 input through the input section 720 in a rectangular shape. The moving image 810 is a moving image in which the appearance of a tennis game is recorded, for example. Further, in respective images for forming the moving image 810, the position where it is detected by the object information generating section 730 that a face of a tennis player turns, up for a predetermined time or longer is represented as a face turn-up state detection position 811 of the moving image 800 in the time axis. Further, the position (position in the time axis) where a sound of a specific value or higher is detected by the specific sound detecting section 740 is represented as a sound detection position 812 of a specific value or higher. In this case, the valid sound range setting section 750 sets a valid sound range 813 on the basis of the face turn-up state detection position 811 and the sound detection position 812 of the specific value or higher. Specifically, the valid sound range setting section 750 sets the valid sound range 813 (time L41) in the time axis with reference to the face turn-up state detection position 811 and the sound detection position 812 of the specific value or higher. Here, the time L41 is a range where the face turn-up state detection position 811 is a start point and the sound detection position 812 of the specific value or higher is an end point, for example.

In this respect, in the end point of the valid sound range relating to tennis (service), the detection of the sound of the specific value or higher is a setting condition. Here, in a case where the sound of the specific value or higher is not detected from the start point of the valid sound range for a predetermined time or longer, the valid sound range setting section 750 makes invalid the valid sound range relating to the start point, and may wait for a new trigger for determining the valid sound range. Thus, a false detection of the impact sound can be reduced. Further, the end point of the valid sound range relating to the roof tile breaking can be similarly applied.

FIG. 30B schematically illustrates a determination method of a synthesis target image selection range in a case where the impact sound is detected in the valid sound range 813 set by the valid sound range setting section 750. In FIG. 30B, the position (position in the time axis) where the impact sound is detected by the specific sound detecting section 740 is represented as an impact sound detection position 814.

For example, the synthesis target image selection range determining section 171 determines whether the impact sound detection position 814 is included in the valid sound range 813 set by the valid sound range setting section 750. As shown in FIG. 30B, in a case where the impact sound detection position 814 is included in the valid sound range 813, the synthesis target image selection range determining section 171 determines the synthesis target image selection range on the basis of the impact sound detection position 814. That is, the synthesis target image selection range determining section 171 determines a specific range before and after the impact sound detection position 814 in the time axis with reference to the impact sound detection position 814 as a synthesis target image selection range 815. Specifically, a range L44, which includes a range which precedes the impact sound detection position 814 by a time L2 in the time axis and a range which exceeds the impact sound detection position 814 by a time L43, is determined as the synthesis target image selection range 815.

Here, as shown in FIG. 28, the time L42 can be 2.5 seconds, for example; and the time L43 can be 0.5 seconds, for example. That is, the time L44 can be 3.0 seconds. The setting contents of the times L42 to L44 may be changed according to the user's preference.

Further, in the examples shown in FIGS. 29A, 29B and FIGS. 30A and 30B, before determination of whether the impact sound is detected in the valid sound range as shown in the second embodiment of the present invention, the delay time of the sound may be estimated, and the impact sound detection position may be corrected on the basis of the estimation result. In this way, the detection position of the impact sound is corrected, thereby making it possible to determine the synthesis target image selection range on the basis of the position after correction. Further, in the specific sound (for example, great cheer of spectators) which is the trigger of the valid sound range, the sound delay time may be estimated, and the detection position may be corrected on the basis of the estimation result. For example, in a case where the specific sound is the great cheer of spectators, the object distance to the background of the target object is calculated using metadata (for example, zoom information or focus position information) relating to respective frames, and the delay time of the great cheer of spectators can be estimated on the basis of the object distance. Thus, even in the moving image contents in which the target object which is relatively distant becomes an image capturing target by a zoom function, an appropriate synthesis target image selection range can be also determined.

Further, in the examples shown in FIGS. 29A and 29B and FIGS. 30A and 30B, the impact sound may not be detected in the valid sound range set by the valid sound range setting section 750. In this case, a synthetic image is not generated using the impact sound, and the next synthetic image process may be performed.

In this way, with respect to the image contents recorded by the image capturing apparatus such as a digital video camera or the like, the valid sound range can be set using the specific change in the time axis between the respective images. Thus, in a case where the synthetic image in which an extremely fast motion causing the impact sound is a target is generated, it is possible to detect the generation position of the impact sound without pressing the video recording button or the like with a high level of accuracy. Further, it is possible to generate the synthetic image with the emphasis around the accurate generation position of the impact sound, and to generate the synthetic image having high visibility. Further, since manual work of the user is also unnecessary for the detection of the generation position of the impact sound, it is possible to reduce inconvenience for the user. As the synthetic image is generated in this way, even a beginner who is not accustomed to the handling of the image capturing apparatus can easily generate an appropriate synthetic image according to the user's preference.

The setting method for setting the valid sound range using the specific change in the time axis between the respective images may be employed to the image capturing apparatus shown in the first to the third embodiments of the present invention.

Further, in the embodiments of the present invention, the synthesis target images selected by the synthesis target image selecting section 172 are used for the generation process of the synthetic image as the still image. Here, for example, the selected synthesis target images may be used for the synthetic image generation process in which the process of generating the synthetic image is displayed as a moving image. Further, the selected synthesis target images may be used as the synthesis targets, and also, may be used as a plurality of images (for example, images used in a slide-show) indicating transitions of the specific motion.

The present embodiments can be applied to an image processing apparatuses such as a mobile phone with an imaging function, personal computer, video system, editing apparatus or the like. Further, the process procedures in the present embodiments of the present invention may be also provided in a process program.

The embodiments of the present invention exemplify examples for realizing the present invention. Here, as obviously seen in the embodiments of the present invention, the disclosures in the embodiments of the present invention correspond to the disclosures in the claims, respectively. Similarly, the disclosures in the claims correspond to the disclosures in the embodiments of the present invention having the same reference numerals, respectively. Here, the present invention is not limited to the embodiments, may be variously modified within the range without departing from the spirit of the present invention.

Further, the process procedures described in the embodiments of the present invention may be provided as a method having the series of procedures. Further, the process procedures may be provided as a program for allowing the series of procedures to be executed on a computer and a recording medium which records the program. A CD (Compact Disc), MD (MiniDisc), DVD (Digital Versatile Disc), memory card, Blu-ray Disc (registered trademark) or the like may be used as this recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a specific sound detecting section which detects a specific sound generated during motion of a specific motion conducted by a target object included in an image group including a plurality of images which continues in a time-series manner;
a synthetic image generating section which generates a synthetic image representing transitions of the specific motion using a predetermined number of images included in a selection range of the image group in a time axis, with reference to a detection position of the detected specific sound in the time axis;
a determination range setting section which sets, as a determination range, a range in the time axis for determination on the generation of the synthetic image on the basis of a user manipulation;
an object distance calculating section which calculates a distance to the target object;
a delay time calculating section which calculates a delay time of the detected specific sound on the basis of the calculated distance; and
a control section which corrects the detection position of the detected specific sound in the time axis on the basis of the calculated delay time and determines whether or not to allow the synthetic image generating section to generate the synthetic image according to whether the corrected detection position exists in the set determination range.

2. The apparatus according to claim 1,
wherein the user manipulation is a specific manipulation received when the specific motion is terminated or a timer setting manipulation for such a setting that a termination time of the specific motion becomes a termination time of a time counter, and
wherein the determination range setting section sets the determination range with reference to a position in the time axis where the specific manipulation is received in a case where the user manipulation is the specific manipulation, and sets the determination range with reference to the termination time of the time counter by means of the timer setting manipulation in a case where the user manipulation is the timer setting manipulation.

3. The apparatus according to claim 2,
wherein the determination range setting section narrows the determination range set in the case where the user manipulation is the specific manipulation compared with the determination range set in the case where the user manipulation is the timer setting manipulation.

4. The apparatus according to claim 1, further comprising a determining section which determines the selection range with reference to the corrected detection position in a case where the corrected detection position exists in the set determination range.

5. An image capturing apparatus comprising:
an image capturing section which images an object to generate a plurality of images which continues in a time-series manner;
a specific sound detecting section which detects a specific sound generated during motion of a specific motion conducted by a target object included in an image group including the plurality of images;
a synthetic image generating section which generates a synthetic image representing transitions of the specific motion using a predetermined number of images included in a selection range of the image group in a time axis, with reference to a detection position of the detected specific sound in the time axis;
a determination range setting section which sets, as a determination range, a range in the time axis for determination on the generation of the synthetic image on the basis of a user manipulation relating to an image capturing operation by means of the image capturing section;
an object distance calculating section which calculates a distance to the target object;
a delay time calculating section which calculates a delay time of the detected specific sound on the basis of the calculated distance; and
a control section which corrects the detection position of the detected specific sound in the time axis on the basis of the calculated delay time and determines whether or not to allow the synthetic image generating section to generate the synthetic image according to whether the corrected detection position exists in the set determination.

6. An image processing apparatus comprising:
a specific sound detecting section which detects a specific sound generated during motion of a specific motion conducted by a target object included in an image group including a plurality of images which continues in a time-series manner;
a certain change detecting section which detects a certain change in a time axis between the respective images forming the image group;
a synthetic image generating section which generates a synthetic image representing transitions of the specific motion using a predetermined number of images included in a selection range of the image group in a time axis, with reference to a detection position of the detected specific sound in the time axis;
a determination range setting section which sets, as a determination range, a range in the time axis for determination on the generation of the synthetic image on the basis of a position in the time axis in which the certain change is detected;
an object distance calculating section which calculates a distance to the target object;
a delay time calculating section which calculates a delay time of the detected specific sound on the basis of the calculated distance; and
a control section which corrects the detection position of the detected specific sound in the time axis on the basis of the calculated delay time and determines whether or not to allow the synthetic image generating section to generate the synthetic image according to whether the corrected detection position exists in the set determination range.

7. An image capturing apparatus comprising:
an image capturing section which images an object to generate a plurality of images which continues in a time-series manner;
a specific sound detecting section which detects a specific sound generated during motion of a specific motion conducted by a target object included in an image group including a plurality of images which continues in a time-series manner;
a certain change detecting section which detects a certain change in a time axis between the respective images forming the image group;
a synthetic image generating section which generates a synthetic image representing transitions of the specific motion using a predetermined number of images included in a selection range of the image group in a time axis, with reference to a detection position of the detected specific sound in the time axis;
a determination range setting section which sets, as a determination range, a range in the time axis for determination on the generation of the synthetic image on the basis of a position in the time axis in which the certain change is detected;
an object distance calculating section which calculates a distance to the target object;
a delay time calculating section which calculates a delay time of the detected specific sound on the basis of the calculated distance; and
a control section which corrects the detection position of the detected specific sound in the time axis on the basis of the calculated delay time and determines whether or not to allow the synthetic image generating section to generate the synthetic image according to whether the corrected detection position exists in the set determination range.

8. A control method of an image processing apparatus, comprising the steps of:
detecting a specific sound generated during motion of a specific motion conducted by a target object included in an image group including a plurality of images which continues in a time-series manner;
setting, on the basis of a user manipulation a range in a time axis for determination on a generation of a synthetic image, as a determination range;
calculating a distance to the target object;
calculating a delay time of the detected specific sound on the basis of the calculated distance;
correcting the detection position of the detected specific sound in the time axis on the basis of the calculated delay time; and
determining whether or not to allow the synthetic image generating section to generate the synthetic image according to whether the corrected detection position exists in the set determination range,
in which at least one of the calculating a distance step, the calculating a delay time step, the correcting step and the determining step are performed by a processor.

9. A non-transitory computer-readable medium having stored thereon a program to cause a computer to execute the steps of:
setting, on the basis of a user manipulation, a range in a time axis for determination on a generation of a synthetic image, as a determination range;
calculating a distance to a target object and calculating a delay time of a detected specific sound on the basis of the calculated distance, in which the detected specific sound is generated during motion of a specific motion conducted by the target object included in an image group including a plurality of images which continues in a time-series manner;

correcting the detection position of the detected specific sound in the time axis on the basis of the calculated delay time; and determining whether or not to allow the synthetic image generating section to generate the synthetic image according to whether the corrected detection position exists in the set determination range.

\* \* \* \* \*